(12) United States Patent
Kagami et al.

(10) Patent No.: US 7,207,100 B2
(45) Date of Patent: Apr. 24, 2007

(54) METHOD OF MANUFACTURING A MAGNETIC HEAD

(75) Inventors: Takeo Kagami, Tokyo (JP); Kunihiro Ueda, Tokyo (JP); Kentaro Nagai, Tokyo (JP); Shunji Saruki, Tokyo (JP)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 11/013,743

(22) Filed: Dec. 17, 2004

(65) Prior Publication Data

US 2005/0102821 A1 May 19, 2005

Related U.S. Application Data

(62) Division of application No. 10/262,913, filed on Oct. 3, 2002, now abandoned.

(30) Foreign Application Priority Data

Oct. 10, 2001 (JP) .............................. 2001-312302
Oct. 12, 2001 (JP) .............................. 2001-314821

(51) Int. Cl.
 *G11B 5/127* (2006.01)
 *H04R 31/00* (2006.01)
(52) U.S. Cl. .............................. 29/603.16; 29/603.12; 29/603.15; 29/603.18; 216/22; 216/39; 216/41; 216/48; 360/122; 360/131; 451/5; 451/41
(58) Field of Classification Search ............... 29/603.1, 29/603.12, 603.15, 603.16, 603.18; 216/22, 216/39, 41, 48; 360/122, 313; 451/5, 41
See application file for complete search history.

(56) References Cited

U.S. PATENT DOCUMENTS 5,841,608 A 11/1998 Kasamatsu et al. ......... 360/103

(Continued)

FOREIGN PATENT DOCUMENTS

JP 06004830 A 1/1994

(Continued)

OTHER PUBLICATIONS

"Floating thin film head fabricated by ion etching method"; Nakanishi, T.; Kogure, K.; Toshima, T.; Yanagisawa, K.; Magnetics, IEEE Transactions on vol. 16, Issue 5, Sep. 1980; pp. 785-787. □□.*

(Continued)

*Primary Examiner*—Paul D. Kim
(74) *Attorney, Agent, or Firm*—Oliff & Berridge, PLC

(57) ABSTRACT

A method of manufacturing a magnetic head manufactures a magnetic head having a base, and a laminate stacked on the base and including a magneto-resistive device. The method mechanically polishes a surface of a structure including the base and the laminate close to a magnetic recording medium, wherein the surface of the structure includes an end face of the laminate including an end face of the magneto-resistive device and a surface of the base. Next, the method selectively etches a first region on the surface of the structure close to the magnetic recording medium, wherein the first region includes the surface of the base but does not include the end face of the magneto-resistive device. Subsequently, the method entirely etches the surface of the structure close to the magnetic recording medium.

7 Claims, 33 Drawing Sheets

U.S. PATENT DOCUMENTS

| | | | |
|---|---|---|---|
| 6,174,736 B1 | 1/2001 | Tsukamoto et al. | 438/3 |
| 6,443,813 B1 * | 9/2002 | Strom et al. | 451/41 |
| 6,444,132 B1 | 9/2002 | Orii et al. | 216/22 |
| 6,470,565 B1 | 10/2002 | Sasaki | 29/603.12 |
| 6,532,646 B2 * | 3/2003 | Watanuki | 29/603.12 |
| 6,647,613 B2 * | 11/2003 | Beck et al. | 29/603.13 |

FOREIGN PATENT DOCUMENTS

| | | | |
|---|---|---|---|
| JP | | 07029120 A * | 1/1995 |
| JP | | 10-289422 | 10/1998 |
| JP | | 11-175927 A | 7/1999 |
| JP | A | 2000-005938 | 1/2000 |
| JP | A | 2001-236619 | 8/2001 |

OTHER PUBLICATIONS

Yufeng Li, "Effect of Current Density and Stripe Height on the Amplitude of a Dual-Synthetic GMR Head", IEEE Transactions on Magnetics, vol. 37, No. 4, Jul. 2001, pp. 1695-1697.

* cited by examiner

METHOD OF MANUFACTURING A MAGNETIC HEAD

This is a Divisional of application Ser. No. 10/262,913, filed Oct. 3, 2002 now abandoned. The entire disclosure of the prior application is hereby incorporated by reference herein in its entirety.

BACKGROUND

The present invention relates to a magnetic head for use in a magnetic disk apparatus and the like, a method of manufacturing the same, and a head suspension assembly using the magnetic head.

With the trend to a larger capacity and a smaller size of hard disk drives (HDD), heads are required to have a higher sensitivity and larger output. To meet this requirement, magnetic heads using magneto-resistive devices based on a variety of principles are now under development. For example, strenuous efforts have been made to improve characteristics of GMR (Giant Magneto-Resistive) head currently available on the market. On the other hand, intense development is under way for a tunnel magneto-resistive (TMR) head which can be expected to have a resistance changing ratio twice or more higher than the GMR head. The GMR head employs a giant magneto-resistive (GMR) device for a magneto-resistive device, while the TMR head employs a tunnel junction magneto-resistive device (TMR device) for a magneto-resistive device. In addition, a variety of types of magnetic heads are known in the GMR head and TMR head.

Any type of magnetic head which employs a magneto-resistive device comprises a base, and a laminate stacked on the base and including a magneto-resistive device. One surface of the base and an end face of the magneto-resistive device are in face of a magnetic recording medium directly or through a protection film such as a DLC (Diamond-Like-Carbon) film or the like. The surface of the protection film, if provided, forms an air bearing surface (ABS), while the surface of the base and the end face of the magneto-resistive device form the ABS when the protection film is not provided.

In a process of manufacturing the magnetic head described above, a structure including the base and laminate (generally, a bar cut from a wafer, on which a plurality of magnetic heads are arranged in a line (an aggregate of bar-shaped magnetic heads)) undergoes a polishing step for mechanically polishing a surface thereof on the ABS side. This polishing step plays an important role for exposing the end face of the magneto-resistive device on the ABS side for highly sensitively detecting a weak magnetic field from a magnetic recording medium, and simultaneously for defining the height of the magneto-resistive device in the vertical direction relative to the polished surface to provide a specified resistance.

Since the structure is polished using hard particles such as diamond, smear (metal pieces produced during the polishing) is produced on the end face of the laminate including the magneto-resistive device on the ABS side. This smear can form a current path which bypasses the magneto-resistive device. The current path thus formed causes a reduction in the sensitivity and output of the magneto-resistive device, and substantially disables the magneto-resistive device.

To solve this problem, JP-A-11-175927 corresponding to U.S. Pat. No. 6,174,736 discloses a technique for removing the smear by dry etching an end face of a TMR device after it has been mechanically polished. This smear removing technique collectively dry etches the overall end face of a laminate including the TMR device, as well as the overall end face of a substrate (corresponding to the base) which supports the laminate when the end face of the TMR device is dry etched.

Now, a method of manufacturing a magnetic head using the conventional smear removing technique mentioned above will be described with reference to FIGS. 41A, 41B, 41C. FIGS. 41A, 41B, 41C are explanatory diagrams schematically illustrating essential steps in the manufacturing method.

Referring first to FIG. 41A, a reference numeral 200 denotes a bar cut from a wafer as described above. The bar 200 comprises a base 201, and a laminate 202 stacked on the base 201. The laminate 202 includes a TMR device 203. The ABS side (lower side in the figure) of the bar 200 illustrated in FIG. 41A is mechanically polished. The polishing results in a step "a" between a lower surface 202*a* of the laminate 202 including a lower surface 203*a* of the TMR device 203 and a surface 201*a* of the base 201 close to a magnetic recording medium, as illustrated in FIG. 41B. The step "a" as illustrated is caused by a polishing rate of the base 201 lower than a polishing rate of the laminate 202 from the fact that the base 201 (generally made of $Al_2O_3$—TiC, SiC, or the like) is harder than the laminate 202 (made of a magnetic material such as NiFe, sendust, CoFeNi, or the like). The step "a" after polishing is on the order of 3 nm to 5 nm.

For removing smear produced by the polishing, the overall lower surface of the polished bar 200 as illustrated in FIG. 41B is collectively dry etched by parallel flat sputter etching using an Ar gas, ion beam etching using the Ar gas, ion milling using the Ar gas, or the like. Consequently, the step "a" is extended to approximately 10–20 nm, as illustrated in FIG. 41C. This is because in such dry etching, the base 201 is etched at a lower rate than the laminate 202, with a large ratio of the etching rate of the later to that of the former.

Conventionally, however, no attention has been paid to the fact that the step "a" is extended by the dry etching for removing smear. The step "a" having the size of as much as 10–20 nm would cause a failure in supporting the future trend of increasingly higher recording density. For improving more and more the recording density, the step "a" must be minimized to make a magnetic spacing (spacing between an end face of a magneto-resistive device close to a magnetic recording medium and a magnetic layer of the magnetic recording medium) as narrow as possible. These aspects similarly apply to a variety of other magnetic heads as well as the TMR head.

JP-A-11-175927 also discloses that an end face of a TMR device is dry etched by using a Cl-based, a F-based, and an $O_2$ gas. However, the use of these gases results in the formation of an insensitive region (erosion, oxide films, and the like) on the surface of the TMR device, causing an unfavorable reduction in output when the recording density is higher.

SUMMARY

It is an object of the present invention to provide a magnetic head which is capable of generating a high output signal from a magneto-resistive device even on a narrow track to increase the recording density, a method of manufacturing the same, and a head suspension assembly using the magnetic head.

A method of manufacturing a magnetic head according to a first aspect of the present invention is provided for manufacturing a magnetic head having a base, and a laminate stacked on the base and including a magneto-resistive device. The method includes a polishing step for mechanically polishing a surface of a structure including the base and the laminate close to a magnetic recording medium, wherein the surface of the structure includes an end face of the laminate including an end face of the magneto-resistive device and a surface of the base; and a first etching step after said polishing step for selectively etching a first region on the surface of the structure close to the magnetic recording medium, wherein the first region includes the surface of the base but not including the end face of the magneto-resistive device.

The etching conducted in the first etching step may include either wet etching or dry etching. When the wet etching is conducted, an etchant for use in the wet etching is not particularly limited, but may be an etchant which includes, for example, at least one of acid and alkali. Alternatively, the dry etching, when conducted, is not particularly limited in type, but may be, for example, reactive ion etching, reactive ion beam etching, ion beam etching, sputter etching, or ion milling.

According to the first aspect, since the first region is selectively etched after the polishing step, the difference in level can be adjusted between the surface of the base close to the magnetic recording medium and the end face of the magneto-resistive device close to the magnetic recording medium. Therefore, even if the mechanical polishing of the structure causes a difference in level between the surface of the base close to the magnetic recording medium and the end face of the magneto-resistive device close to the magnetic recording medium, it is possible to eventually reduce the difference in level between the surface of the base close to the magnetic recording medium, which forms the ABS through the protection film or in direct, and the end face of the magneto-resistive device close to the magnetic recording medium. In addition, even if the structure is etched for removing smear after the structure has been mechanically polished, with a relatively large difference in etching rate between the base and the magneto-resistive device, it is possible to eventually reduce the difference in level between the surface of the base close to the magnetic recording medium, which forms the ABS through the protection film or in direct, and the end face of the magneto-resistive device close to the magnetic recording medium.

Consequently, the method according to the first aspect can manufacture a magnetic head which can generate a high output signal from the magneto-resistive device even on a narrow track to increase the recording density.

The method of manufacturing a magnetic head according to second aspect of the present invention further comprises, in the first aspect, a second etching step after the polishing step and before or after the first etching step for entirely etching the surface of the structure close to the magnetic recording medium.

According to the second aspect, the second etching step can remove smear produced in the polishing step.

The etching conducted in the second etching step may include either wet etching or dry etching. When the wet etching is conducted, an etchant for use in the wet etching is not particularly limited, but may be an etchant which includes, for example, at least one of acid and alkali. Alternatively, the dry etching, when conducted, is not particularly limited in type, but may be, for example, ion beam etching, sputter etching, or ion milling. When the dry etching is conducted, an etching gas for use therein is preferably, one type of gas or a mixture of two or more gases selected from a group comprising He gas, Ne gas, Ar gas, Kr gas and Xe gas. Since the use of such a rare gas for the etching gas avoids the formation of an insensitive region (erosion, oxide film, and the like) on the surface of the magneto-resistive device, it is possible to manufacture a magnetic head which can generate a high output signal from the magneto-resistive device even on a narrow track to increase the recording density. The feature described above applies to a second etching step in a ninth aspect, later described.

In the method of manufacturing a magnetic head according to a third aspect of the present invention, the laminate comprises a first and a second magnetic shield film formed on the base to sandwich the magneto-resistive device, the surface of the structure close to the magnetic recording medium includes end faces of the first and second magnetic shield films close to the magnetic recording medium, and the first region does not include end faces of the first and second magnetic shield films, in the first or second aspect.

According to the third aspect, since not only the end face of the magneto-resistive device but also the end faces of the magnetic shield films are removed from a region to be selectively etched (the first region), an increase in difference in level is avoided between the end faces of the first and second magnetic shield films close to the magnetic recording medium and the end face of the magneto-resistive device close to the magnetic recording medium. This is preferable because the magnetic shield effect is not degraded.

In the method of manufacturing a magnetic head according to a fourth aspect, the first etching step in any of the first to third aspects comprises the steps of forming a resist on a region on the surface of the structure close to the magnetic recording medium except for the first region before the etching in the first etching step, and removing the resist after the etching in the first etching step.

The fourth aspect gives an example in which a resist is employed for an etching mask for use in the first etching step. However, in the first to third aspects, the etching mask is not limited to the resist.

In the method of manufacturing a magnetic head according to a fifth aspect of the present invention, the first region in any of the first to fourth aspects substantially solely includes the surface of the base on the surface of the structure close to the magnetic recording medium.

According to the fifth aspect, since the region to be selectively etched (the first region) is substantially limited to the surface of the base, no groove will be formed in the ABS. It is therefore possible to manufacture a magnetic head which is highly stable in its floating.

In the method of manufacturing a magnetic head according to a sixth aspect of the present invention, the first region in any of the first to fourth aspects includes a predetermined region on the end face of the laminate close to the base on the surface of the structure close to the magnetic recording medium.

According to the sixth aspect, while the magnetic head is slightly degraded in the floating stability due to a groove formed in the ABS (air bearing surface) as compared with the fifth aspect, such a groove will not adversely affect in practice as long as its depth is not excessively large.

The method of manufacturing a magnetic head according to a seventh aspect of the present invention further comprises, in any of the first to six aspects, the step of setting a target region for the first region, the target region including a region on the surface of the base on the surface of the structure close to the magnetic recording medium, and a predetermined region close to the base in a region on the end face of the laminate on the surface of the structure close to the magnetic recording medium.

The target region for setting the first region can be shifted from the actual first region due to variations involved in the manufacturing. However, the target region set in a manner of the seventh aspect is preferable because such setting reduces the rate at which defective products are produced due to the variations, and increases the yield rate.

In the method of manufacturing a magnetic head according to an eighth aspect of the present invention, the predetermined region in the target region set for the first region in the seventh aspect has a width in a range of 0.05 µm to 3.0 µm.

The target region set in a manner of the eighth aspect for setting the first region is preferable because such setting can improve the yield rate while maintaining the magnetic head floating stability.

The method of manufacturing a magnetic head according to a ninth aspect of the present invention further comprises, in the first aspect, a second etching step after the polishing step and before or after the first etching step for selectively etching a second region on the surface of the structure close to the magnetic recording medium, the second region not including the surface of the base but including the end face of the magneto-resistive device. The etching conducted in the second etching step may include either wet etching or dry etching.

According to the ninth aspect, the second etching step can remove smear produced in the polishing step. In the second aspect, the etching step is a combination of the selective etching of the first region and the entire etching, whereas in the ninth aspect, the etching step is a combination of the selective etching of the first region and the selective etching of the second region. The ninth aspect can also provide similar advantages to those of the second aspect.

In the method of manufacturing a magnetic head according to a tenth aspect of the present invention, the base is made of a material in a group comprising $Al_2O_3$—TiC and SiC in any of the first to ninth aspects. Since the base is a main component of a slider of the magnetic head, the base is preferably made of a hard material such as $Al_2O_3$—TiC and SiC as described in the tenth aspect.

A magnetic head according to an eleventh aspect of the present invention comprises a base having a surface, located close to a magnetic recording medium, for forming an air bearing surface directly or through a protection film, and a laminate stacked on the base and including a magneto-resistive device, wherein the surface of the base close to the magnetic recording medium differs in level from an end face of the magneto-resistive device close to the magnetic recording medium by 2 nm or less in absolute value.

According to the eleventh aspect, since the absolute value of the level in difference is equal to or less than 2 nm, a magnetic spacing is significantly reduced as compared with before, so that the magnetic head can generate a high output signal even on a narrow track to increase the recording density.

A magnetic head according to a twelfth aspect of the present invention comprises a base having a surface, located close to a magnetic recording medium, for forming an air bearing surface directly or through a protection film, and a laminate stacked on the base and including a magneto-resistive device, and a first and a second magnetic shield film formed on the base to sandwich the magneto-resistive device, wherein the surface of the base close to the magnetic recording medium differs in level from an end face of at least one of the first and second magnetic shield films close to the magnetic recording medium by 2 nm or less in absolute value.

Generally, the magnetic shield film is made of a material such as NiFe, CoFeNi, sendust and the like, while the magneto-resistive device is made of Ni, Co, Fe, Mn, Pt and the like. Since both the magnetic shield films and the magneto-resistive device are made of magnetic materials based on transition metals, both components present a small difference in the etching rate. Consequently, the end faces of the first and second magnetic shield films close to the magnetic recording medium are substantially equal in level to the end face of the magneto-resistive device close to the magnetic recording medium. Thus, in the twelfth aspect, the surface of the base close to the magnetic recording medium differs in level from the end face of at least one magnetic shield film close to the magnetic recording medium by 2 nm or less in absolute value, so that the absolute value of the difference in level is reduced between the surface of the base close to the magnetic recording medium and the end face of the magneto-resistive device close to the magnetic recording medium, as is the case with the eleventh aspect. Thus, the magnetic head according to the twelfth aspect has a magnetic spacing significantly reduced as compared with before, and therefore can generate a high output signal even on a narrow track to increase the recording density.

In the magnetic head according to a thirteenth aspect of the present invention, the laminate includes a groove formed on the end face close to the magnetic recording medium, the groove extending along a boundary between the surface of the base close to the magnetic recording medium, the surface forming the air bearing surface directly or through the protection film, and the end face of the laminate close to the magnetic recording medium in the eleventh or twelfth aspect.

The magnetic head structured to have the groove as described in the thirteenth aspect can be manufactured by the manufacturing method according to the aforementioned sixth aspect, so that the magnetic head can be manufactured at a higher yield rate to reduce the cost.

A magnetic head according to a fourteenth aspect of the present invention comprises a base having a surface, located close to a magnetic recording medium, for forming an air bearing surface directly or through a protection film, and a laminate stacked on the base and including a magneto-resistive device, wherein the laminate includes a groove formed on an end face close to the magnetic recording medium, the groove extending along a boundary between the surface of the base close to the recording medium and the end face of the laminate close to the recording medium. The magnetic head according to the fourteenth aspect can also provide similar advantages to those of the thirteenth aspect.

In the magnetic head according to a fifteenth aspect of the present invention, the groove has a depth of 30 nm or less with reference to the surface of the base close to the magnetic recording medium, the surface forming the air bearing surface directly or through the protection film in the thirteenth or fourteenth aspect.

In the thirteenth and fourteenth aspects, the groove having an excessive depth would largely affect the magnetic head floating stability. The influence affecting the floating stability can be suppressed by setting the depth of the groove as described in the fifteenth aspect. For further improving the magnetic head floating stability, the depth of the groove is preferably 20 nm or less, and more preferably 10 nm or less.

A head suspension assembly according to a sixteenth aspect of the present invention comprises a magnetic head and a suspension for supporting said magnetic head near a leading end thereof, wherein the magnetic head is manufactured by the manufacturing method according to any of the first to tenth aspects, or the magnetic head is the magnetic head according to any of the eleventh to fifteenth aspects. According to the sixteenth aspect, the head suspension assembly can increase the recording density of a magnetic disk apparatus and the like.

DETAILED DESCRIPTION OF EMBODIMENTS

In the following, a magnetic head, a method of manufacturing the same, and a head suspension assembly using the magnetic head according to the present invention will be described with reference to the accompanying drawings.

First, a magnetic head according to a first embodiment of the present invention will be described with reference to FIGS. 1 to 3.

Figure 1:
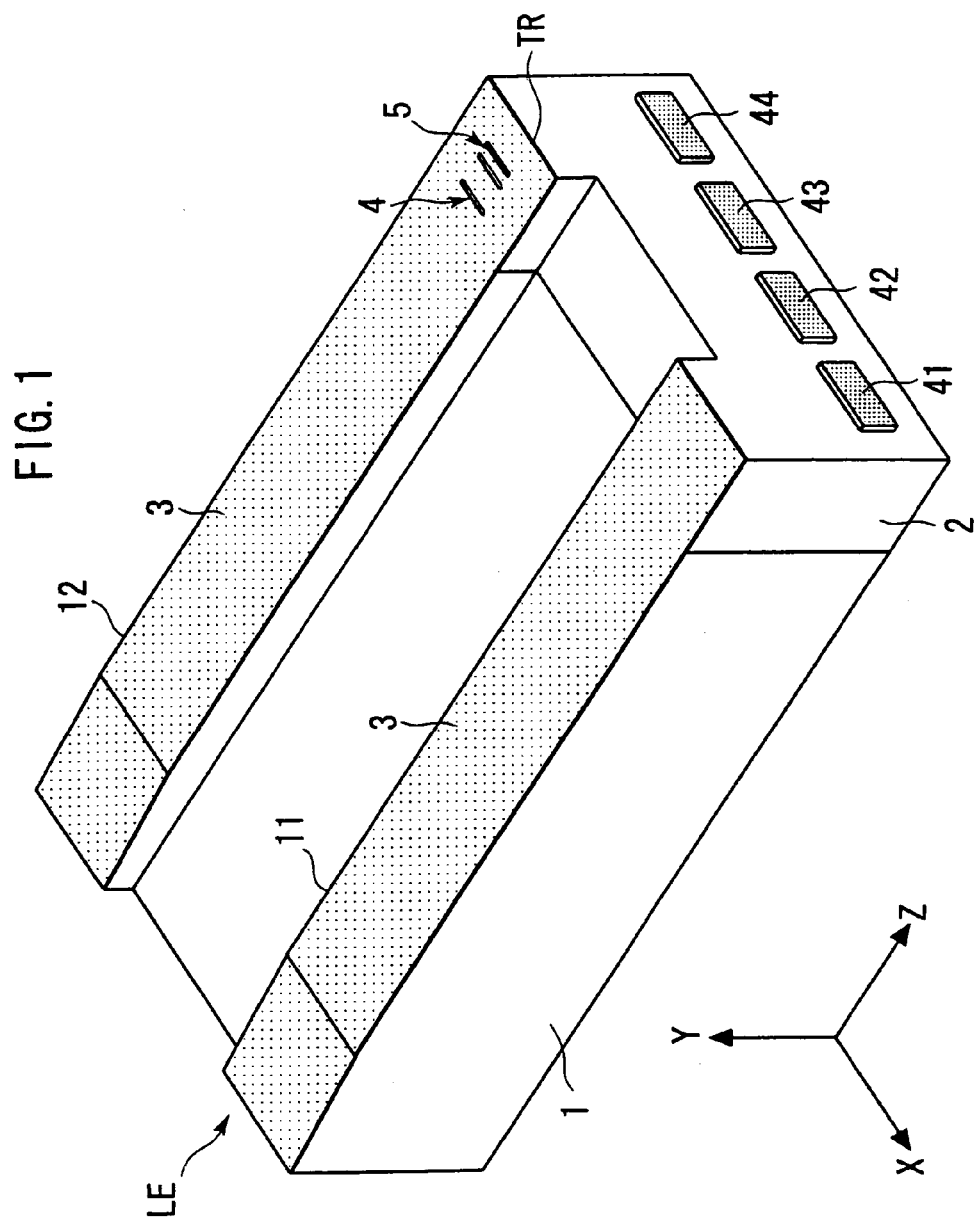
FIG. 1 is a schematic perspective view generally illustrating a magnetic head according to a first embodiment of the present invention.

FIG. 1 is a schematic perspective view generally illustrating the magnetic head according to the first embodiment of the present invention. For the sake of description, an X-axis, a Y-axis and a Z-axis, orthogonal to one another, are defined as shown in FIGS. 1 to 3. The Z-axis matches a direction in which a magnetic recording medium is moved, and an XZ plane is parallel to ABS (air bearing surface). Each of the figures described below also shows the X-axis, Y-axis, and Z-axis corresponding to the X-axis, Y-axis, and Z-axis in FIG. 1, respectively.

Figure 2:
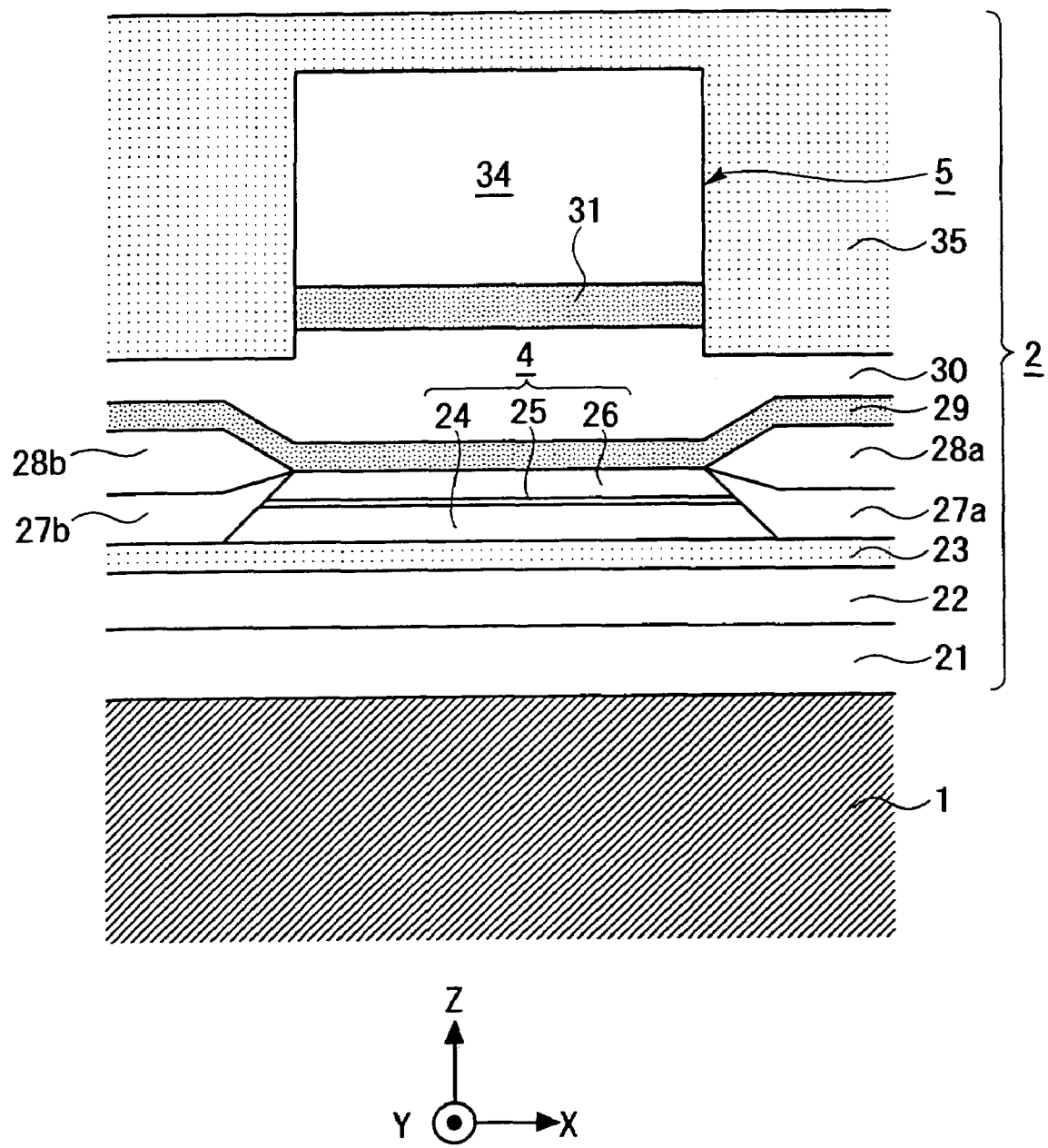
FIG. 2 is a schematic enlarged cross-sectional view diagrammatically illustrating a main portion of the magnetic head illustrated in FIG. 1.

FIG. 2 is a schematic enlarged cross-sectional view along a plane parallel to the XZ plane, diagrammatically illustrating a portion of a GMR device 4 and an inductive magnetic transducing device 5 of the magnetic head illustrated in FIG. 1. FIG. 3 is a schematic enlarged cross-sectional view along a plane parallel to a YZ plane, diagrammatically illustrating the portion of the GMR device 4 and inductive magnetic transducing device 5 of the magnetic head illustrated in FIG. 1. FIG. 3 also shows the relationship with a magnetic recording medium 90.

The magnetic head according to the first embodiment comprises a base 1 constituting a slider; a laminate 2 stacked on the base 1; and a protection film 3 made of a DLC (Diamond-Like-Carbon) film or the like, and is configured as a composite magnetic head, as illustrated in FIG. 1. The laminate 2 includes a GMR device 4 as a magneto-resistive device which serves to be a magnetic head element for reproduction, and an inductive magnetic transducing device 5 as a magnetic head element for recording. Alternatively, the magnetic head according to the present invention may be a magnetic head exclusive for reproduction which does not comprise a magnetic head element for recording. While the magnetic head according to the first embodiment includes one each of the devices 4, 5, the devices 4, 5 are not particularly limited in number.

The magnetic head has rails 11, 12 on a surface opposite to the magnetic recording medium 90, and the surfaces of the rails 11, 12 define air bearing surfaces (ABS). In the example illustrated in FIG. 1, there are two rails 11, 12 but the number of rails is not limited to two. For example, the slider 1 may have one to three rails, or the ABS may be a flat surface without rails. In addition, the ABS may be formed in a variety of geometric shapes for improving a floating characteristic and the like. The magnetic head according to the present invention may have any type of ABS.

In the first embodiment, the protection film 3 is applied only on the surfaces of the rails 11, 12, so that the surface of the protection film 3 defines the ABS. Alternatively, the protection film 3 may be applied on the entire surface of the magnetic head opposite to the magnetic recording medium. While the protection film 3 is preferably provided, the protection film 3 may not be necessarily provided. When the protection film 3 is not provided, the ABS is defined by the surface of the base 1 close to the magnetic recording medium and the surface of the laminate 2 close to the magnetic recording medium.

The GMR device 4 and inductive magnetic transducing device 5 are disposed on the rail 12 near an air outlet end TR, as illustrated in FIG. 1. A direction in which the magnetic recording medium is moved is identical to the Z-axis direction in FIG. 1, and also identical to a direction in which air flows when the magnetic recording medium is rapidly moved. Air enters from an air inlet end LE and exits from the air outlet end TR. The slider 1 is provided on an end face of the air outlet end TR with draw-out electrodes 41, 42 connected to the GMR device 4, and draw-out electrodes 43, 44 connected to the inductive magnetic transducing device 5.

Figure 3:
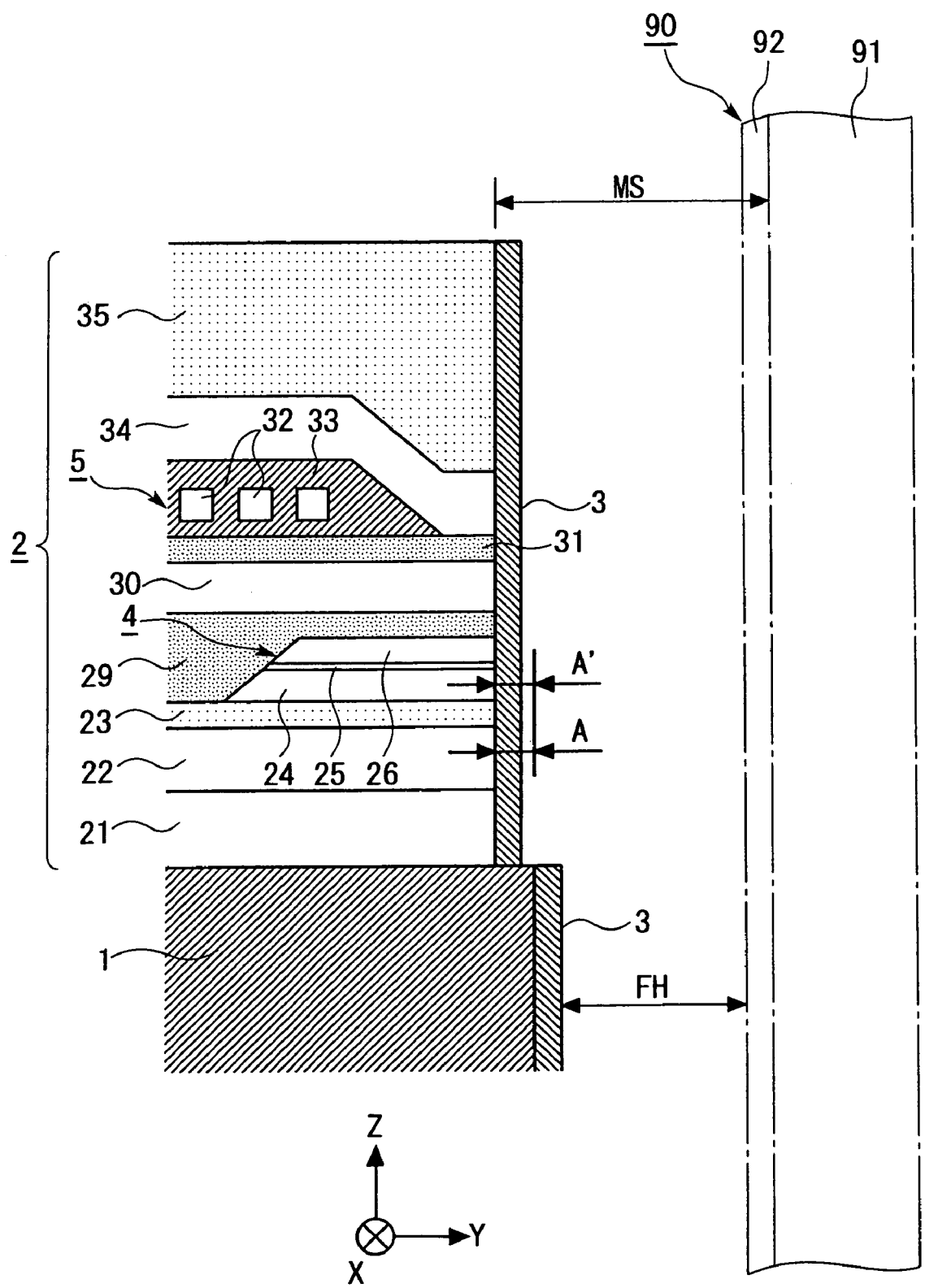
FIG. 3 is another enlarged cross-sectional view diagrammatically illustrating the main portion of the magnetic head illustrated in FIG. 1.

As illustrated in FIGS. 2 and 3, the GMR device 4 and inductive magnetic transducing device 5 are laminated on an underlying layer 21 deposited on the base 1 within the laminate 2 stacked on the base 1. The base 1 is generally made of a hard material such as AlTic ($Al_2O_3$—TiC), SiC or the like. The underlying layer 21 is preferably made, for example, of alumina ($Al_2O_3$) of 5 μm or less in thickness or 3 μm or less in thickness. The underlying layer 21 may not be provided in some cases.

As illustrated in FIGS. 2 and 3, the GMR device 4 comprises a lower ferromagnetic layer 24, a non-magnetic layer 25, and an upper ferromagnetic layer 26 laminated in order from the base 1. These layers 24, 25, 26 constitute a spin valve film. As illustrated in FIG. 3, end faces of these layers 24, 25, 26 close to the magnetic recording medium define the end face of the GMR device 4 close to the magnetic recording medium. Though not shown in the figures, the lower ferromagnetic layer 24 is comprised, for example, of laminated layers of different materials. For example, the lower ferromagnetic layer 24 is comprised of a Ta layer, an NiFe layer, and a CoFe layer laminated in order from the base 1. Used as a material for the non-magnetic layer 25 may be, for example, Cu, Au, Ag, or the like. Though not shown in the figures, the upper ferromagnetic layer 26 is comprised, for example, of laminated layers of different materials. For example, the upper ferromagnetic layer 26 is comprised of a CoFe layer, a Ru layer, a CoFe layer, a PtMn layer, and a Ta layer laminated in order from the base 1. For example, the lower ferromagnetic layer 24 has a thickness in a range of 5 nm to 50 nm; the non-magnetic layer 25 in a range of 1 nm to 3 nm; and the upper ferromagnetic layer 26 in a range of 5 nm to 50 nm.

As illustrated in FIG. 2, hard magnetic layers 27a, 27b made of Cr/CoPt (cobalt platinum alloy), Cr/CoCrPt (cobalt chromium platinum alloy), TiW/CoPt, TiW/CoCrPt, or the like are disposed on both sides of the layers 24, 25, 26, respectively, as magnetic domain control films. Lead layers 28a, 28b are disposed on the hard magnetic layers 27a, 27b, respectively. With this configuration, a sense current flowing into the GMR device 4 can be drawn out from the draw-out electrodes 41, 42 through the hard magnetic layers 27a, 27b and lead layers 28a, 28b.

As illustrated in FIGS. 2 and 3, the GMR device 4 is sandwiched between a lower magnetic shield layer 22 and an upper magnetic shield layer 30 laminated on the underlying layer 21 through a lower insulating layer 23 and an upper insulating layer 29. Likewise, as illustrated in FIG. 2, the hard magnetic layers 27a, 27b and lead layers 28a, 28b are also sandwiched between the magnetic shield layers 22, 30 through the insulating layers 23, 29. The magnetic shield layers 22, 30 are made of a magnetic material such as NiFe, respectively. For example, the lower magnetic shield layer 22 has a thickness in a range of 1 μm to 3 μm, while the upper magnetic shield layer 30 has a thickness in a range of 1 μm to 4 μm. The upper magnetic shield layer 30 also functions as a lower pole of a recording head unit including the inductive magnetic transducing device 5. Alternatively, the lower pole may be provided separately from the upper magnetic shield layer 30, and an $Al_2O_3$ layer or the like may be interposed between both. For example, the insulating layers 23, 29 have thicknesses in a range of 10 nm to 100 nm, respectively, and made of $Al_2O_3$, AlN (aluminum nitride), or $SiO_2$, respectively.

As illustrated in FIGS. 2 and 3, the inductive magnetic transducing device 5 comprises the upper magnetic shield layer 30; a gap layer 31 made of alumina or the like; a thin film coil 32; an insulating film 33 surrounding the thin film coil 32; an upper magnetic layer 34 made of NiFe or the like, and a protection layer 35 made of alumina or the like. Leading ends of the upper magnetic shield layer 30 and upper magnetic layer 34 close to the magnetic recording medium are a lower pole and an upper pole which oppose across a gap layer 31 having a small thickness, and information is written on the magnetic recording medium at the lower pole and upper pole. The upper magnetic shield layer 30 and upper magnetic layer 34 have their yokes coupled to each other to complete a magnetic circuit in a back gap (not shown) on the opposite side of the lower pole and upper pole. The thin film coil 32 is formed within the insulating film 33 as spirally wound about a joint of the yokes. Both ends of the thin film coil 32 are electrically connected to the draw-out electrodes 43, 44. The number of turns and the number of films of the thin film coil 32 are arbitrary. The inductive magnetic transducing device 5 may also be arbitrary in structure.

In FIG. 3, the magnetic recording medium 90 comprises a magnetic layer 91 and a protection film 92. A magnetic spacing MS is determined by the thickness of the protection film 92, the thickness of the protection film 3, a head floating amount (flying height) FH, and a level difference A'. For improving the recording density, the magnetic spacing MS must be narrowed down.

As illustrated in FIG. 3 the level difference A' refers to the difference in level between the surface of the base 1 forming the ABS through the protection film 3 close to the magnetic recording medium 90 (in the first embodiment, the surface of the base 1 on the rails 11, 12 close to the magnetic recording medium 90), and the end face of the GMR device 4 close to the magnetic recording medium 90. The magnetic spacing MS can be reduced more as the level difference A' is smaller, thereby improving the recording density. In the first embodiment, the absolute value of the level difference A' is preferably 2 nm or less (therefore, either of the surfaces may be higher than the other). Alternatively, the absolute value of the difference in level (level difference) A between the surface of the base 1 forming the ABS through the protection film 3 close to the magnetic recording medium 90 and the end face of at least one of the magnetic shield layers 22, 30 close to the magnetic recording medium 90 is preferably 2 nm or less. In the first embodiment, the end face of the GMR device 4 close to the magnetic recording medium 90 levels substantially with the end faces of the magnetic shield layers 22, 30 close to the magnetic recording medium 90.

While FIG. 3 shows that the end face of the laminate 2 close to the magnetic recording medium 90 is identical in level at any location, actually, portions made of different materials are slightly different in level.

Figure 4:
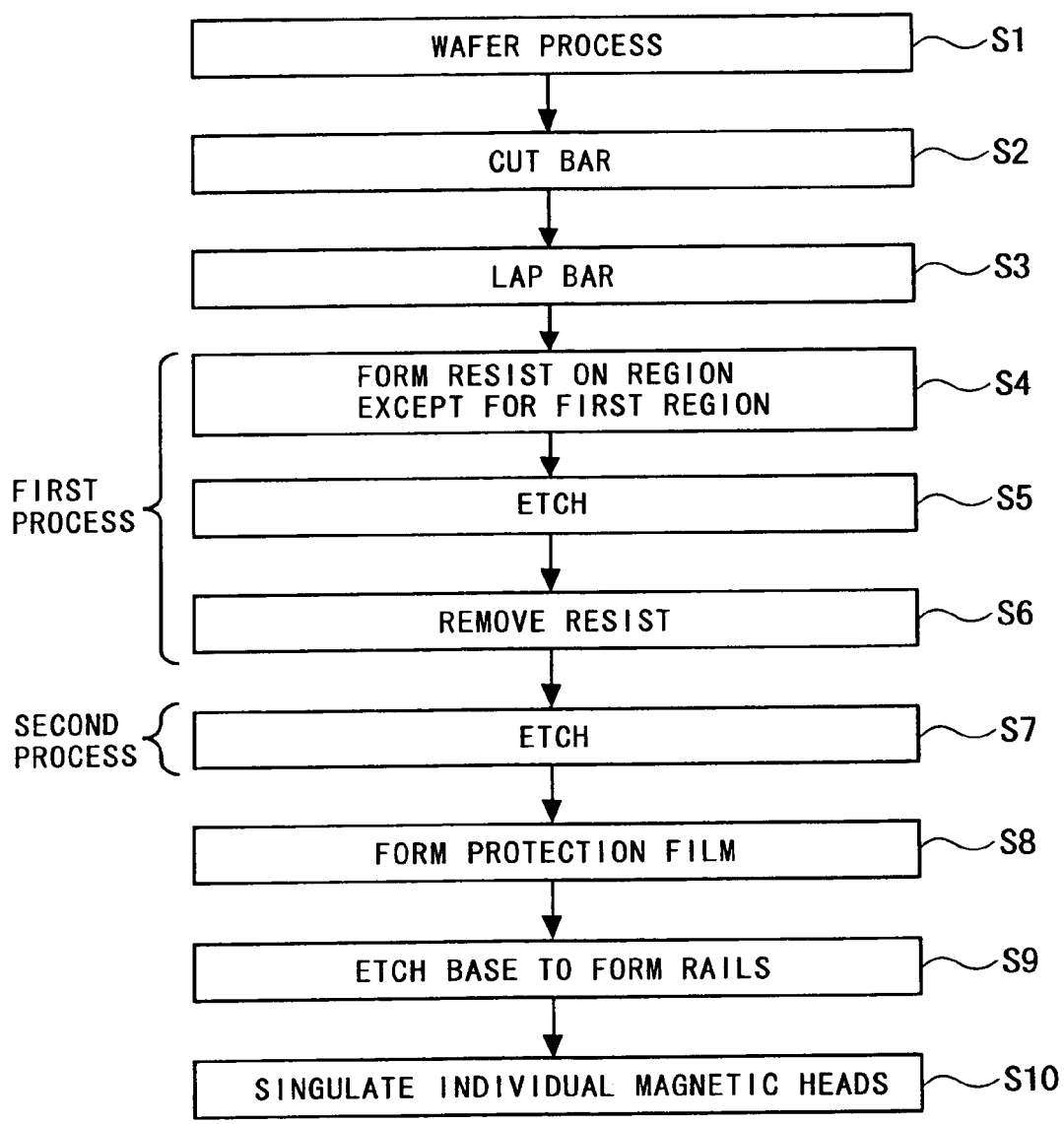
FIG. 4 is a flow chart generally illustrating an exemplary method of manufacturing the magnetic head illustrated in FIG. 1.

Next, an exemplary method of manufacturing the magnetic head according to the first embodiment will be described with reference to FIG. 4. FIG. 4 is a flow chart generally illustrating the manufacturing method.

First, the manufacturing method begins with a wafer process (step S1). Specifically, a wafer 101 made of $Al_2O_3$—TiC, SiC, or the like is provided for use as the base 1, and the laminate 2 is formed in each of a large number of magnetic head forming areas in matrix on the wafer 101 by using the thin film forming technology and the like.

Figure 6A:
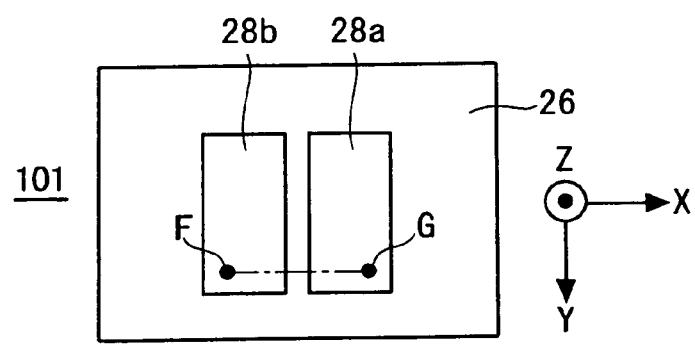
FIGS. 6A, 6B are schematic views illustrating another step which forms part of the wafer process in the method of manufacturing the magnetic head illustrated in FIG. 1.
Figure 6B:
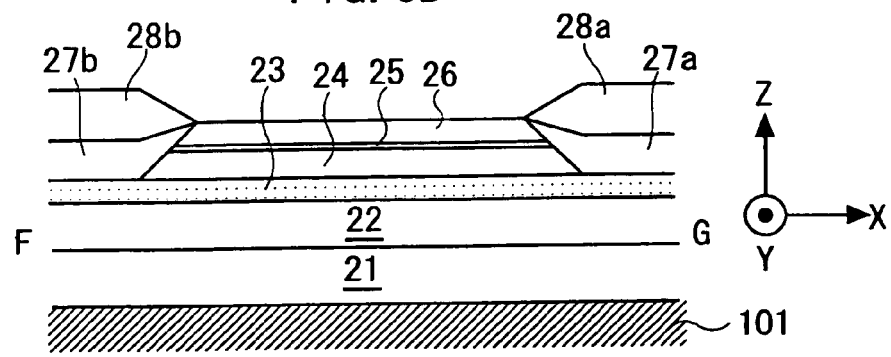
Figure 7A:
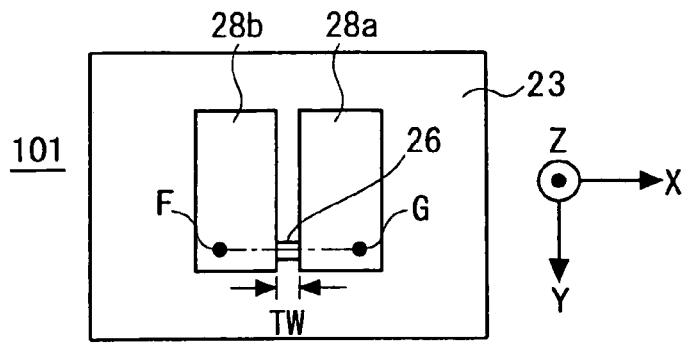
FIGS. 7A, 7B are schematic views illustrating another step which forms part of the wafer process in the method of manufacturing the magnetic head illustrated in FIG. 1.
Figure 7B:
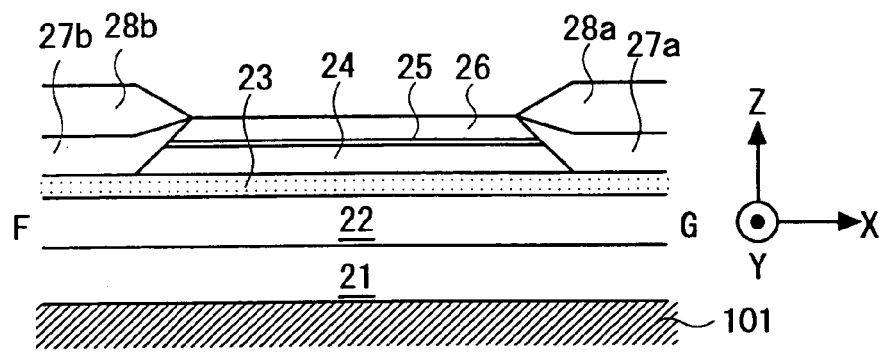
Figure 8A:
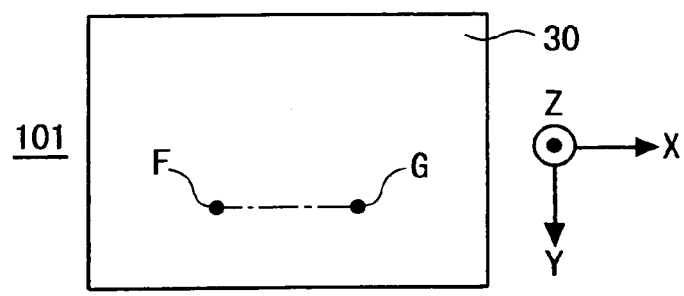
FIGS. 8A, 8B are schematic views illustrating another step which forms part of the wafer process in the method of manufacturing the magnetic head illustrated in FIG. 1.
Figure 8B:
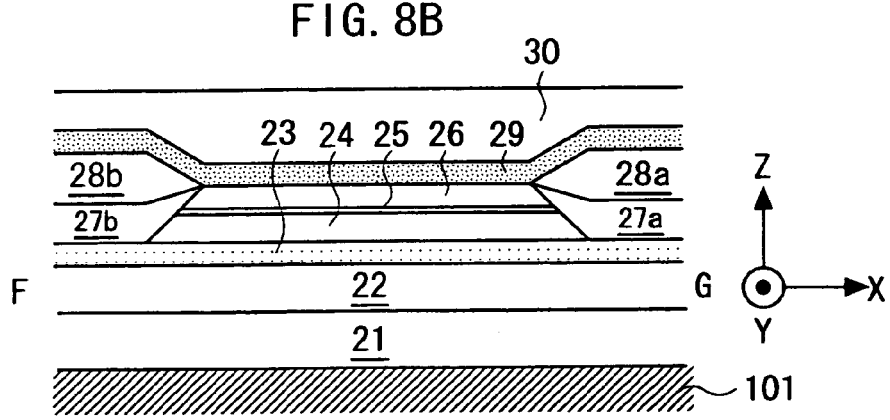
Figure 9:
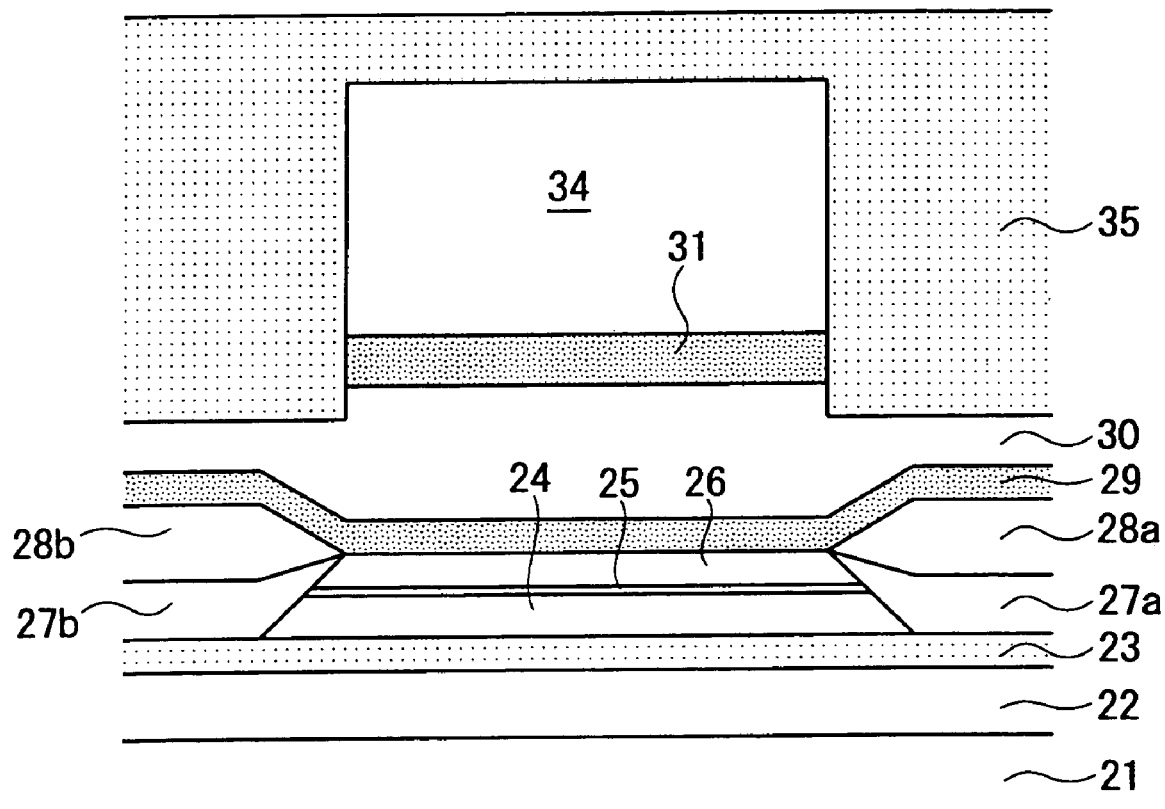
FIG. 9 is a cross-sectional view diagrammatically illustrating another step which forms part of the wafer process in the method of manufacturing the magnetic head illustrated in FIG. 1.

The wafer process will be generally described with reference to FIGS. 5 to 9. FIGS. 5 to 9 are diagrams generally illustrating respective steps which form the wafer process. FIGS. 5A, 6A, 7A, 8A are schematic plan views. FIG. 5B is a schematic cross-sectional view taken along a line F-G in FIG. 5A; FIG. 6B is a schematic cross-sectional view taken along a line F-G in FIG. 6A; FIG. 7B is a schematic cross-sectional view taken along a line F-G in FIG. 7A; and FIG. 8B is a schematic cross-sectional view taken along a line F-G in FIG. 8A. FIG. 9 is a schematic cross-sectional view corresponding to FIG. 8B. In FIG. 7A, TW indicates the horizontal width of the GMR device 4.

Figure 5A:
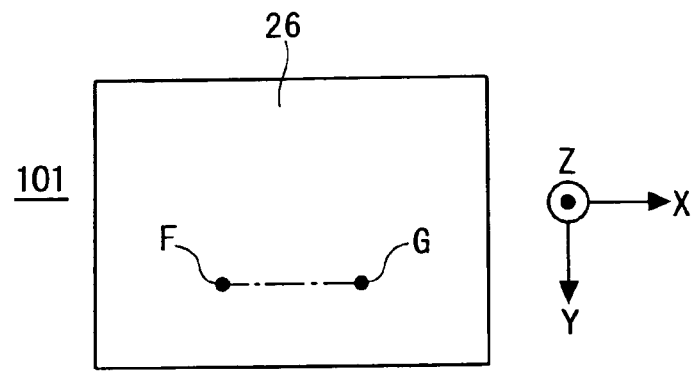
FIGS. 5A, 5B are schematic views illustrating a step which forms part of a wafer process in the method of manufacturing the magnetic head illustrated in FIG. 1.
Figure 5B:
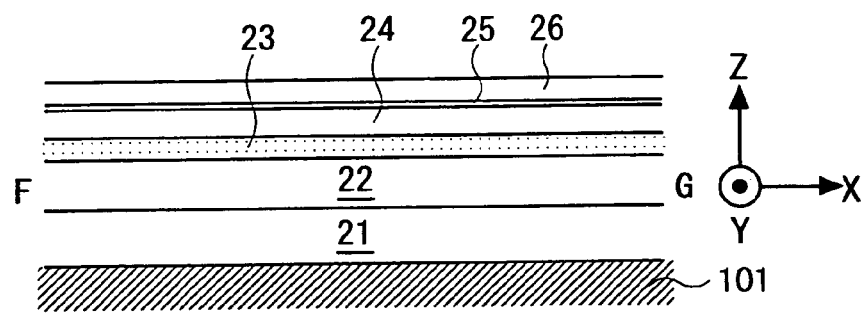

In the wafer process, the underlying layer 21, lower magnetic shield layer 22, lower insulating layer 23, lower ferromagnetic layer 24, non-magnetic layer 25, and upper ferromagnetic layer 26 are first laminated on the wafer 101 in sequence (FIGS. 5A, 5B). Next, the lower ferromagnetic layer 24, non-magnetic layer 25, and upper ferromagnetic layer 26 are partially removed, and the hard magnetic layers 27a, 27b and lead layers 28a, 28b are formed therein (FIGS. 6A, 6B). Next, the lower ferromagnetic layer 24, non-magnetic layer 25, and upper ferromagnetic layer 26 are patterned into the shape of the GMR device 4 by ion milling (FIGS. 7A, 7B). Subsequently, the upper insulating layer 29 and upper magnetic shield layer 30 are formed in sequence (FIGS. 8A, 8B). Finally, the thin film coil 32, gap layer 31, insulating film 33, upper magnetic layer 34, and protection layer 35 are formed (FIG. 9), followed by further formation of electrodes 41–44, and the like. Thus, the wafer process is completed.

Figure 10A:
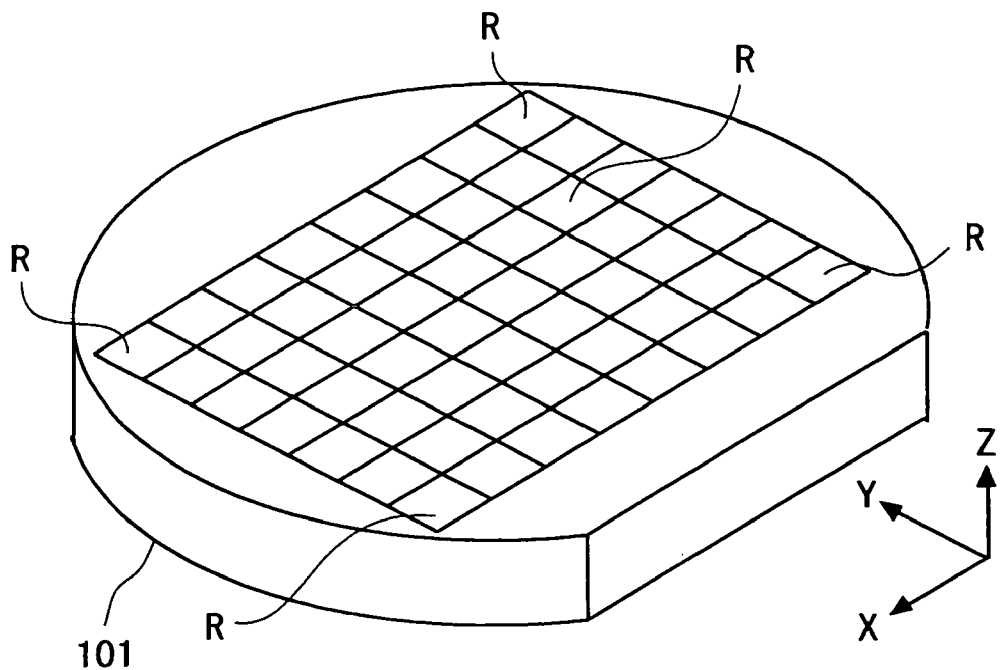
FIGS. 10A, 10B are schematic perspective views diagrammatically illustrating a step of cutting a bar in FIG. 4.

The wafer 101 which has undergone the wafer process is illustrated in FIG. 10A. However, FIG. 10A omits elements formed on the wafer 101 and only illustrates individual magnetic head areas R.

Figure 10B:
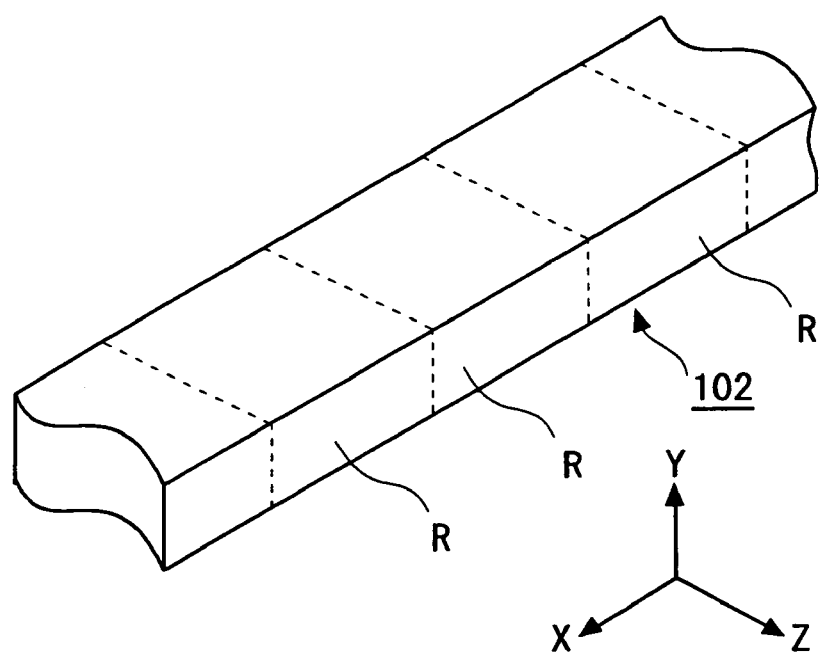
Figure 11:
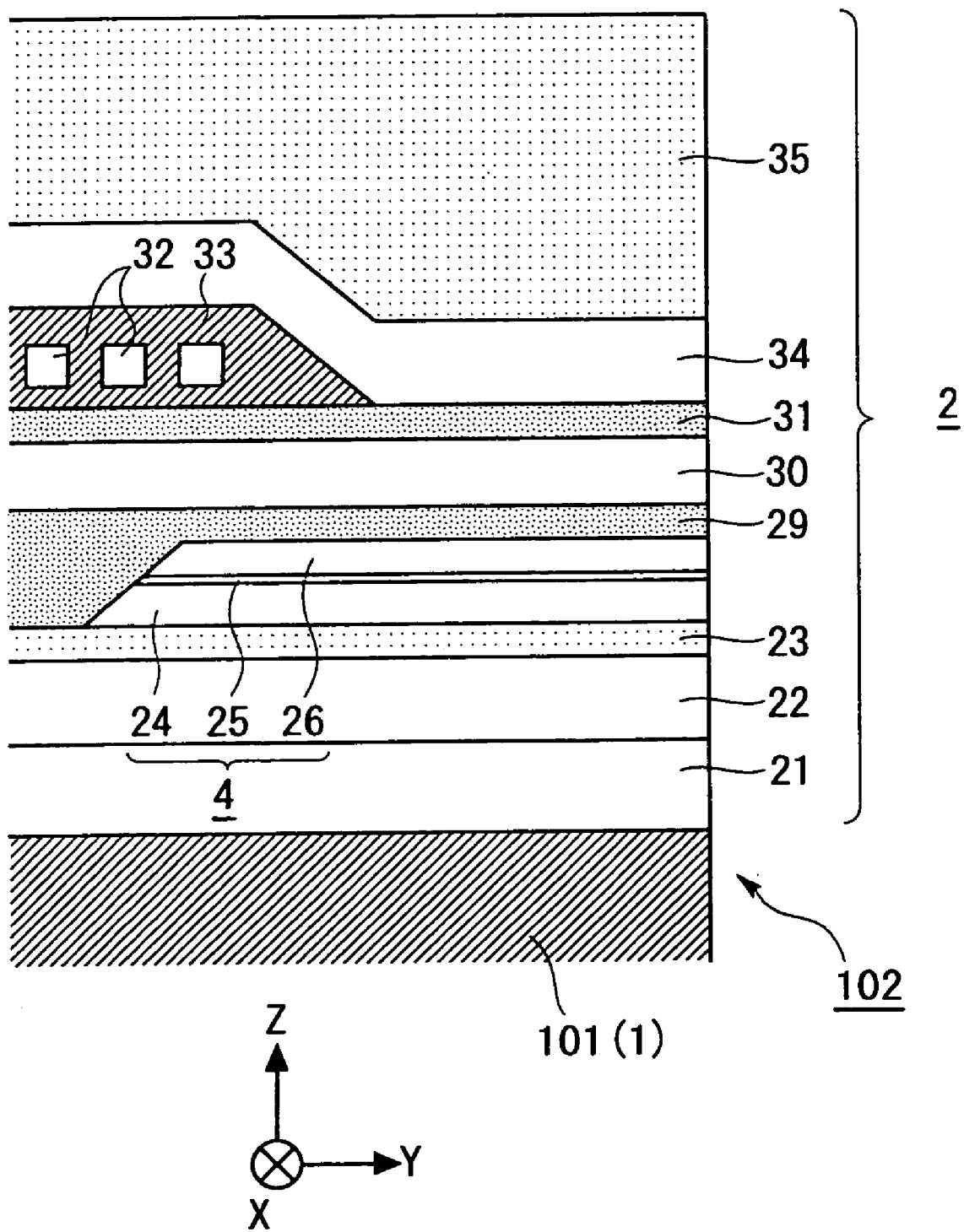
FIG. 11 is a schematic cross-sectional view illustrating the bar cut away by the cutting step in FIG. 4.

As illustrated in FIG. 4, after the wafer process (step S1), the wafer 101 illustrated in FIG. 10A is cut by a diamond cutter or the like into bars (constructions), each of which has a plurality of magnetic head areas R arranged in a line (step S2). FIG. 10B illustrates this bar 102. The upper surface of the bar 102 parallel to the XZ plane in FIG. 10B defines a surface on the ABS side. As illustrated in FIG. 11, end faces of the respective films 21–26, 29–31, 33, 34 and the like appear on this surface. Also, the electrodes 41–44 and the like in FIG. 1 appear on a surface parallel to the XY plane, viewed in front, in FIG. 10B. However, illustration of them is omitted in FIG. 10B.

FIGS. 10A, 10B are schematic perspective views diagrammatically illustrating a step of cutting bars 102 after the wafer process. FIG. 11 is a schematic cross-sectional view along a plane parallel to the YZ plane, illustrating the bar 102 cut away by the cutting step.

Next, the bar 102 illustrated in FIGS. 10B and 11 is lapped (mechanically) on the ABS side for defining the height of the GMR device 4 (MR height) and the like (step S3). For example, in this step, the bar 102 is set on a fixing jig, and pressed against a surface plate. The surface of the bar 102 on the ABS side is polished by dipping a suspension including diamond abrasive grain, and rotating the surface plate.

Figure 12A:
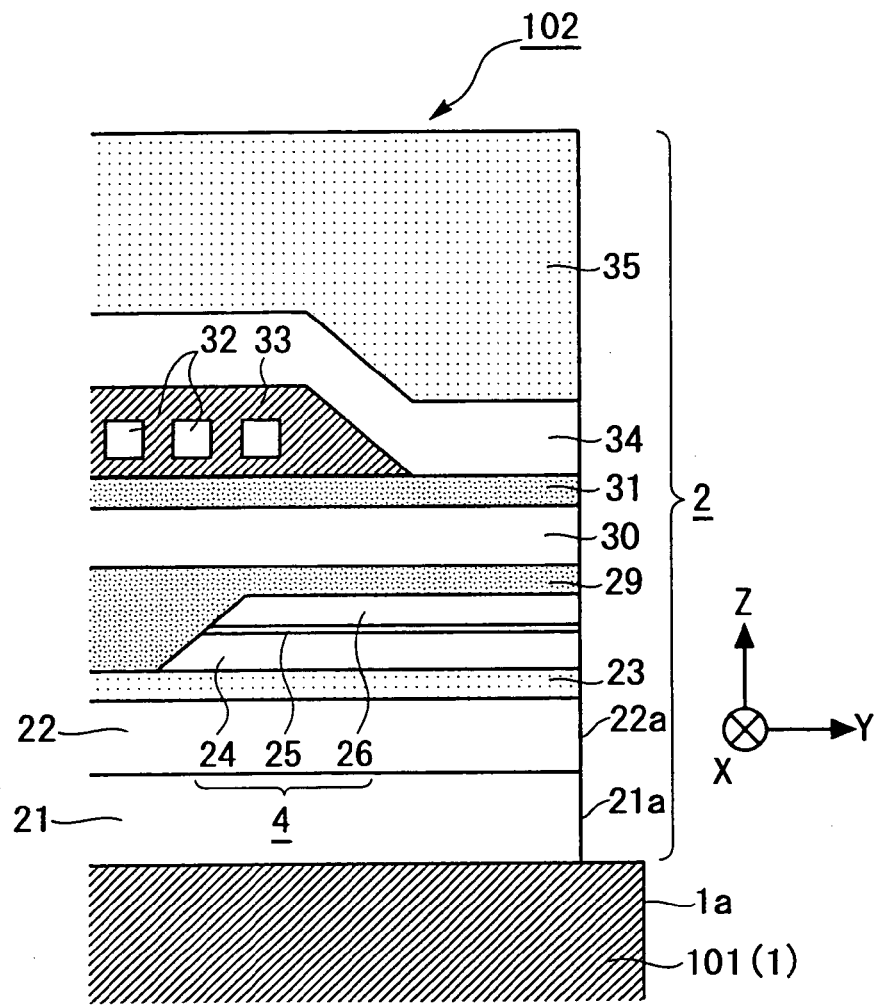
FIGS. 12A, 12B are schematic cross-sectional views illustrating a bar after a lapping step in FIG. 4.

The bar 102 after the lapping step is illustrated in FIG. 12A. FIG. 12A is a schematic cross-sectional view along a plane parallel to the YZ plane, diagrammatically illustrating the lapped bar 102. As illustrated in FIG. 12A, the lapped bar 102 has a level difference (difference in the Y-axis direction) between the end face of the laminate 2 close to the magnetic recording medium 90 and a surface 1a of a wafer portion 101 (since the wafer portion 101 corresponds to the base 1, the wafer portion 101 is called the "base 1" in the following description) close to the magnetic recording medium 90 due to a difference in lapping rate between the base 1 and laminate 2. While FIGS. 12A, 12B illustrate that the end face of the laminate 2 close to the magnetic recording medium 90 is identical in level at any location, actually, portions made of different materials are slightly different in level.

Figure 12B:
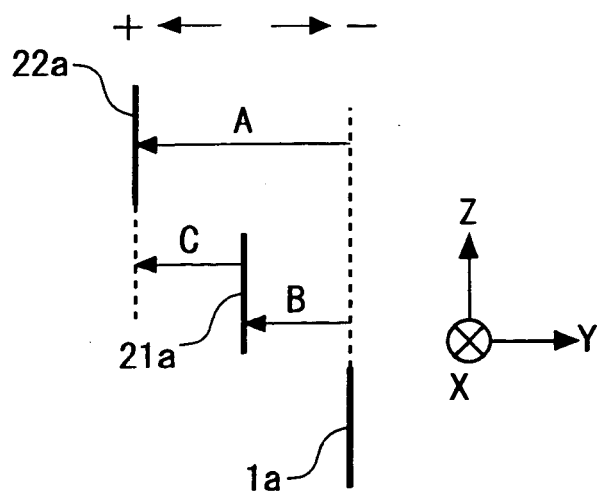

For convenience of description, as illustrated in FIG. 12B, A represents a level difference between the end face 1a of the base 1 and an end face 22a of the lower magnetic shield layer 22 close to the magnetic recording medium 90 (with reference to the end face 1a, "+" indicates that the end face 22a is lower, while "−" indicates that the end face 22a is higher); B represents a level difference between the end face 1a of the base 1 and an end face 21a of the underlying layer 21 close to the magnetic recording medium 90 (with reference to the end face 1a, "+" indicates that the end face 21a is lower, while "−" indicates that the end face 21a is higher); and C represents a level difference between the end face 21a and end face 22a (with reference to the end face 21a, "+" indicates that the end face 22a is lower, while "−" indicates that the end face 22a is higher). Therefore, A=B+C is established. This definition similarly applies to the level difference after first and second processes later described. The end face of the GMR device 4 close to the magnetic recording medium 90 is substantially identical in level with the end face 22a of the lower magnetic shield layer 22.

Generally, smear is produced on the end face (the right-hand end face in FIG. 12A) of the laminate 2 of the lapped bar 102 close to the magnetic recording medium 90. However, in FIG. 12A, the illustration of the smear is omitted.

As illustrated in FIG. 4, the lapping step (step S3) is followed by an etching step for etching the surface of the bar illustrated in FIGS. 12A, 12B close to the magnetic recording medium 90. In this embodiment, the etching step includes first and second processes which are performed in this order. In the first process, a first region including the surface of the base 1 and not including the end face of the GMR device 4 is selectively etched within a region on the surface of the bar 102 close to the magnetic recording medium 90. In the second process, the surface of the bar 102 close to the magnetic recording medium 90 is entirely etched. In the present invention, the order of the first process and second process may be reversed.

Figure 13A:
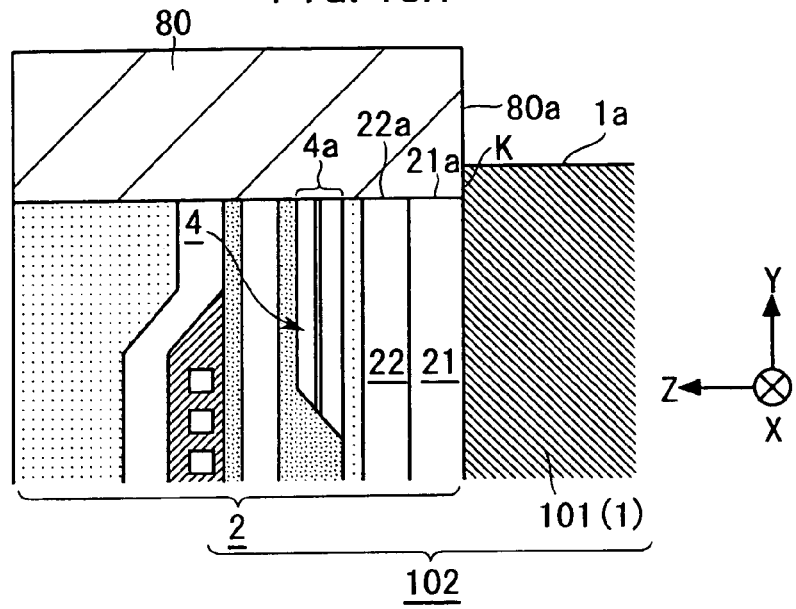
FIGS. 13A, 13B, 13C are schematic cross-sectional views diagrammatically illustrating how the bar is processed in respective steps in a first and a second process in FIG. 4.
Figure 13B:
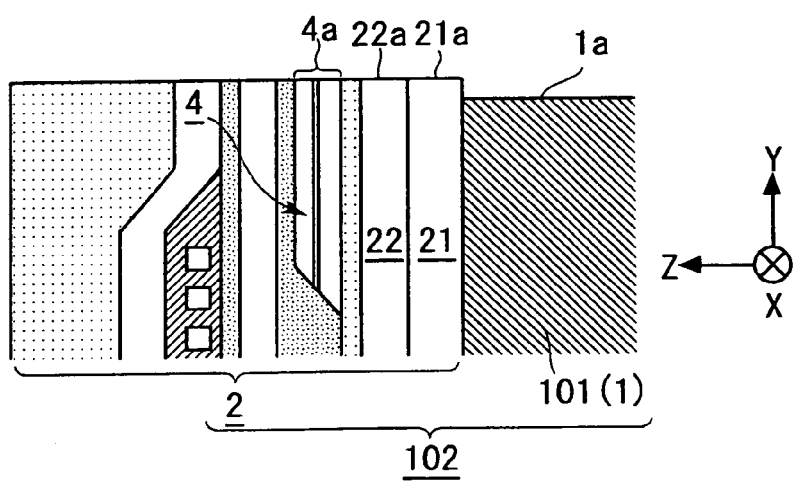
Figure 13C:
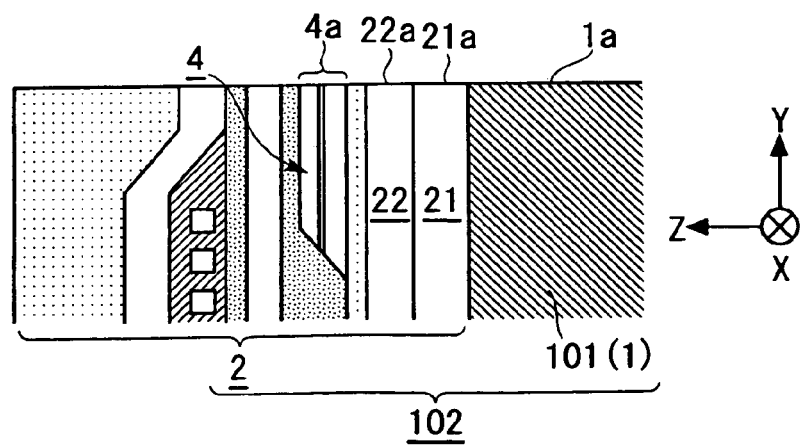

Now, specific examples of the first and second processes will be described with reference to FIGS. 4, 13A, 13B, 13C. FIGS. 13A, 13B, 13C are schematic cross-sectional views diagrammatically illustrating how the bar 102 is processed in respective steps in the first and second processes. First, as illustrated in FIG. 13A, a resist 80 is formed on a region other than the first region on the surface of the bar 102 close to the magnetic recording medium 90 (the upper surface in FIG. 13A) in the first process (step S4). Next, the surface of the bar 102 as illustrated in FIG. 13A close to the magnetic recording medium 90 is etched with the resist 80 used as a mask (step S5). After this etching, the resist 80 is removed (step S6). By now, the first process is terminated. FIG. 13B illustrates the bar 102 after the termination of the first process (after the termination of step S6). The second process performed after the first process includes entirely etching the surface of the bar 102 as illustrated in FIG. 13B close to the magnetic recording medium 90 (the upper surface in FIG. 13B) (step S7). Thus, the second process is terminated. FIG. 13C illustrates the bar 102 after the termination of the second process (after the termination of step S7). When the laminate 2 is etched at a higher rate than the base 1 at step S7, the dry etching at step S5 is conducted in consideration of the difference in the etching rate. Specifically, the base 1 is etched until the level of the surface 1a of the base 1 is lower by a predetermined amount than the level of the end face of the laminate 2 close to the magnetic recording medium 90, as illustrated in FIG. 13B, such that the end face of the laminate 2 close to the magnetic recording medium 90 (particularly, the end face 4a of the GMR device 4) substantially matches the surface 1a of the base 1 in level after step S7, as illustrated in FIG. 13C. On the other hand, when the base 1 and laminate 2 are etched substantially at the same etching rate at step S7, the dry etching at step S5 is conducted in consideration of the etching rate such that the end face of the laminate 2 close to the magnetic recording medium 90 (particularly the end face 4a of the GMR device 4) substantially matches the surface 1a of the base 1, though not shown.

When dry etching is employed at step S5, preferably employed is, for example, reactive ion etching, reactive ion beam etching, ion beam etching, sputter etching, or ion milling. When dry etching is employed at step S7, preferably employed is, for example, ion beam etching, ion milling, or sputter etching. At step S7, a He gas, a Ne gas, an Ar gas, a Kr gas or a Xe gas, or a mixture of two or more of these gases are preferably used as an etching gas. The use of such a rare gas at step S7 will avoid the formation of an insensitive region (erosion, oxide film, and the like) on the end face 4a of the GMR device 4. On the other hand, at step S5, the end face 4a of the GMR device 4 is covered with the resist 80, so that the formation of insensitive region need not be taken into account in selecting an etching gas.

Figure 14:
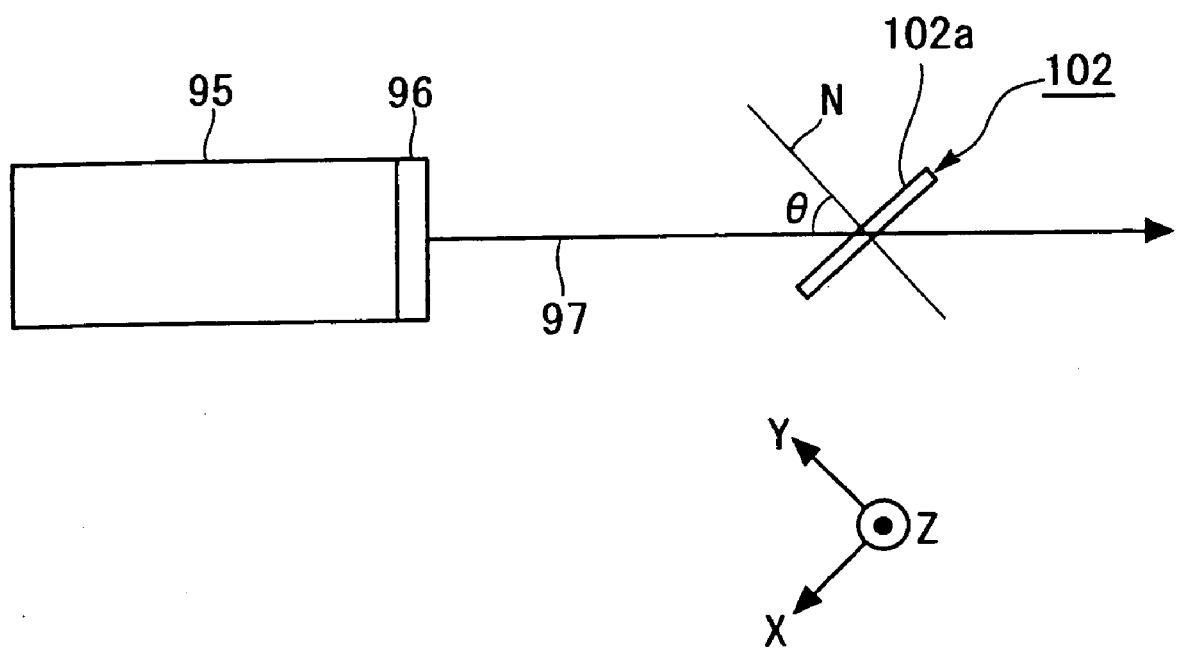
FIG. 14 is an explanatory diagram showing an incident angle of an ion beam.

When ion beam etching or ion milling is employed at step S7, an incident angle θ (see FIG. 14) of the ion beam to a normal direction N to the surface of the bar 102 close to the magnetic recording medium 90 is preferably set in a range of 40☐ to 88☐ for generating a higher output signal from the GMR device 4. More preferably, the incident angle θ is set in a range of 60° to 85°. In FIG. 14, an ion gun 95 includes a grid 96, and the ion beam is incident in a direction indicated by 97 (normal direction to the surface of the grid 95).

At one or both of steps S5, S7, wet etching may be employed instead of dry etching. When wet etching is employed, for example, an etchant including at least one of acid and alkali may be used. The acid may be either inorganic acid or organic acid, and likewise, the alkali may be either inorganic alkali or organic alkali. Inorganic acid may be, for example, hydrofluoric acid, nitric acid, hydrochloric acid, or phosphoric acid, while organic acid may be, for example, acetic acid, lactic acid, oxalic acid, citric acid, or tartaric acid. Inorganic alkali may be, for example, potassium hydroxide or sodium hydroxide, while organic alkali may be, for example, tetramethyl ammonium hydroxide (TMAH). Specific examples of etching solutions are listed in Table 1 below.

TABLE 1 etching solution (1) mixture of hydrofluoric acid of 40 vol. %, aqueous solution of nitric acid of 69 vol. %, and acetic acid, mixed in volume ratio of 20:50:5
(2) mixture of lactic acid, aqueous solution of nitric acid of 68 vol. %, hydrofluoric acid of 48 vol. %, mixed in volume ratio of 30:10:10
(3) mixture of aqueous solution of TMAH of 3 mass % and aqueous solution of sodium hydroxide of 3 mass %
(4) aqueous solution of a mixture of nitric acid and hydrofluoric acid
(5) mixture of hydrochloric acid of 38 vol. % and water, mixed in volume ratio of 1:4
(6) aqueous solution of orthophosphoric acid of 18 vol. %
(7) aqueous solution of a mixture of nitric acid and sodium nitrate
(8) aqueous solution of a mixture of potassium hydroxide and hydrogen peroxide solution
(9) aqueous solution of a mixture of sodium hydroxide and hydrogen peroxide solution After the second process (step S7), the protection layer 3 such as a DLC film or the like is formed on the surface of the bar 102 close to the magnetic recording medium 90 (step S8). Subsequently, regions of the bar 102 are selectively etched except for the rails 11, 12 on the surface of the bar 102 close to the magnetic recording medium 90 to form the rails 11, 12 (step S9). Finally, bar 102 is mechanically singulated into individual magnetic heads by machining (step S10). Thus, the magnetic head according to the first embodiment is completed.

The aforementioned FIGS. 13A, 13B, 13C illustrate an example in which a region to be etched at step S7 (the first region) is actually set to only the surface 1a of the base 1. Specifically, as illustrated in FIG. 13A, the resist 80 is formed just on the end face of the laminate 2 close to the magnetic recording medium 90, and the position of an end face 80a of the resist 80 close to the base 1 in the Z-axis direction matches the position of a boundary K in the Z-axis direction between the surface 1a of the base 1 and the end face of the laminate 2 close to the magnetic recording medium 90. The boundary K extends in the X-axis direction in FIG. 13A.

Figure 15A:
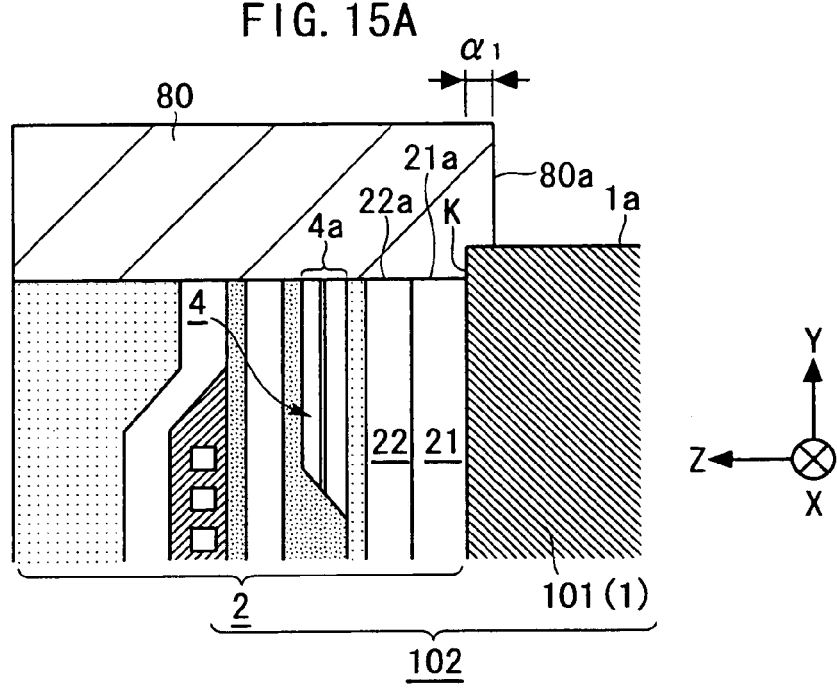
FIGS. 15A, 15B, 15C are schematic cross-sectional views diagrammatically illustrating how the bar is processed in a different way in respective steps in the first and second processes in FIG. 4.
Figure 15B:
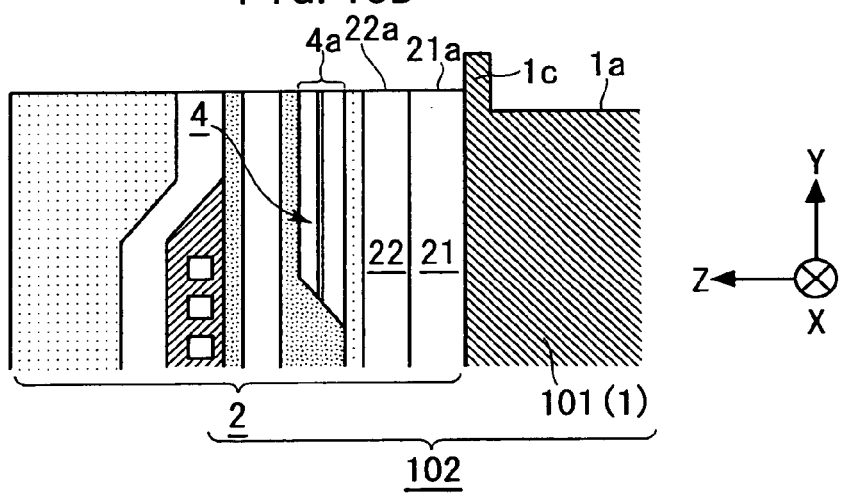
Figure 15C:
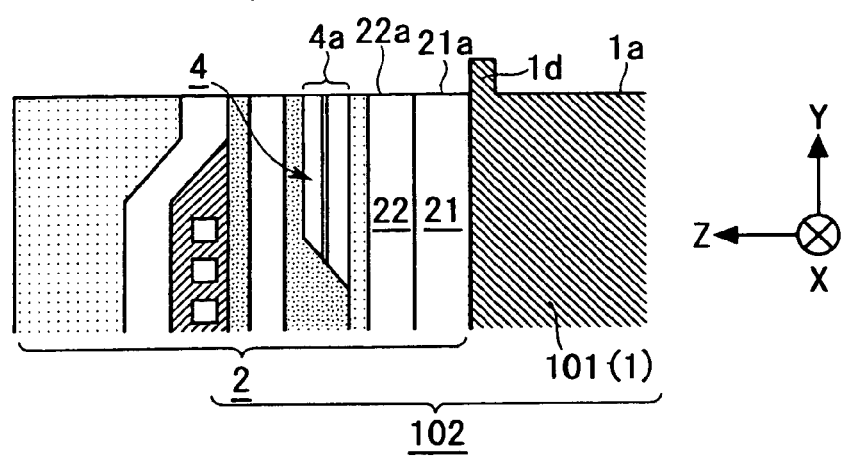
Figure 16A:
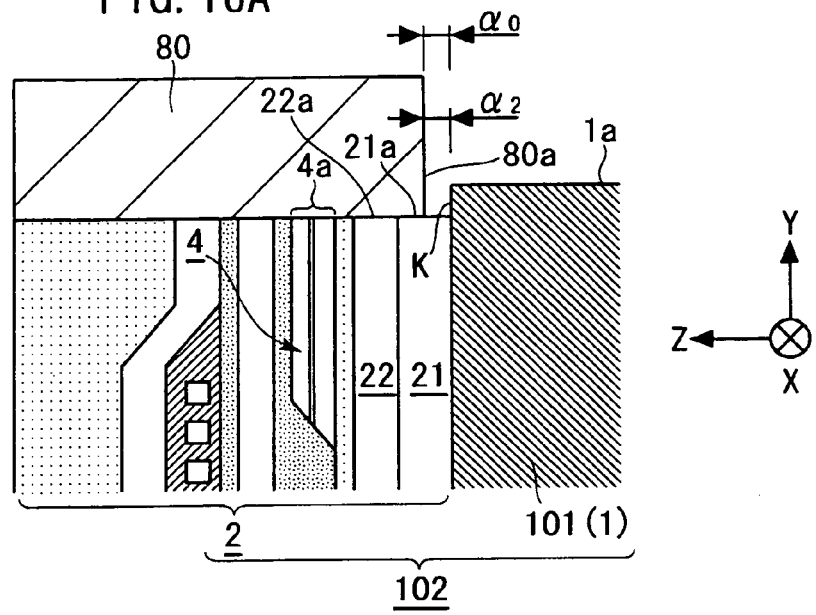
FIGS. 16A, 16B, 16C are schematic cross-sectional views diagrammatically illustrating how the bar is processed in another different way in respective steps of the first and second processes in FIG. 4.

When the resist 80 is formed at step S4, even if a target formation region is set for the resist 80 such that the position of the end face 80a of the resist 80 in the Z-axis direction matches the position of the boundary K in the Z-axis direction as illustrated in FIG. 13A, variations in the position at which the resist 80 is formed would actually cause, for each production lot, the position of the end face 80a of the resist 80 in the Z-axis direction to match the position of the boundary K in the Z-axis direction as illustrated in FIG. 13A, the position of the end face 80a in the Z-axis direction to shift toward the base 1 (to the right in FIG. 15A) from the boundary K by an offset amount $\alpha_1$ as illustrated in FIG. 15A, or the position of the end face 80a in the Z-axis direction to shift toward the laminate 2 (to the left in FIG. 16A) from the boundary K by an offset amount $\alpha_2$ as illustrated in FIG. 16A. FIGS. 15A–15C and 16A–16C are schematic cross-sectional views diagrammatically illustrating how the bar 102 is processed in the respective processes corresponding to FIGS. 13A–13C, respectively.

When the end face 80a of the resist 80 formed at step S4 shifts toward the base 1 by the offset amount $\alpha_1$ as illustrated in FIG. 15A, a region of the base 1 having a width approximately equal to $\alpha_1$ and extending in the X-axis direction along the boundary K remains as a protrusion 1c after step S6, as illustrated in FIG. 15B. Therefore, even after step S7, a region of the base 1 having a width approximately equal to $\alpha_1$ and extending in the X-axis direction along the boundary K remains as a protrusion 1d corresponding to the protrusion 1c, as illustrated in FIG. 15C. The protrusion 1d is not preferred because the resulting magnetic head could collide with the magnetic recording medium due to the protrusion 1d.

Figure 16B:
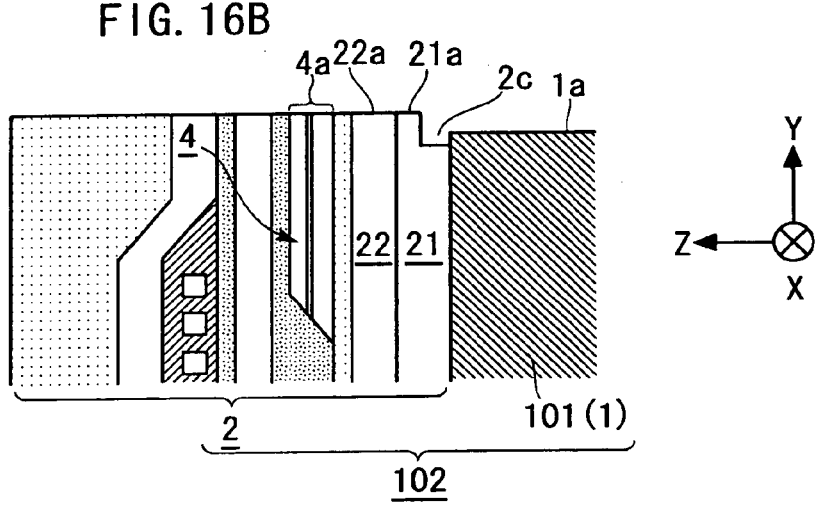
Figure 16C:
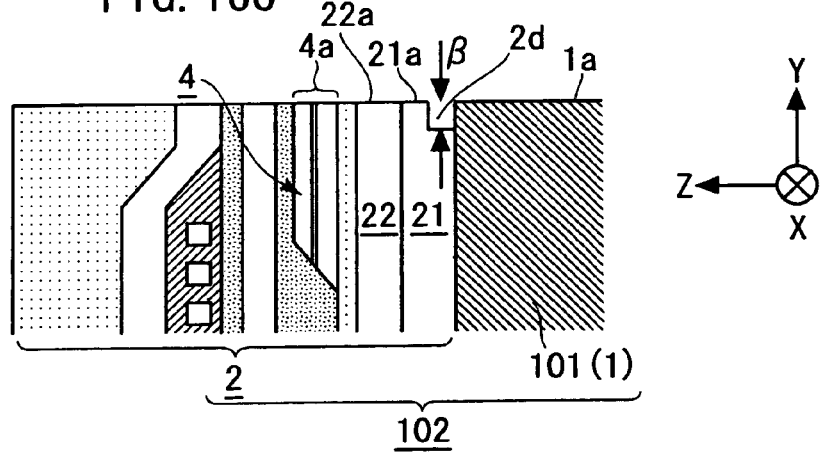
Figure 17:
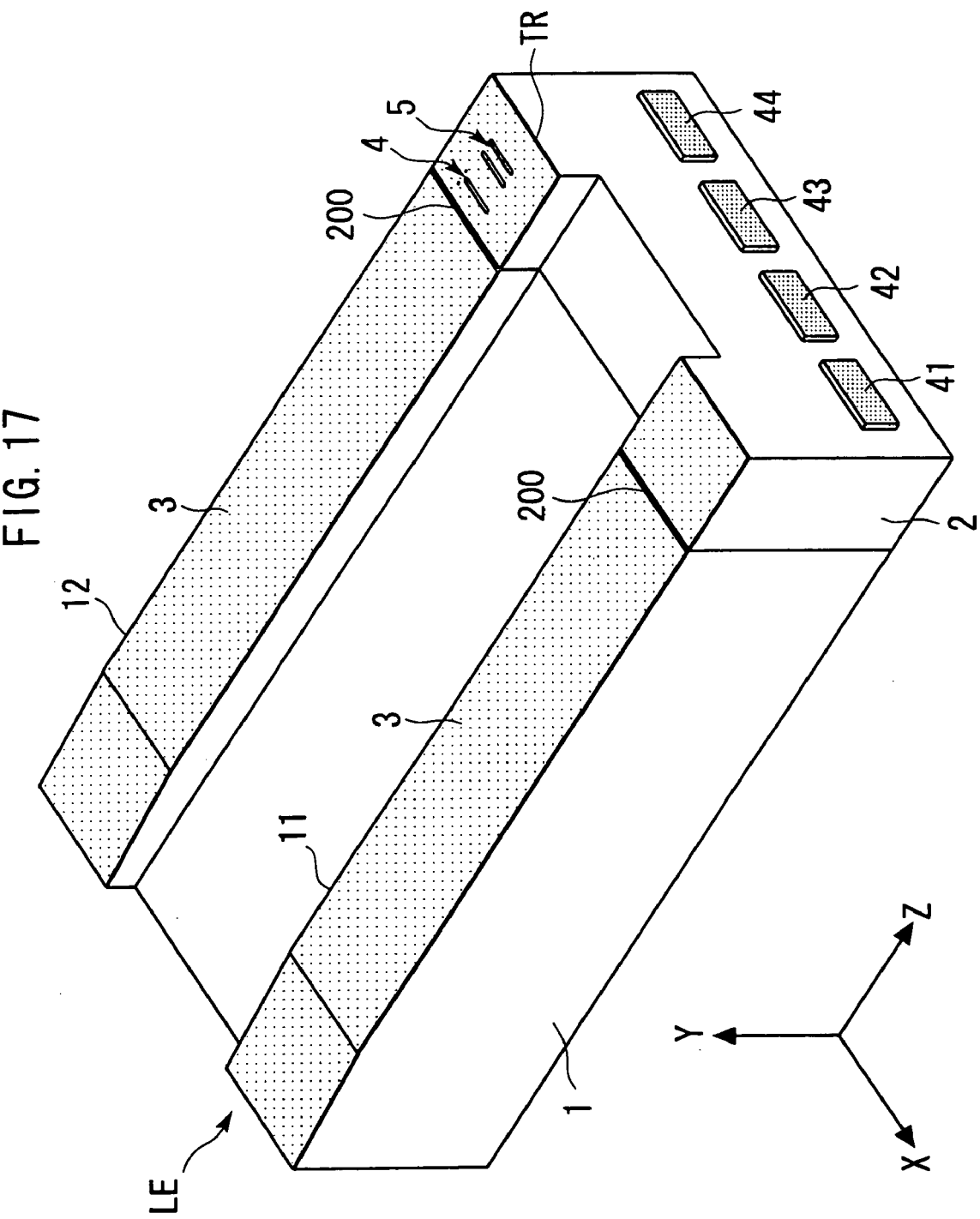
FIG. 17 is a schematic perspective view diagrammatically illustrating an exemplary modification to the magnetic head according to the first embodiment of the present invention.
Figure 18:
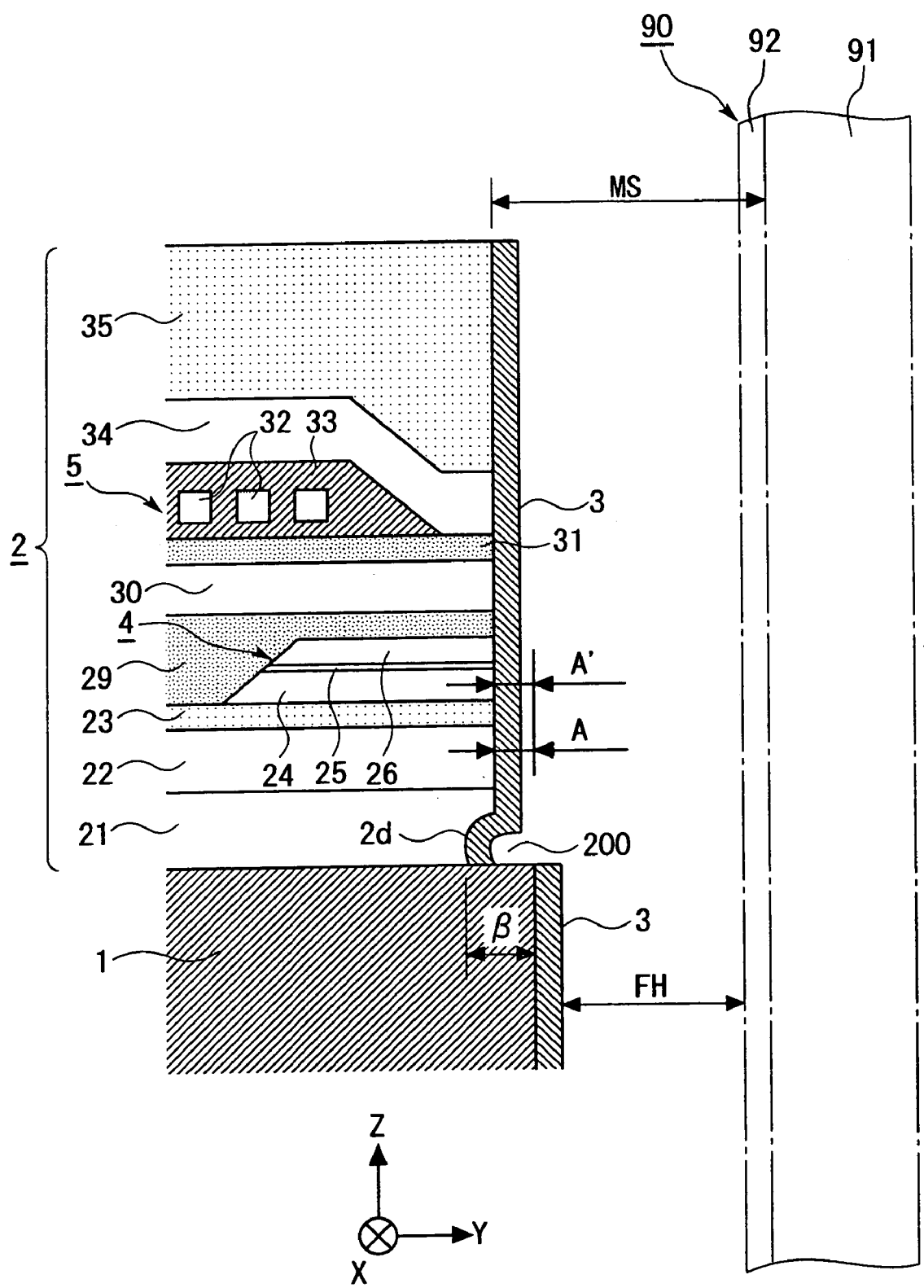
FIG. 18 is a schematic enlarged cross-sectional view diagrammatically illustrating a main portion of the magnetic head illustrated in FIG. 17.

On the other hand, when the end face 80a of the resist 80 formed at step S4 shifts toward the laminate 2 by the offset amount $\alpha_2$ as illustrated in FIG. 16A, a region to be etched at step S7 (the first region) is comprised of a region on the surface 1a of the base 1 and a region of the laminate 2 having a width equal to $\alpha_2$ and extending in the X-axis direction along the boundary K. In this event, after step S6, a region of the laminate 2 having a width approximately equal to $\alpha_2$ and extending in the X-axis direction along the boundary K is formed as a groove 2c, as illustrated in FIG. 16B. Therefore, a region having a width approximately equal to $\alpha_2$ and extending in the X-axis direction along the boundary K also forms a groove 2d, corresponding to the groove 2c, after step S7, as illustrated in FIG. 16C. Unlike the protrusion 1d, the groove 2d is preferable substantially similar to the case illustrated in FIGS. 13A, 13B, 13C, because it does not cause a significant degradation in magnetic head floating stability or a reduction in the output signal from the GMR device 4. For limiting the influence of the groove 2d on the magnetic head floating stability, the depth β of the groove 2d is preferably 30 nm or less, more preferably 20 nm or less, and further more preferably 10 nm or less. The offset amount $\alpha_2$ preferably has a dimension equal to or smaller than the thickness of the underlying layer 21 such that the groove 2d does not extend to the magnetic shield layer 22 for preventing the influence on the magnetic shield effect.

when the end face 80a of the resist 80 formed at step S4 shifts toward the laminate 2 by the offset amount $\alpha_2$ as illustrated in FIG. 16A, a groove 200 appears at a location of the ABS corresponding to the groove 2d, as illustrated in FIGS. 17 and 18. The groove 200 is transferred from the groove 2d through the protection film 3. FIGS. 17 and 18 illustrate an exemplary modification to the magnetic head according to the first embodiment. FIG. 17 is a schematic perspective view diagrammatically illustrating the magnetic head according to this exemplary modification, and corresponds to FIG. 1. FIG. 17 is a schematic enlarged cross-sectional view along a plane parallel to the YZ plane, diagrammatically illustrating a portion of the magnetic head including the GMR device 4 and inductive magnetic transducing device 5 illustrated in FIG. 17, and corresponds to FIG. 3. In FIGS. 17 and 18, elements identical or corresponding to those in FIGS. 1 and 3 are designated by the same reference numerals, and repetitive description thereon is omitted.

Taking into account variations in the position at which the resist 80 is actually formed, the actual position of the end face 80a of the resist 80 in the Z-axis direction is more likely to match the position of the boundary K or shift toward the laminate 2 from the position of the boundary K, and the actual position of the end face 80a of the resist 80 in the Z-axis direction is less likely to shift from the boundary K toward the base 1 when a target position for the end face 80a of the resist 80 in the Z-axis direction is set at a position deviated from the boundary K toward the laminate 2 by an offset amount (target offset amount) $\alpha_0$ (see FIG. 16A) at step S4 at which the resist 80 is formed, than when the target position is set at the position of the boundary K.

From the foregoing, the target position is preferably set at the position deviated from the boundary K toward the laminate 2 by the offset amount (target offset amount) $\alpha_0$ for improving the yield rate of the magnetic head. Stated another way, a target region for a region (the first region) to be etched at step S7 is preferably comprised of a region on the surface 1a of the base 1 of the bar 102 close to the magnetic recording medium 90 and a predetermined region (a region extending along the boundary K in the X-axis direction) close to the base 1 within a region of an end face of the laminate 2 on the surface of the bar 102 close to the magnetic recording medium 90. The target offset amount $\alpha_0$ (i.e., the width of the predetermined region) is preferably made larger than the amount of variations in the position at which the resist 80 is actually formed in order to improve the yield rate. On the other hand, an excessively large target offset amount $\alpha_0$ is not preferable because it would cause the actually formed groove 2d to extend to the magnetic shield layer 22, resulting in the influence on the magnetic shield effect. The result of experiments, later described, revealed that the target offset amount $\alpha_0$ is particularly preferably set in a range of 0.05 μm to 3.0 μm.

Since the foregoing manufacturing method illustrated in FIG. 4 can reduce the level difference A while removing the smear, the method can manufacture a magnetic head which can generate a high output signal from the GMR device 4 even on a narrow track to increase the recording density.

Figure 19:
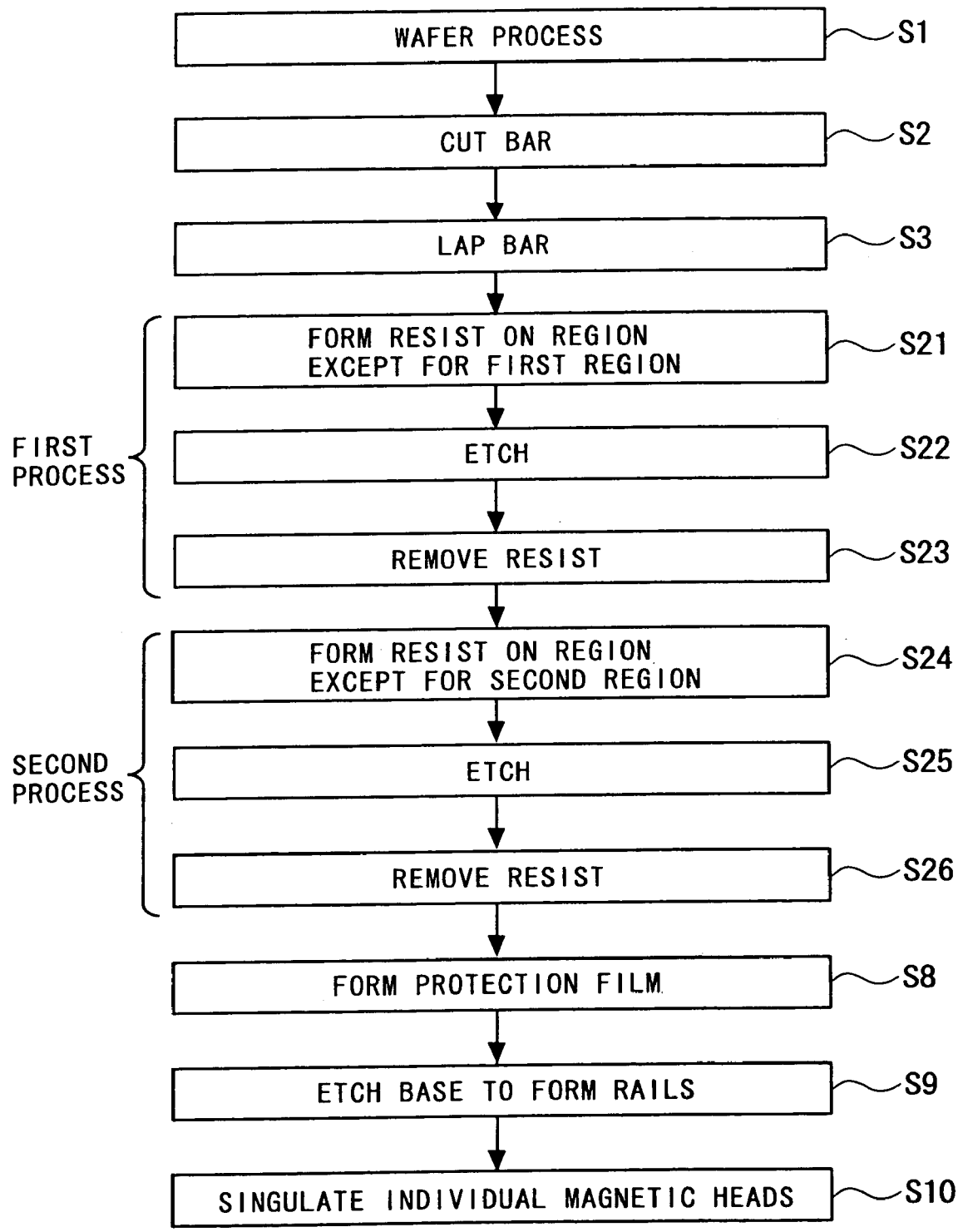
FIG. 19 is a flow chart generally illustrating another exemplary method of manufacturing the magnetic head illustrated in FIG. 1.

Next, another exemplary method of manufacturing the magnetic head according to the first embodiment will be described with reference to FIG. 19. FIG. 19 is a flow chart generally illustrating the manufacturing method. In FIG. 19, elements identical or corresponding to those in FIG. 4 are designated by the same reference numerals, and repetitive description thereon is omitted.

The manufacturing method illustrated in FIG. 19 differs from the manufacturing method illustrated in FIG. 4 only in the etching process for etching the surface of the bar 102 close to the magnetic recording medium 90, illustrated in FIGS. 12A, 12B after the lapping step (step S3). Specifically, while the manufacturing method illustrated in FIG. 19 also performs the first process and second process in this order, it differs from the manufacturing method illustrated in FIG. 4 in the contents of the first and second processes.

In this example, the first process includes selectively etching a first region on the surface of the bar 102 close to the magnetic recording medium 90 which includes the surface of the base 1 and does not include the end face of the GMR device 4. The second process includes selectively etching a second region on the surface of the bar 102 close to the magnetic recording medium 90 which does not include the surface of the base 1 but includes the end face 4a of the GMR device 4. In the present invention, the first process and second process may be reversed in order.

Now, specific examples of the first and second processes will be described with reference to FIGS. 20 and 21. FIGS. 20 and 21 are schematic cross-sectional views diagrammatically illustrating how the bar 102 is processed in respective steps in the first and second processes.

Figure 20A:
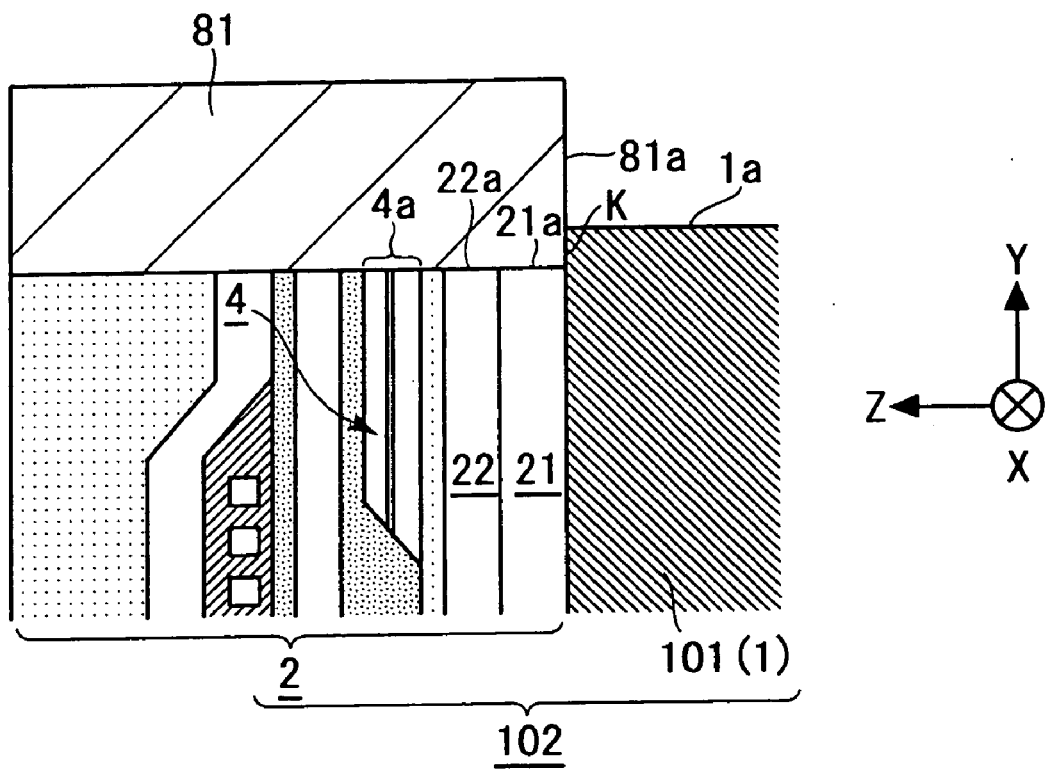
FIGS. 20A, 20B are schematic cross-sectional views diagrammatically illustrating how the bar is processed in respective steps of a first process in FIG. 19.
Figure 20B:
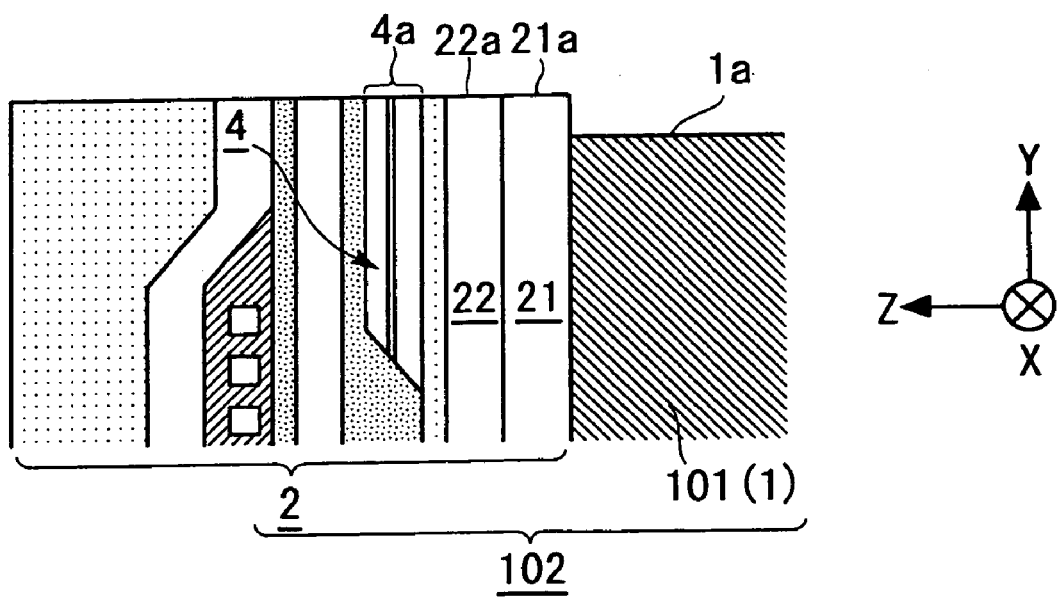
Figure 21A:
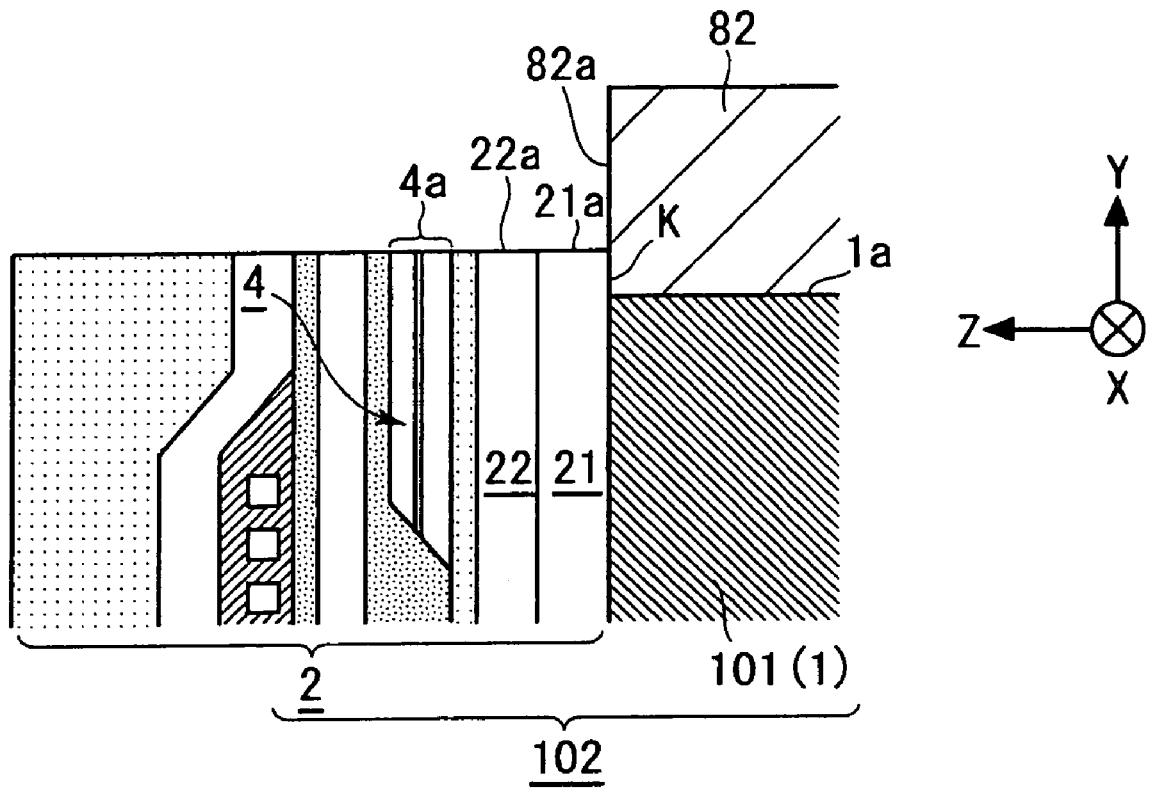
FIGS. 21A, 21B are schematic cross-sectional views diagrammatically illustrating how the bar is processed in respective steps of a second process in FIG. 19.
Figure 21B:
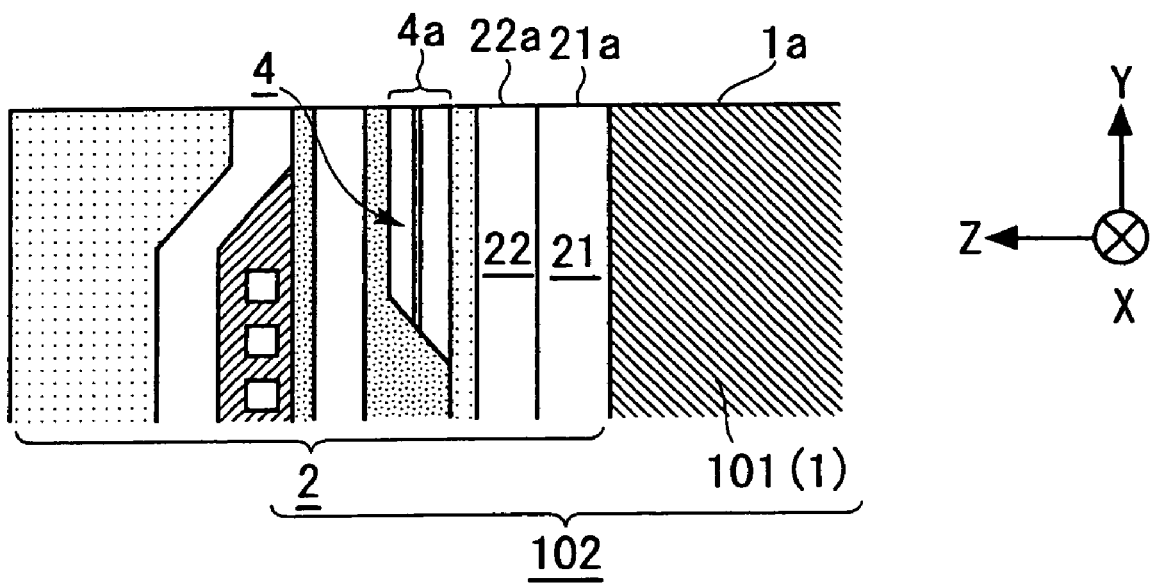

In this example, as illustrated in FIG. 20A, a resist 81 is first formed on a region on the surface of the bar 102 close to the magnetic recording medium 90 (the upper surface in FIG. 20A) except for the first region in the first process (step S21). Next, the surface of the bar 102 as illustrated in FIG. 20A close to the magnetic recording medium 90 is etched with the resist 81 used as a mask (step S22). After this etching, the resist 81 is removed (step 23). By now, the first process is terminated. FIG. 20B illustrates the bar 102 after the termination of the first process (after the termination of step S23). The first process is followed by the second process, where a resist 82 is formed on a region of the surface of the bar 102 as illustrated in FIG. 20B close to magnetic recording medium 90 except for the second region, as illustrated in FIG. 21A (step S24). Next, the surface of the bar 102 as illustrated in FIG. 21A close to the magnetic recording medium 90 is etched with the resist 82 used as a mask (step S25). After this etching, the resist 82 is removed (step S26). Thus, the second process is terminated. FIG. 21B illustrates the bar 102 after the termination of the second process (after the termination of step S26). In this example, the etching at step S22 is conducted such that the surface 1a of the substrate 1 substantially matches in level the end face of the laminate 2 close to the magnetic recording medium 90 (particularly the end face 4a of the GMR device 4) after step S26, as illustrated in FIG. 21B.

When dry etching is employed at step S22, preferably employed is, for example, reactive ion etching, reactive ion beam etching, ion beam etching, sputter etching, or ion milling. When dry etching is employed at step S25, preferably employed is, for example, ion beam etching, ion milling, or sputter etching. At step S25, a He gas, a Ne gas, an Ar gas, a Kr gas or a Xe gas, or a mixture of two or more of these gases are preferably used as an etching gas. The use of such rare gas at step S25 will avoid the formation of an insensitive region (erosion, oxide films, and the like) on the end face 4a of the GMR device 4. On the other hand, at step S22, the end face 4a of the GMR device 4 is covered with the resist 81, so that the formation of insensitive region need not be taken into account in selecting an etching gas.

When ion beam etching or ion milling is employed at step S25, an incident angle θ (see FIG. 14) of the ion beam to a normal direction N to the surface of the bar 102 close to the magnetic recording medium 90 is preferably set in a range of 40° to 88° for generating a higher output signal from the GMR device 4. More preferably, the incident angle θ is set in a range of 60° to 85°.

At one or both of steps S22, S25, wet etching may be employed instead of dry etching. When wet etching is employed, for example, an etchant including at least one of acid and alkali may be used. The acid may be either inorganic acid or organic acid, and likewise, the alkali may be either inorganic alkali or organic alkali. Inorganic acid may be, for example, hydrofluoric acid, nitric acid, hydrochloric acid, or phosphoric acid, while organic acid may be, for example, acetic acid, lactic acid, oxalic acid, citric acid, or tartaric acid. Inorganic alkali may be, for example, potassium hydroxide or sodium hydroxide, while organic alkali may be, for example, tetramethyl ammonium hydroxide (TMAH). Specific examples of etching solutions are listed in the aforementioned Table 1.

The aforementioned FIGS. 20 and 21 illustrate an example in which a region to be etched at step S22 (the first region) is actually set to only the surface 1a of the base 1, and a region to be etched at step S25 (the second region) is actually set to only the end face of the laminate 2 close to the magnetic recording medium 90. Specifically, as illustrated in FIG. 20A, the resist 81 is formed just on the end face of the laminate 2 close to the magnetic recording medium 90, and the position of an end face 81a of the resist 81 close to the base 1 in the Z-axis direction matches the position of a boundary K in the Z-axis direction between the surface 1a of the base 1 and the end face of the laminate 2 close to the magnetic recording medium 90. Also, as illustrated in FIG. 21A, the resist 82 is formed just on the surface 1a of the base 1, and the position of an end face 82a of the resist 82 close to the laminate 2 in the Z-axis direction matches the position of the boundary K in the Z-axis direction. The boundary K extends in the X-axis direction in FIGS. 20 and 21.

When the resist 81 is formed at step S21, even if a target formation region is set for the resist 81 such that the position of the end face 81a of the resist 81 in the Z-axis direction matches the position of the boundary K in the Z-axis direction as illustrated in FIG. 20A, variations in the position at which the resist 81 is formed would actually cause, for each production lot, the position of the end face 81a of the resist 81 to shift from the position of the boundary K in the Z-axis direction. Similarly, when the resist 82 is formed at step S24, even if a target formation region is set for the resist 82 such that the position of the end face 82a of the resist 82 in the Z-axis direction matches the position of the boundary K in the Z-axis direction as illustrated in FIG. 21A, variations in the position at which the resist 82 is formed would actually cause, for each production lot, the position of the end face 82a of the resist 82 to shift from the position of the boundary K in the Z-axis direction.

Figure 22A:
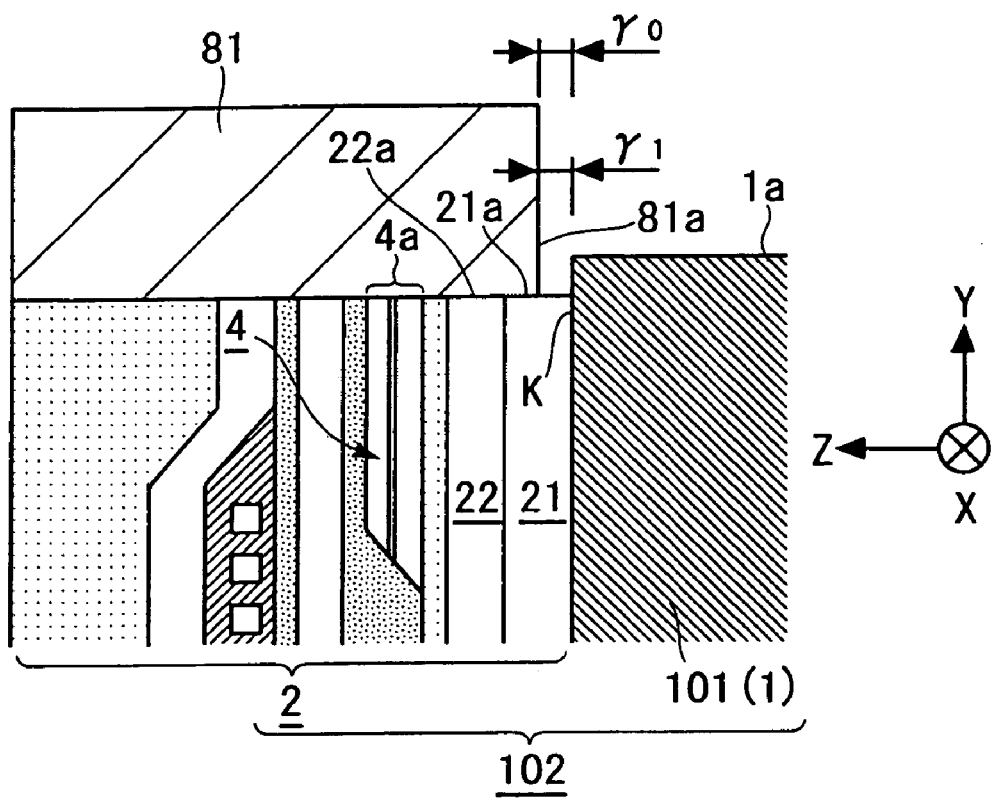
FIGS. 22A, 22B schematic cross-sectional views diagrammatically illustrating how the bar is processed in a different way in the respective steps of the first process in FIG. 19.
Figure 22B:
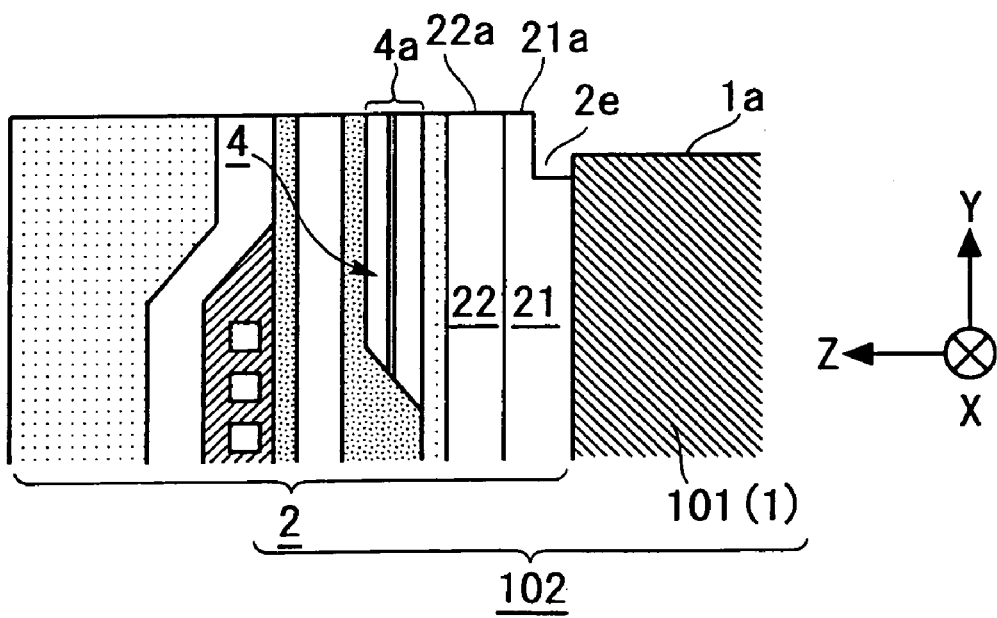
Figure 23A:
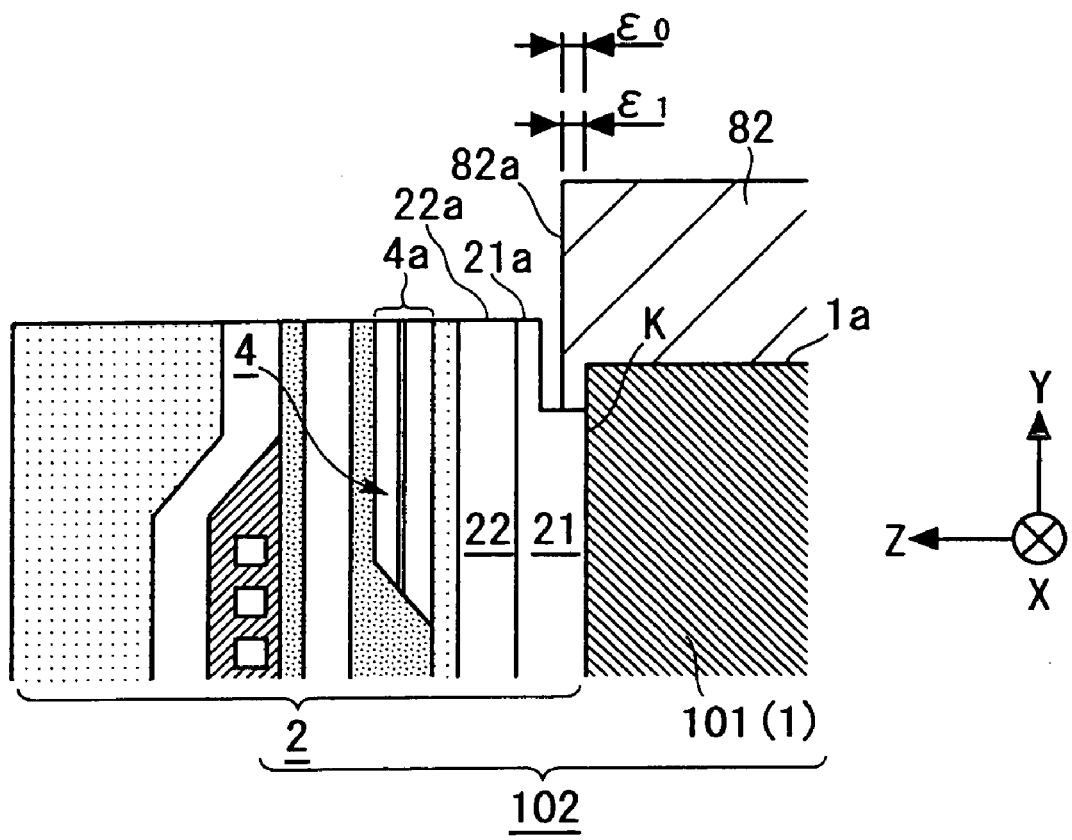
FIGS. 23A, 23B schematic cross-sectional views diagrammatically illustrating how the bar is processed in a different way in the respective steps of the second process in FIG. 19.
Figure 23B:
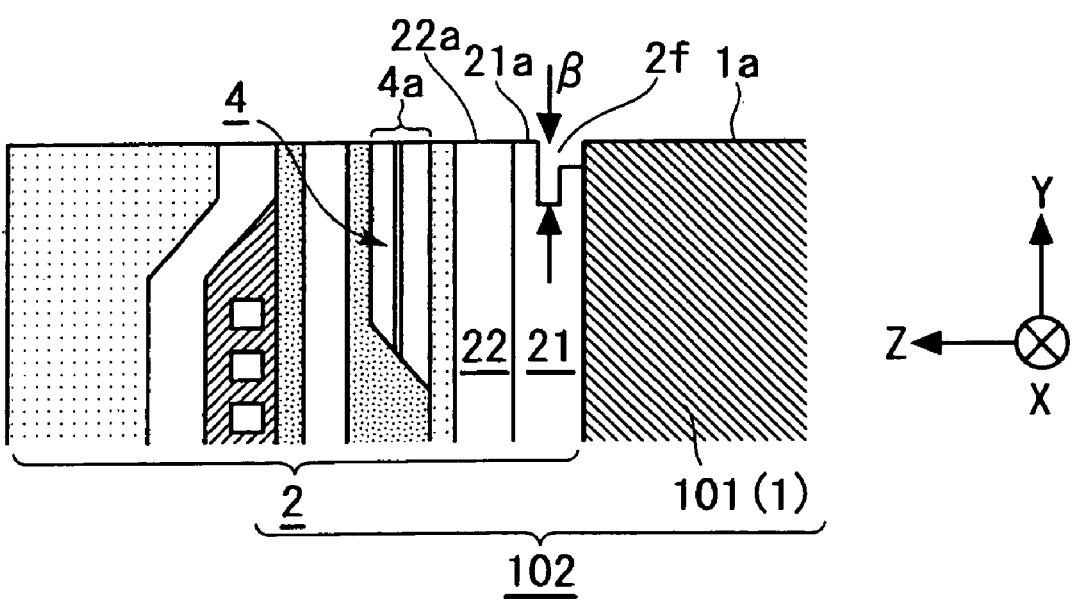

An example of the resists 81, 82 thus shifted is illustrated in FIGS. 22A, 22B, 23A, 23B. FIGS. 22A, 22B and FIGS. 23A, 23B are schematic cross-sectional views diagrammatically illustrating the bar 102 in the respective steps corresponding to FIGS. 20A, 20B and 21A, 21B, respectively. In this example, as illustrated in FIG. 22A, the end face 81a of the resist 81 formed at step S21 is shifted toward the laminate 2 by an offset amount $\gamma_1$, and a region to be etched at step S22 (the first region) is comprised of a region on the surface 1a of the base 1 and a region on the laminate 2 having a width equal to $\gamma_1$ and extending along the boundary K in the X-axis direction. Therefore, the region of the laminate 2 having the width approximately equal to $\gamma_1$ and extending along the boundary K in the X-axis direction forms a groove 2e, as illustrated in FIG. 22B, after step S22. In this example, as illustrated in FIG. 23A, the end face 82a of the resist 82 formed at step S24 is shifted toward the laminate 2 by an offset amount $\epsilon_1$ (in this example, $\epsilon_1 < \gamma_1$), and a region to be etched at step S25 (the second region) is comprised of a region on the end face of the laminate 2 close to the magnetic recording medium 90, except for a region which has a width equal to $\epsilon_1$ and extending along the boundary K along the X-axis direction. Therefore, the region of the laminate 2 extending along the boundary K in the X-axis direction forms a groove 2f, as illustrated in FIG. 23B, after step S26. It should be noted that a groove similar to the groove 2f is formed even when $\epsilon_1 \geq \gamma_1$ though the groove would have a different cross-sectional shape from the groove 2f. Such a groove 2f or the like, even if formed, is preferable, as is the case with that illustrated in FIGS. 20 and 21, because it does not cause a significant degradation in magnetic head floating stability or a reduction in the output signal from the GMR device 4. For reducing the influence of the groove 2f or the like on the magnetic head floating stability, the depth β of the groove 2f or the like is preferably 30 nm or less, more preferably 20 nm or less, and further more preferably 10 nm or less. The width of the groove 2f or the like in the Z-axis direction is preferably equal to or smaller than the thickness of the magnetic shield layer 22 such that the groove 2f or the like does not extend to the magnetic shield layer 22 for preventing the influence on the magnetic shield effect.

However, an unwanted situation similar to that illustrated in FIG. 15C, for example, could arise to cause a collision with the magnetic recording medium depending on the directions in which the end faces 81a, 82a of the resists 81, 82 are shifted.

From the foregoing, the target position for the end face 81a of the resist 81 in the Z-axis direction is preferably set at a position deviated from the boundary K toward the laminate 2 by the offset amount (target offset amount) $\gamma_0$ (see FIG. 22A) at step S21 at which the resist 81 is formed, for improving the yield rate of the magnetic head. Stated another way, a target region for a region (the first region) to be etched at step S22 is preferably comprised of a region on the surface 1a of the base 1 of the bar 102 close to the magnetic recording medium 90 and a predetermined region (a region extending along the boundary K in the X-axis direction) close to the base 1 within a region of an end face of the laminate 2 on the surface of the bar 102 close to the magnetic recording medium 90. In this event, preferably, the target position for the end face 82a of the resist 82 in the Z-axis direction is set at a position deviated from the boundary K toward the laminate 2 by an offset amount (target offset amount) $\epsilon_0$ (see FIG. 23A) at step 24 at which the resist 82 is formed. The target offset amount $\gamma_0$ is preferably made larger than the amount of variations in the position at which the resist 81 is actually formed in order to improve the yield rate. The target offset amount $\epsilon_0$ is preferably made larger than the amount of variations in the position at which the resist 82 is actually formed in order to improve the yield rate. On the other hand, excessively large target offset amounts $\gamma_0$, $\epsilon_0$ are not preferable because they would cause the actually formed groove 2f or the like to extend to the magnetic shield layer 22, resulting in the influence on the magnetic shield effect. The target offset amounts $\gamma_0$, $\epsilon_0$ are particularly preferably set in a range of 0.05 µm to 3.0 µm.

Since the foregoing manufacturing method illustrated in FIG. 19 can reduce the level difference A while removing the smear, the method can manufacture a magnetic head which can generate a high output signal from the GMR device 4 even on a narrow track to increase the recording density, as is the case with the manufacturing method illustrated in FIG. 4.

Next, a magnetic head according to a second embodiment of the present invention will be described with reference to FIGS. 24 and 25.

Figure 24:
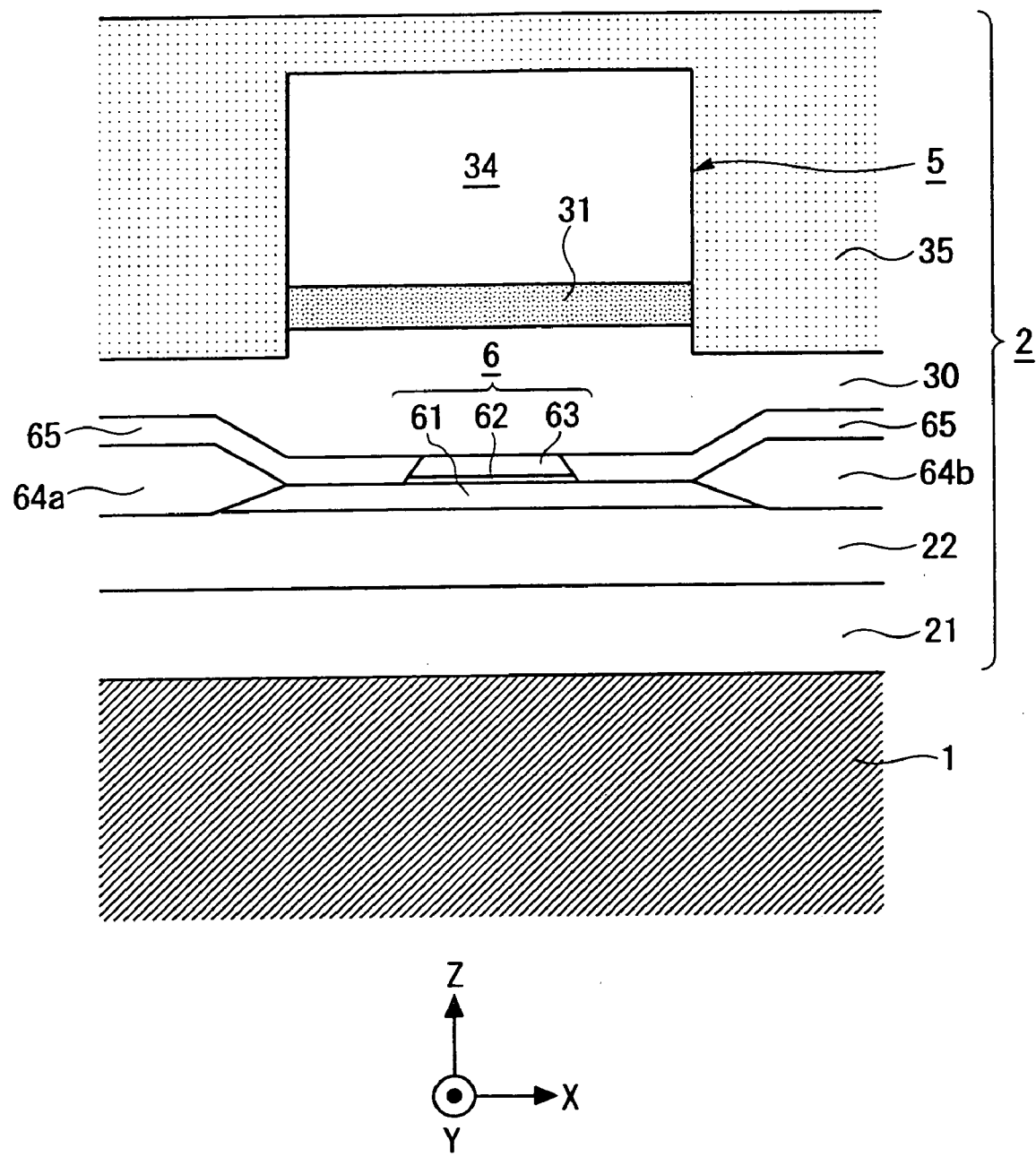
FIG. 24 is a schematic enlarged cross-sectional view diagrammatically illustrating a main portion of a magnetic head according to a second embodiment of the present invention.

FIG. 24 is a schematic enlarged cross-sectional view along a plane parallel to the XZ plane (plane parallel to the ABS), diagrammatically illustrating a portion of the magnetic head according to the second embodiment of the present invention including a TMR device 6 and a inductive magnetic transducing device 5, and corresponds to FIG. 2. FIG. 25 is a schematic enlarged cross-sectional view along a plane parallel to the YZ plane, diagrammatically illustrating a portion of the magnetic head including the TMR device 6 and inductive magnetic transducing device 5 illustrated in FIG. 24, and corresponds to FIG. 3. FIG. 25 also shows the relationship with a magnetic recording medium 90. In FIGS. 24 and 25, elements identical or corresponding to those in FIGS. 2 and 3 are designated by the same reference numerals, and repetitive description thereon is omitted.

The magnetic head according to the second embodiment differs from the magnetic head according to the first embodiment in that a laminate 2 includes a TMR device 6 instead of the GMR device 4, as a magneto-resistive device. The insulating films 23, 29 are removed, and a sense current is adapted to flow to the TMR device 6 through a lower magnetic shield layer 22 which additionally functions as a lower electrode and an upper magnetic shield layer 30 which additionally functions as an upper electrode, perpendicularly to the film surface (i.e., in the Z-axis direction). In addition, the laminate 2 of the magnetic head according to the second embodiment differs from the laminate 2 of the magnetic head the first embodiment only in the following aspects.

Figure 25:
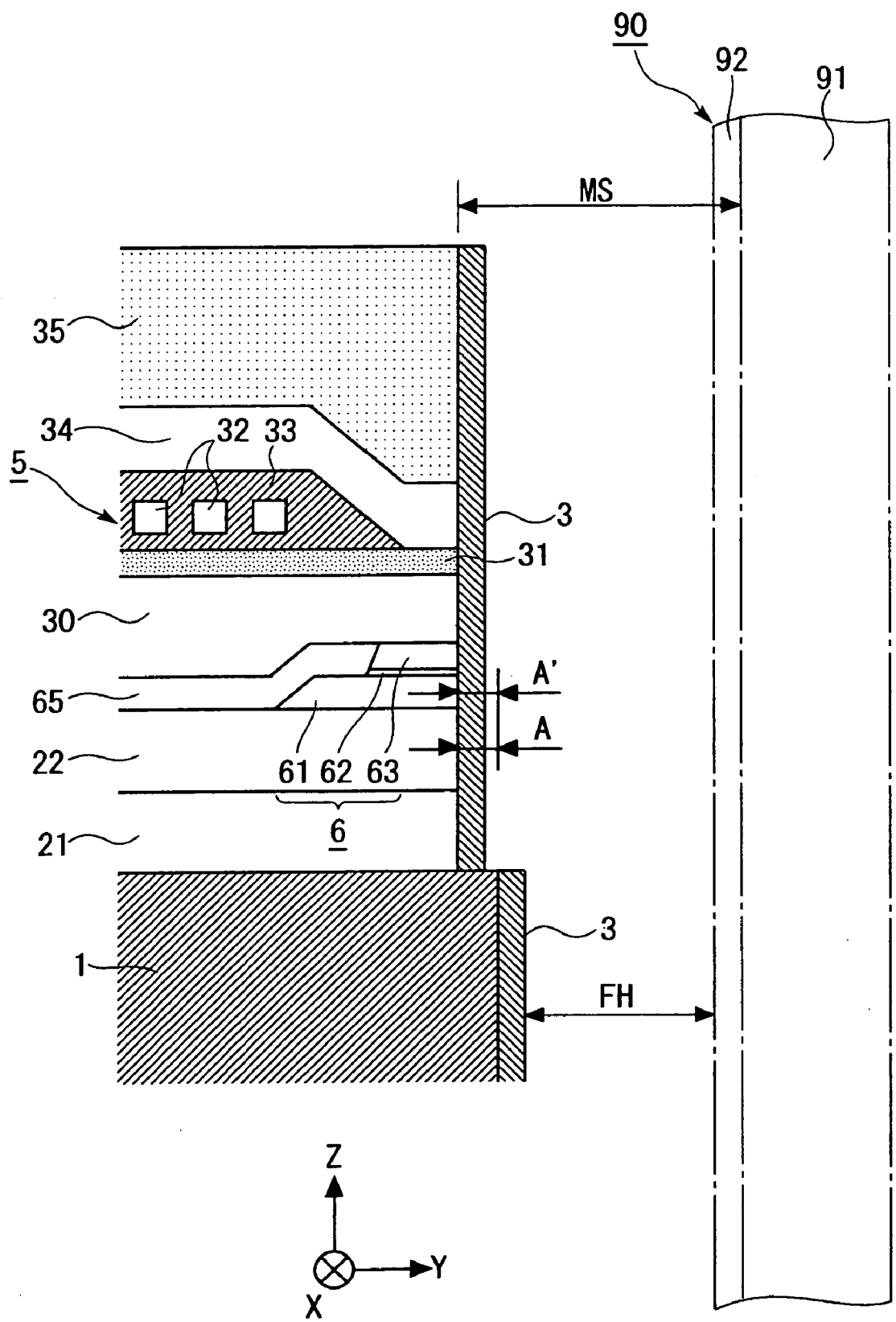
FIG. 25 is another schematic enlarged cross-sectional view diagrammatically illustrating the main portion of the magnetic head illustrated in FIG. 24.

In the second embodiment, as illustrated in FIGS. 24 and 25, a lower ferromagnetic layer 61, a tunnel barrier layer 62, an upper ferromagnetic layer 63, hard magnetic layers 64a, 64b, and an insulating layer 65 are laminated instead of the respective elements 23–26, 27a, 27b, 28a, 28b, 29 in FIGS. 2 and 3, between the lower magnetic shield layer 22 which additionally functions as the lower electrode and the upper magnetic shield layer 30 which additionally functions as the upper electrode. In the second embodiment, the TMR device 6 is comprised of the tunnel barrier layer 62, the ferromagnetic layers 61, 63 formed to sandwich the tunnel barrier layer 62, and the like. A material suitable for the ferromagnetic layers 61, 63 may be Fe, Co, Ni, FeCo, NiFe, CoZrNb, FeCoNi, and the like. A material suitable for the tunnel barrier layer 62 may be $Al_2O_3$, NiO, GdO, MgO, $Ta_2O_5$, $MoO_2$, $TiO_2$, $WO_2$, and the like. While the actual TMR device 6 generally has a laminate structure including a larger number of films than three as illustrated, the second embodiment shows a minimally required laminate for the basic operation of the TMR device 6 for simplifying the description. In the second embodiment, the lower ferromagnetic layer 61 is a free layer which freely varies its magnetization direction in response to an external magnetic field, while the upper ferromagnetic layer 63 is a pinned layer, the magnetization direction of which is fixed. While a pinning layer is laminated on the upper ferromagnetic layer 63 for pinning the magnetization direction of the upper ferromagnetic layer 63, the illustration thereof is omitted. As illustrated in FIG. 24, the hard magnetic layers 64a, 64b are placed on one and the other side of the lower ferromagnetic layer 61 which therefore has a single magnetic domain. The magnetic shield layers 22, 30 are additionally used as electrode layers for applying the TMR device 6 with a current in the Z-axis direction.

As illustrated in FIG. 25, a magnetic spacing MS is determined by the thickness of the protection layer 92, the thickness of the protection layer 3, a head floating amount (flying height) FH, and a level difference A' in a manner similar to the description made with reference to FIG. 3. The magnetic spacing MS must be narrowed down for improving the recording density.

As illustrated in FIG. 25, the level difference A' refers to the difference in level between the surface of the base 1 forming the ABS through the protection film 3 close to the magnetic recording medium 90 (in the second embodiment, the surface of the base 1 on the rails 11, 12 close to the magnetic recording medium 90), and the end face of the TMR device 6 close to the magnetic recording medium 90. The magnetic spacing MS can be reduced more as the level difference A' is smaller, thereby improving the recording density. In the second embodiment, the absolute value of the level difference A' is preferably 2 nm or less (therefore, either of the surfaces may be higher than the other). Alternatively, the absolute value of the difference in level (level difference) A between the surface of the base 1 forming the ABS through the protection film 3 close to the magnetic recording medium 90 and the end face of at least one of the magnetic shield layers 22, 30 close to the magnetic recording medium 90 is preferably 2 nm or less. In the second embodiment, the end face of the TMR device 6 close to the magnetic recording medium 90 levels substantially with the end faces of the magnetic shield layers 22, 30 close to the magnetic recording medium 90.

While FIG. 25 shows that the end face of the laminate 2 close to the magnetic recording medium 90 is identical in level at any location, actually, portions made of different materials are slightly different in level.

The magnetic head according to the second embodiment may be manufactured by the manufacturing method illustrated in FIG. 4 and the method according to the exemplary modification thereto, or manufactured by the manufacturing method illustrated in FIG. 19 and the method according to the exemplary modification thereto, as is the case with the magnetic head according to the first embodiment. Therefore, description on the method of manufacturing the magnetic head according to the first embodiment is basically applied to a method of manufacturing the magnetic head according to the second embodiment, so that repetitive description thereon is omitted.

However, specific processing in the wafer process (step S1) illustrated in FIG. 19 in the method of manufacturing the magnetic head according to the second embodiment differs from specific processing in the wafer process (step S1) illustrated in FIG. 4 in the method of manufacturing the magnetic head according to the first embodiment. For this reason, the following description will outline the wafer process with reference to FIGS. 26 to 31.

Figure 29A:
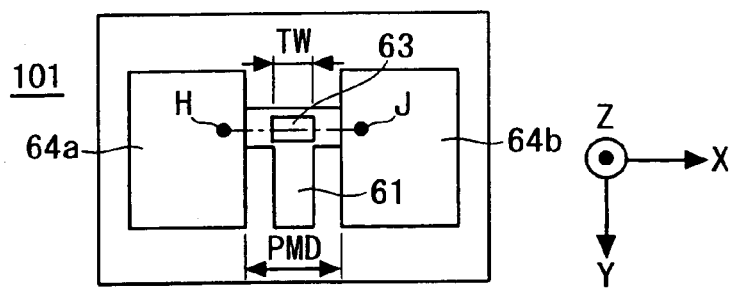
FIGS. 29A, 29B are schematic views illustrating a further step which forms part of the wafer process in the method of manufacturing the magnetic head illustrated in FIG. 24.
Figure 29B:
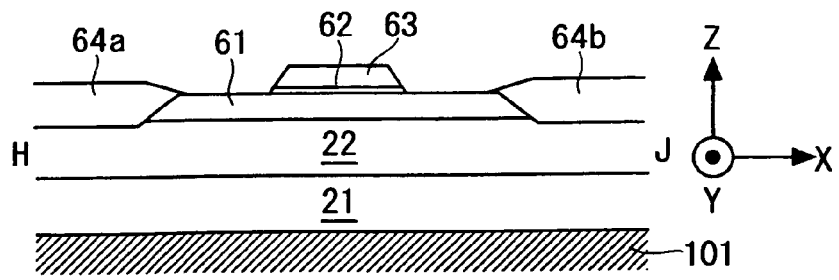
Figure 30A:
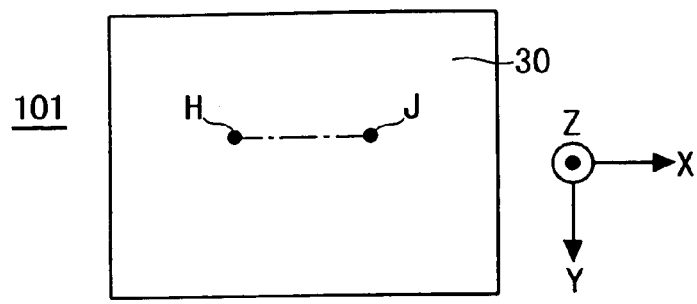
FIGS. 30A, 30B are schematic views illustrating a further step which forms part of the wafer process in the method of manufacturing the magnetic head illustrated in FIG. 24.
Figure 30B:
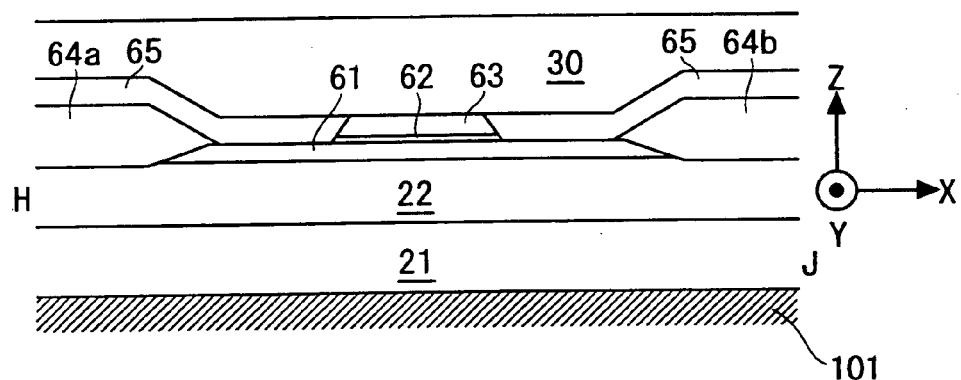
Figure 31:
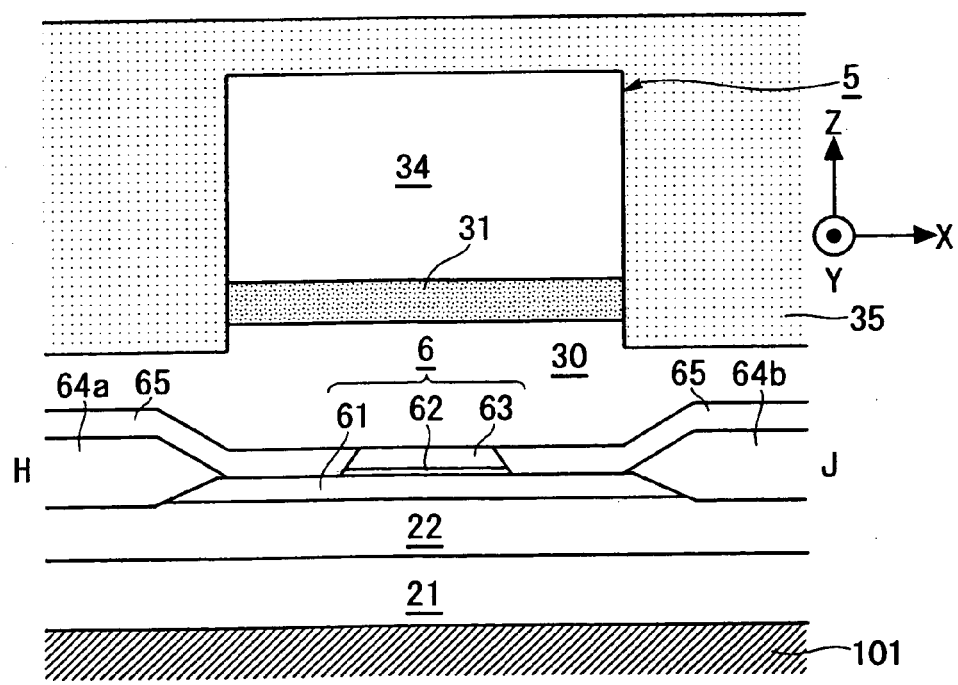
FIG. 31 is a schematic view illustrating a further step which forms part of the wafer process in the method of manufacturing the magnetic head illustrated in FIG. 24.

FIGS. 26 to 31 are diagrams generally illustrating respective steps which form the wafer process. FIGS. 26A, 27A, 28A, 29A, 30A are schematic plan views. FIG. 26B is a schematic cross-sectional view taken along a line H-J in FIG. 26A; FIG. 27B is a schematic cross-sectional view taken along a line H-J in FIG. 27A; FIG. 28B is a schematic cross-sectional view taken along a line H-J in FIG. 28A; FIG. 29B is a schematic cross-sectional view taken along a line H-J in FIG. 29A; and FIG. 30B is a schematic cross-sectional view taken along a line H-J in FIG. 30A. FIG. 31 is a schematic cross-sectional view corresponding to FIG. 30B. In FIG. 29A, TW represents the horizontal width of the TMR device 6, while PMD represents the width between the hard magnetic layers 64a, 64b (called the "Permanent Magnet Distance").

In the wafer process, a wafer 101 made of $Al_2O_3$—TiC, SiC or the like is provided to constitute a base 1. The aforementioned laminate 2 is formed in each of a large number of magnetic head formation areas in matrix on the wafer 101 by using the thin film forming technology and the like.

Figure 26A:
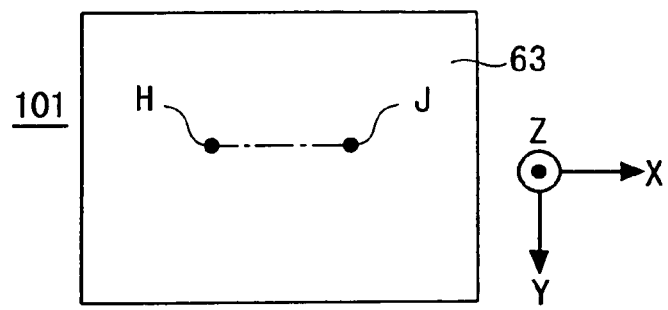
FIGS. 26A, 26B are schematic views illustrating one step which forms part of a wafer process in a method of manufacturing the magnetic head illustrated in FIG. 24.
Figure 26B:
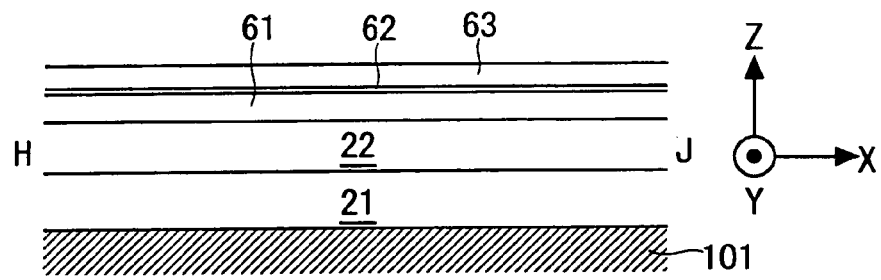
Figure 27A:
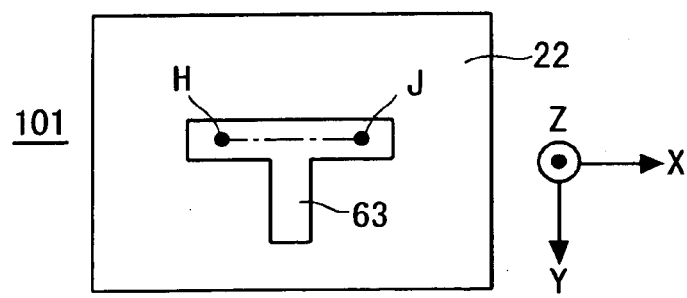
FIGS. 27A, 27B are schematic views illustrating another step which forms part of the wafer process in the method of manufacturing the magnetic head illustrated in FIG. 24.
Figure 27B:
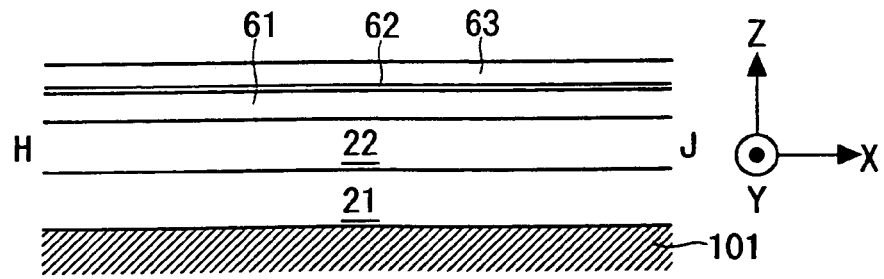
Figure 28A:
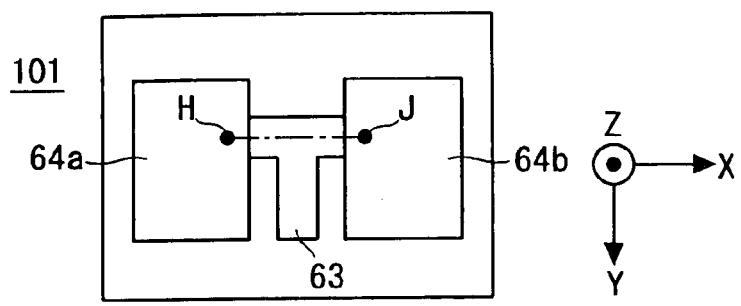
FIGS. 28A, 28B are schematic views illustrating a further step which forms part of the wafer process in the method of manufacturing the magnetic head illustrated in FIG. 24.
Figure 28B:
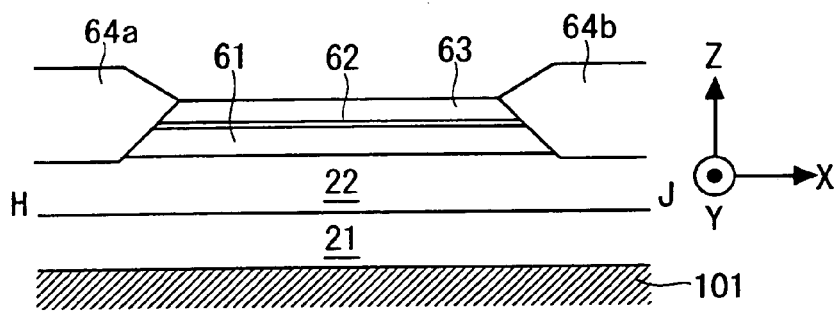

In the wafer process, an underlying layer 21, a lower magnetic shield layer 22, a lower ferromagnetic layer 61, a tunnel barrier layer 62, and an upper ferromagnetic layer 63 are first laminated on the wafer 101 in sequence (FIGS. 26A, 26B). Next, the lower ferromagnetic layer 61, tunnel barrier layer 62, and upper ferromagnetic layer 63 are partially removed by ion milling (FIGS. 27A, 27B). Next, hard magnetic layers 64a, 64b are partially formed (FIGS. 28A, 28B). Then, the tunnel barrier layer 62 and upper ferromagnetic layer 63 are patterned into a predetermined shape by ion milling (FIGS. 29A, 29B). Next, an upper magnetic shield layer 30 is formed after forming an insulating layer 65 (FIGS. 30A, 30B). Finally, a thin film coil 32, a gap layer 31, an insulating film 33, an upper magnetic layer 34, and a protection layer 35 are formed (FIG. 31), followed by the formation of electrodes 41–44 and the like. Thus, the wafer process is completed.

Like the method of manufacturing the magnetic head according to the first embodiment, the method of manufacturing the magnetic head according to the second embodiment also includes a cutting step (step S2) for cutting the bar 102 in FIG. 4 or 19 from the wafer which has undergone the wafer process, and a lapping step (step S3) for lapping the bar 102.

Figure 32:
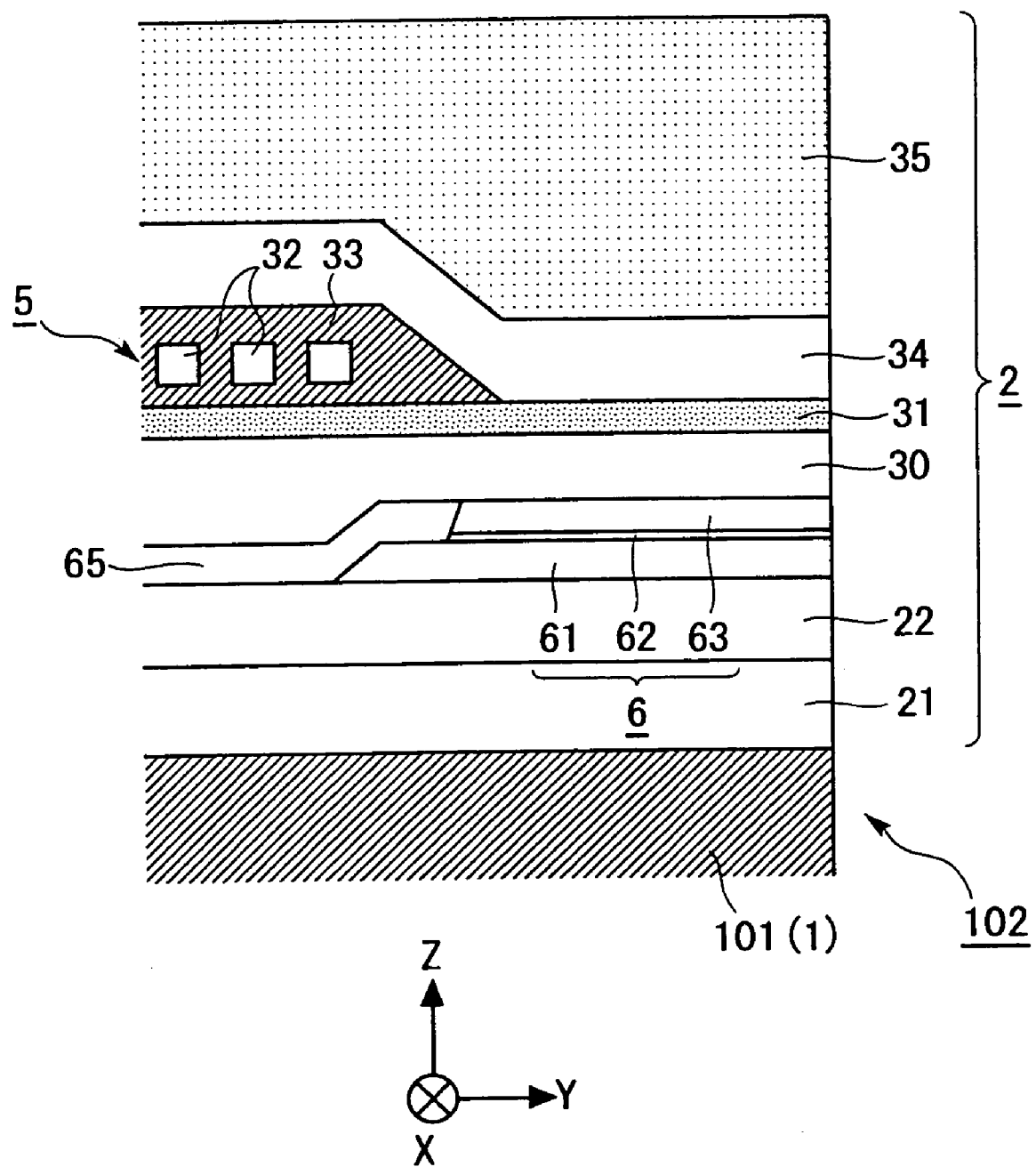
FIG. 32 is a schematic cross-sectional view illustrating a bar which is cut away by a cutting step in the method of manufacturing the magnetic head illustrated in FIG. 24.
Figure 33A:
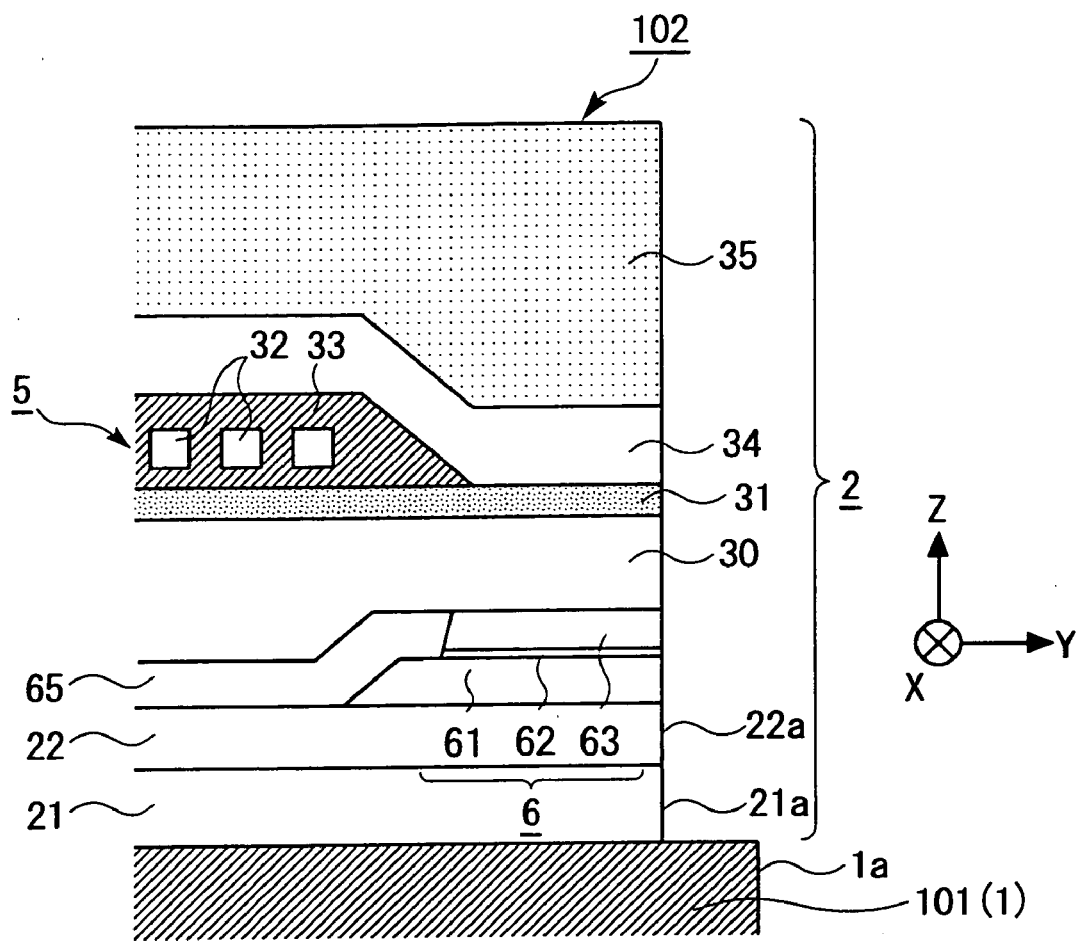
FIGS. 33A, 33B are schematic cross-sectional views illustrating the bar of FIG. 32 after it has been lapped.
Figure 33B:
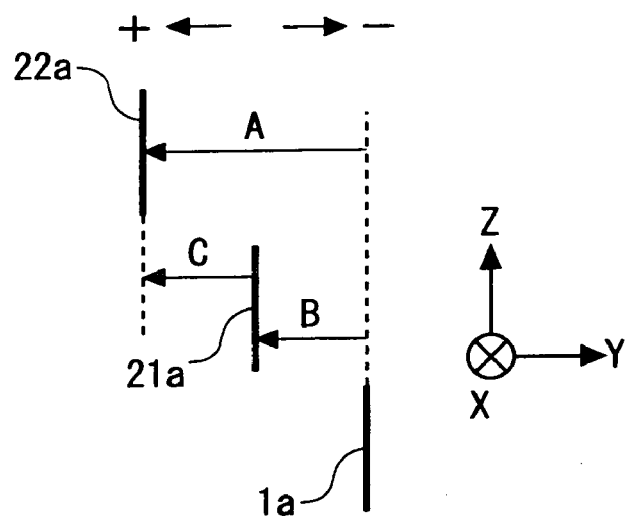

FIG. 32 is a schematic cross-sectional view along a plane parallel to the YZ plane, illustrating the bar 102 cut away by the cutting step, and corresponds to FIG. 11. FIGS. 33A, 33B are schematic cross-sectional views along a plane parallel to the YZ plane, diagrammatically illustrating the lapped bar 102, and correspond to FIGS. 12A, 12B, respectively. As illustrated in FIG. 33B, the definitions for the level differences A, B, C are similar to those in FIG. 12B. The end face of the TMR device 6 close to the magnetic recording medium 90 substantially levels with the end face 22a of the lower magnetic shield layer 22.

Subsequently, the magnetic head according to the second embodiment is completed by performing the respective steps illustrated in FIG. 4 or 19 described in connection with the first embodiment.

Next, a head suspension assembly according to a third embodiment of the present invention will be described with reference to FIG. 34.

Figure 34:
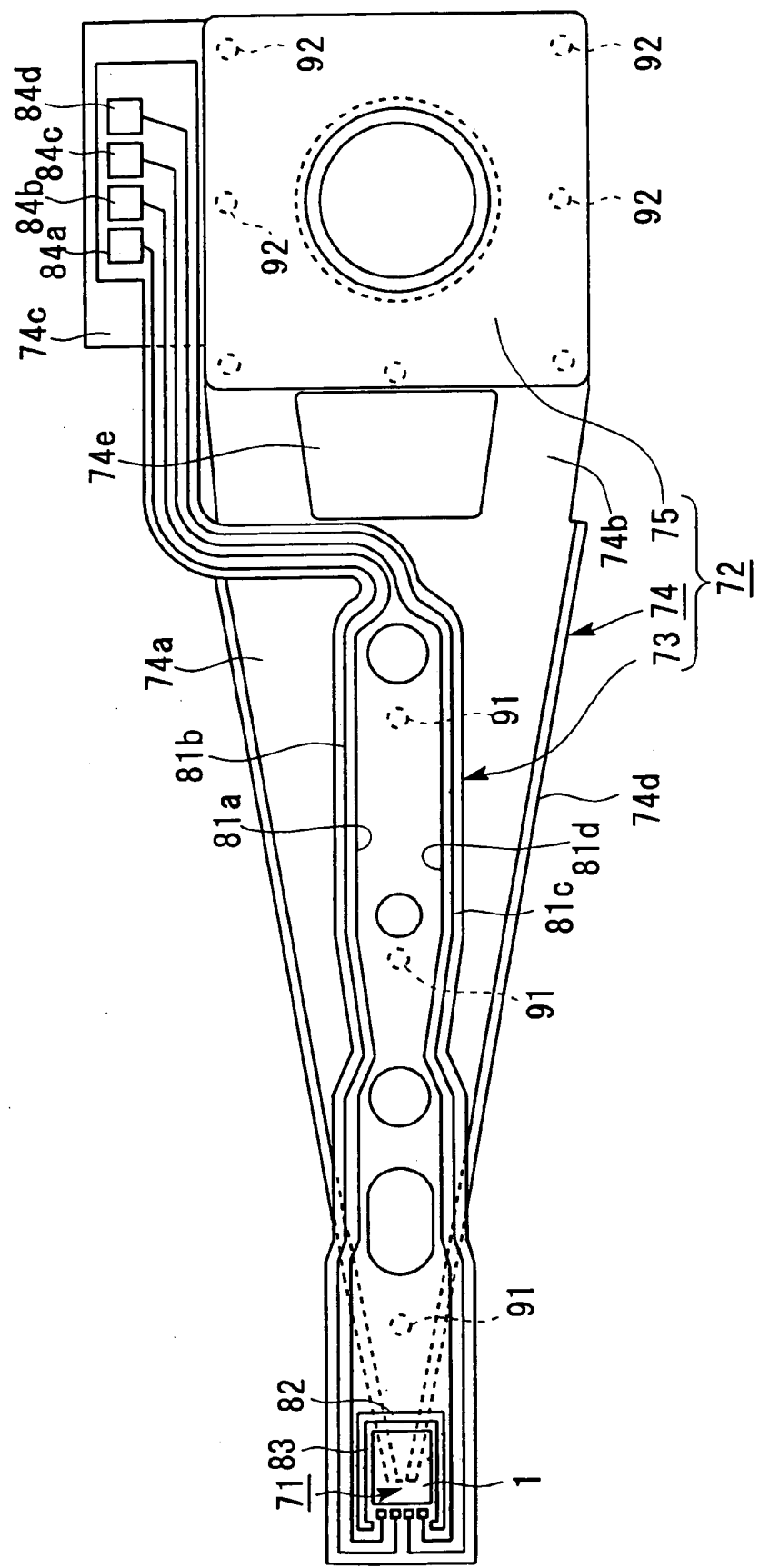
FIG. 34 is a schematic perspective view illustrating the configuration of a main portion of a magnetic disk apparatus according to a third embodiment of the present invention.

FIG. 34 is a general plan view illustrating a head suspension assembly according to the third embodiment, when seen from a plane opposite to a magnetic recording medium.

The head suspension assembly according to the third embodiment comprises a magnetic head 71; and a suspension 72 for supporting the magnetic head 71 which is mounted near a leading end thereof. The magnetic heads according to any of the first and second embodiments and the exemplary modifications thereto may be used as the magnetic head 71. FIG. 34 only illustrates a slider (base) 1 (see also FIG. 1) as a component of the magnetic head 71.

The suspension 72 comprises a flexure 73 on which the slider 1 of the magnetic head 71 is mounted; a load beam 74 for supporting the flexure 73 and applying a pressing force (load) to the slider 1 of the magnetic head 71; and a base plate 75.

Though not shown, the flexure 73 is comprised of a substrate extending in a strip shape from a leading end to a proximal end thereof and made of a thin stainless steel plate or the like; an insulating layer formed on the substrate and made of a polyimide layer or the like; four conductor patterns 81a–81d formed on the insulating layer for inputting and outputting signals; and a protection layer formed on the conductor patterns and made of a polyimide layer or the like. The conductor patterns 81a–81d extend substantially over the entire length of the flexure 73 along a lengthwise direction thereof.

The flexure 73 is formed at a leading end with a groove 82 substantially in an inverted C-shape, in a plan view, to provide a gimbal 83 to which the slider 1 of the magnetic head 71 is bonded with a bonding agent or the like. The flexure 73 is formed with four bonding pads each electrically connected to one end of a conductor pattern 81a–81d at a location close to a bonding pad (electrodes) 41–44 (see FIG. 1) formed on the slider 1. These bonding pads are electrically connected to the bonding pads 41–44 of the slider 1, respectively, with gold balls or the like. The flexure 73 is also formed near a proximal end with bonding pads 84a–84d electrically connected to the other ends of the conductor patterns 81a–81d, respectively, for connection to an external circuit.

The load beam 74 is formed of a relatively thick stainless steel plate or the like. The load beam 74 comprises a rigid portion 74a at a leading end substantially in a triangular shape in a plan view; a base plate joint near the proximal end; a resilient portion 74b positioned between the rigid portion 74a and the joint for generating a pressing force which is applied to the slider 1 of the magnetic head 71; and a supporting portion 74c extending from the joint to one side for supporting the proximal end of the flexure 74. In FIG. 34, a bent-up portion 74d is formed for increasing the rigidity of the rigid portion 74a, and a hole 74e is formed for adjusting the pressing force generated by the resilient portion 74b. The flexure 73 is secured to the rigid portion 74a of the load beam 74 at a plurality of spot welding points 91 by laser welding or the like. Also, a base plate 75 is secured to the joint of the load beam 74 at a plurality of spot welding points 92. A portion of the flexure 73 near the proximal end is supported by a support 74c of the load beam 74 which protrudes from the base plate 75 to one side.

In the third embodiment, the head suspension assembly is mounted with the magnetic head according to any of the first and second embodiments and the exemplary modifications thereto, as the magnetic head 71, so that when the head suspension assembly according to the third embodiment is used in a magnetic disk drive or the like, the resulting magnetic disk drive can provide a higher recording density.

A large number of bars corresponding to the bar 102 illustrated in FIG. 12 and having the same structure as one another (hereinafter called the "GMR sample bar") were fabricated by the same method corresponding to steps S1–S3 in FIG. 4 under the same conditions. A main structure of these GMR sample bars will be described with reference to FIG. 12A. In the GMR sample bar, the GMR device 4 was comprised of films of Ta (5 nm thickness)/NiFe (3 nm thickness)/CoFe (1 nm thickness)/Cu (2.5 nm thickness)/CoFe (3 nm thickness)/Ru (0.8 nm thickness)/CoFe (2 nm thickness)/PtMn (15 nm thickness)/Ta (5 nm thickness) in order from the base 1. The horizontal width TW of the GMR device 4 (see FIG. 7) was set at 0.17 μm. Also, in the GMR sample bar, the wafer 101 constituting the base 1 was formed of an AlTic substrate; the underlying layer 21, an alumina layer of 5 μm thickness; the lower magnetic shield layer 22, a permalloy (NiFe) layer of 2 μm thickness; The lower insulating layer 23, an alumina layer of 25 nm thickness; the upper insulating layer 29, an alumina layer of 25 nm thickness; the upper magnetic shield layer 30, a permalloy layer of 4 μm thickness; the gap layer 31, an alumina layer; the upper magnetic layer 34, a permalloy layer; and the protection layer, an alumina layer. The lapping at step S2 was conducted using a suspension including diamond abrasive grain having an average grain diameter of 0.1 μm such that the GMR device 4 had a height (MR height) of 0.13 μm.

For some of these GMR sample bars, the level differences A, B, C were measured pursuant to the definition shown in FIG. 12B. An atomic force microscope (AFM) was used for the measurements. Any of the GMR sample bars under measurement presented the level difference A approximately equal to +4.5 nm; the level difference B approximately equal to +3.9 nm; and the level difference C approximately equal to +0.6 nm, thus substantially eliminating variations among the measured sample bars. Therefore, all the GMR sample bars are assumed to have the level differences A, B, C of these values.

A large number of bars corresponding to the bar 102 illustrated in FIG. 33A and having the same structure as one another (hereinafter called the "TMR sample bars") were fabricated by the same method corresponding to steps S1–S3 in FIG. 4 under the same conditions. A main structure of these TMR sample bars will be described with reference to FIG. 33A. In the TMR sample bar, the TMR device 6 was comprised of films of Ta (10 nm thickness)/NiFe (3 nm thickness)/CoFe (1 nm thickness)/Al$_2$O$_3$ (0.6 nm thickness)/CoFe (3 nm thickness)/Ru (0.8 nm thickness)/CoFe (2 nm thickness)/PtMn (15 nm thickness)/Ta (5 nm thickness) in order from the base 1. The TMR device 6 had the horizontal width TW (see FIG. 29A) of 0.17 μm. The width PMD (see FIG. 29A) between the hard magnetic layers 64a, 64b was 0.37 μm. Also, in the TMR sample bar, the wafer 101 constituting the base 1 was formed of an AlTic substrate; the underlying layer 21, an alumina layer of 5 μm thickness; the lower magnetic shield layer 22, a permalloy (NiFe) layer of 2 μm thickness; the upper magnetic shield layer 30, a permalloy layer of 4 μm thickness; the gap layer 31, an alumina layer; the upper magnetic layer 34, a permalloy layer; and the protection layer, an alumina layer, as is the case with the GMR sample bar. The lapping at step S2 was conducted using a suspension including diamond abrasive grain having an average grain diameter of 0.1 μm such that the TMR device 6 had a height (MR height) of 0.13 μm.

For some of these TMR sample bars, the level differences A, B, C were measured pursuant to the definition shown in FIG. 33B. An atomic force microscope (AFM) was used for the measurements. Any of the TMR sample bars under measurement presented the level difference A approximately equal to +4.4 nm; the level difference B approximately equal to +3.6 nm; and the level difference C approximately equal to +0.8 nm, thus substantially eliminating variations among the measured sample bars. Therefore, all the TMR sample bars are assumed to have the level differences A, B, C of these values.

A predetermined number of the GMR sample bars were processed in steps corresponding to the first process (steps S4–S6), second process (step S7), and steps S8–S10 illustrated in FIG. 4 to fabricate magnetic heads which were used as samples of Examples 1–6 listed in Table 2 below. For each of Examples 1–6, samples different in production lot were fabricated from a plurality of GMR sample bars with respect to the first and second processes. In addition, a single GMR sample bar was processed in steps corresponding to the second process (step S7) and steps S8–S10 illustrated in FIG. 4 to fabricate a magnetic head which was used as a sample of Comparative Example 1 listed in Table 2 below.

In Examples 1–6, the aforementioned target offset amount $\alpha_0$ (see FIG. 16A) was set to 0.000 μm at step S4 in the first process to form the resist. Also, in Examples 1–6, ion beam etching was conducted at step S5 in the first process using an Ar gas at gas pressure of $4 \times 10^{-4}$ Torr as an etching gas with an ion beam irradiated at an incident angle θ (see FIG. 14) of 0°, an ion acceleration voltage of 300 V, and an ion current density of 0.2 mA/cm², for an etching time as shown in Table 2. In Comparative Example 1, in turn, the first process (steps S4–S6) was not performed.

Also, in Examples 1–6 and Comparative example 1, ion beam etching was conducted in the second process (step S7)

using an Ar gas at gas pressure of $2 \times 10^{-4}$ Torr as an etching gas with an ion acceleration voltage of 250 V, and an ion current density of 0.1 mA/cm², for an etching time as shown in Table 2. The incident angle θ (see FIG. 14) of the ion beam in this event was set at different angles in Examples 1–6, as shown in Table 2. In Comparative Example 1, the incident angle θ was set at 0° identical to Example 1.

The processing at steps S8–S10 illustrated in FIG. 4 was performed under the same conditions for any of Examples 1–6 and Comparative Example 1. In this event, the rails were set in terms of the shape, dimensions and the like such that a target value for the flying height FH (see FIG. 3) was 10 nm. At step S8, the protection film 3 was formed of a DLC film of 3 nm thickness.

For Examples 1–6 and Comparative Example 1, final level differences A, B, C pursuant to the definition shown in FIG. 12B were measured using AFM, respectively, after the second process (step S7) and before the formation of the protection film (step S8). Also, a testing apparatus similar to a magnetic disk apparatus was used to rotate a magnetic disk at a predetermined rotational speed to measure the output (head output) reproduced from the samples (floating magnetic heads) of Examples 1–6 and Comparative Example 1 provided after step S10. The used magnetic disk had a protection film (corresponding to the protection film 92 in FIG. 3) of 3 nm thickness formed on a magnetic layer. It should be noted that the flying height FH could not be measured simultaneously with the measurement of the reproduced output, and therefore was measured separately using a technique which relied on optical interference.

A plurality of samples (magnetic heads) even in the same Example 1 included those which presented the flying height FH approximately matching the target value (10 nm), those which presented the flying height FH largely deviated from the target value, and those which had no flying height FH (meaning that the magnetic head collides with the magnetic disk), depending on different production lots with respect to

TABLE 2

| | (GMR head) | | | | | | | |
|---|---|---|---|---|---|---|---|---|
| | First Process (IBE) | | | Second Process (IBE) | | Final Level Difference | | | Head |
| Sample | α0 (μm) | Incident Angle θ | Time (Minutes) | Incident Angle θ | Time (Minutes) | A (nm) | B (nm) | C (nm) | Output (mV/μm) |
| Example 1 | 0.000 | 0° | 3.5 | 0° | 7.6 | 11.7 | 0.2 | 11.5 | 1.3 |
| Example 2 | 0.000 | 0° | 3.8 | 30° | 5.7 | 8.8 | 0.5 | 8.3 | 1.7 |
| Example 3 | 0.000 | 0° | 4.4 | 45° | 5.4 | 4.9 | −0.4 | 5.3 | 2.8 |
| Example 4 | 0.000 | 0° | 4.7 | 60° | 7.1 | 1.9 | −0.3 | 2.2 | 3.6 |
| Example 5 | 0.000 | 0° | 5.0 | 70° | 10.0 | 0.2 | 0.4 | −0.2 | 4.2 |
| Example 6 | 0.000 | 0° | 5.5 | 85° | 25.0 | −1.5 | 0.4 | −1.9 | 3.4 |
| Comparative Example 1 | | none | | 0° | 7.6 | 14.6 | 2.4 | 12.2 | 0.5 | the first and second processes. The same was true also in Examples 2–6. Presumably, this can be caused by variations in the position at which the resist is formed, described above with reference to FIGS. 15 and 16. To make this clear, Table 2 shows the results of measured final level differences A, B, C and head output for those samples (magnetic heads), the flying height FH of which was measured within a range of 10 nm±3 nm for Examples 1–6. Since the sample (magnetic head) of Comparative Example 1 presented the measured flying height FH within the range of 10 nm±3 nm, Table 2 shows the results of measured final level differences A, B, C, and head output of the sample.

As can be seen from Table 2, Examples 1–6 which underwent both the first process and second process presented reduced final level differences A and increased head output, as compared with Comparative Example 1 which underwent only the second process without the first process. Therefore, the magnetic heads of Examples 1–6 can generate a high output signal from a magneto-resistive device even on a narrow track to improve the recording density, as compared with the magnetic head of Comparative Example 1.

Figure 35:
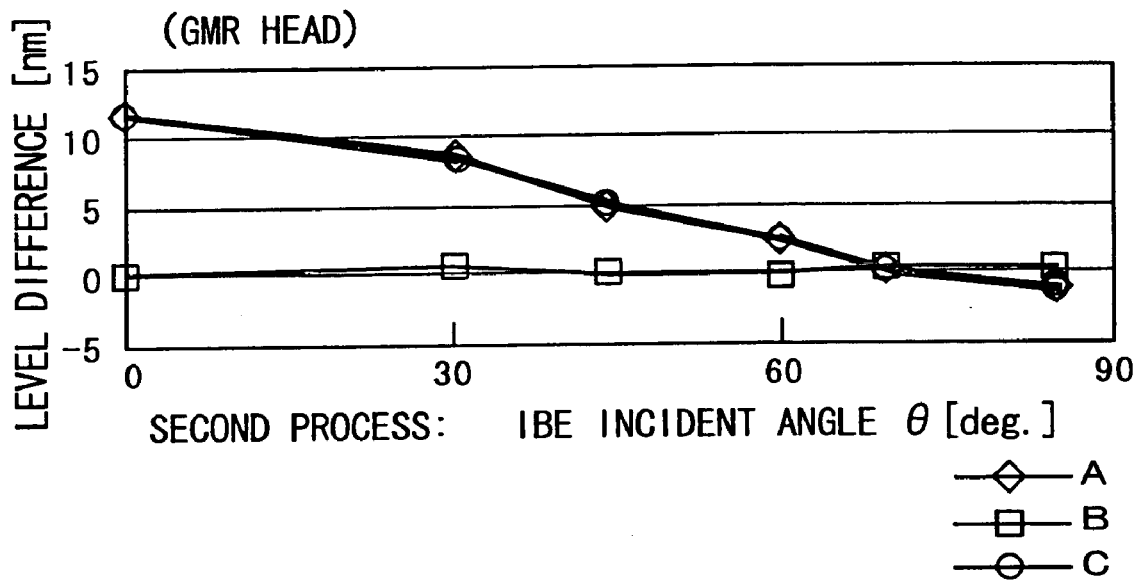
FIG. 35 is a graph showing the relationship of a final level difference to an ion beam incident angle θ in the second process based on the results of measurements made on Examples 1–6 listed in Table 2.
Figure 36:
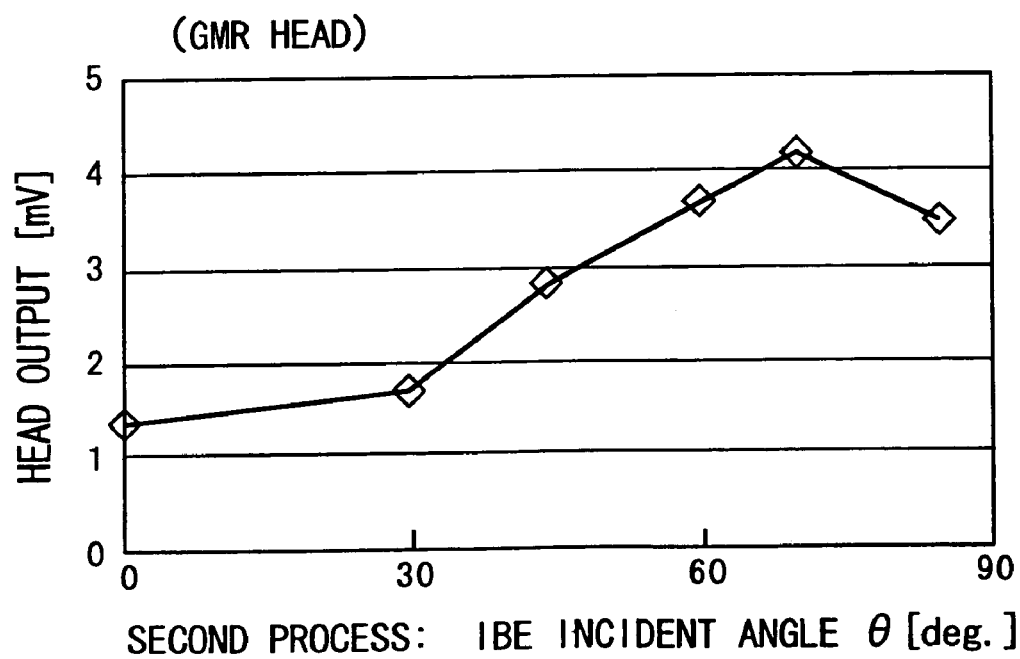
FIG. 36 is a graph showing the relationship of the head output to the ion beam incident angle θ in the second process based on the results of measurements made on Examples 1–6 listed in Table 2.

FIG. 35 is a graph showing the relationship of the final level differences A, B, C to the incident angle θ of the ion beam in the second process, based on the results of the measurements made on Examples 1–6 shown in Table 2. FIG. 36 is a graph showing the relationship of the head output to the incident angle θ of the ion beam in the second process, based on the results of the measurements on Examples 1–6 shown in Table 2. As can be seen from Table 2 and FIGS. 35, 36, the incident angle θ of the ion beam set in a range of 40° to 88° in the second process is preferable because such setting results in a reduction in the absolute value of the final level difference A to approximately 6.0 nm or less, and an increase in the head output to approximately 2.5 mV or more. Particularly, the incident angle θ of the ion beam set in a range of 60° to 80° in the second process is preferable because such setting results in a significant reduction of the absolute value of the final level difference A to approximately 2.0 nm or less, and a significant increase in the head output to approximately 3.4 mV or more.

A predetermined number of the TMR sample bars were processed in steps corresponding to the first process (steps S4–S6), second process (step S7), and steps S8–S10 illustrated in FIG. 4 to fabricate magnetic heads which were used as samples of Examples 7–12 listed in Table 3 below. For each of Examples 7–12, samples different in production lot were fabricated from a plurality of TMR sample bars with respect to the first and second processes. In addition, two TMR sample bars were processed in steps corresponding to the second process (step S7) and steps S8–S10 illustrated in FIG. 4 to fabricate magnetic heads which were used as samples of Comparative Examples 2, 3 listed in Table 3 below.

Examples 7–12 and Comparative Example 2 were manufactured by the completely same method under the completely same conditions as those of the aforementioned Examples 1–6 and Comparative Example 1, except that the TMR sample bar was used instead of the GMR sample bar. Comparative Example 3 was manufactured by the completely same method under the completely same conditions as those of Comparative Example 2, except that the incident angle θ of the ion beam was chosen to be 70° in the second process (step S7).

Like Examples 1–6 and Comparative Example 1, final level differences A, B, C pursuant to the definition shown in FIG. 33B were measured using AFM, respectively, after the second process (step S7) and before the formation of the protection film (step S8) for Examples 7–12 and Comparative Examples 2, 3.

Also, the flying height FH and reproduced output (head output) were measured for the samples of Examples 7–12 and Comparative Examples 2, 3 provided after step S10 by the same method and under the same conditions as Examples 1–6 and Comparative Example 1.

Similar to Table 2, Table 3 shows the results of measurements made on the final level differences A, B, C and head output of samples (magnetic heads), the flying height FH of which was measured within a range of 10 nm±3 nm for Examples 7–12. Since the samples (magnetic heads) of Comparative Examples 2, 3 presented the measured flying height FH within the range of 10 nm±3 nm, Table 3 shows the results of measured final level differences A, B, C, and head output of the samples.

As can be seen from Table 3, Examples 7–12 which underwent both the first process and second process presented reduced final level differences A and increased head output, as compared with Comparative Example 2 which underwent only the second process without the first process. Therefore, the magnetic heads of Examples 7–12 can generate a high output signal from a magneto-resistive device even on a narrow track to improve the recording density, as compared with the magnetic head of Comparative Example 2. Though Comparative Example 3 presents larger head output than Examples 7, 8, this is because the incident angle θ of the ion beam was set at 70° in the second process. Comparative Example 3 has smaller head output than Example 11 for which the incident angle θ of the ion beam was likewise set at 70° in the second process. It is understood from the foregoing that a magnetic head which undergoes the first process can generate higher head output.

TABLE 3

(TMR head)

| Sample | α0 (μm) | First Process (IBE) Incident Angle θ | Time (Minutes) | Second Process (IBE) Incident Angle θ | Time (Minutes) | Final Level Difference A (nm) | B (nm) | C (nm) | Head Output (mV) |
|---|---|---|---|---|---|---|---|---|---|
| Example 7 | 0.000 | 0° | 3.5 | 0° | 7.6 | 10.8 | −0.5 | 11.3 | 0.41 |
| Example 8 | 0.000 | 0° | 3.8 | 30° | 5.7 | 8.4 | 0.3 | 8.1 | 0.45 |
| Example 9 | 0.000 | 0° | 4.4 | 45° | 5.4 | 5.4 | −0.2 | 5.6 | 2.3 |
| Example 10 | 0.000 | 0° | 4.7 | 60° | 7.1 | 1.6 | −0.5 | 2.1 | 4.2 |
| Example 11 | 0.000 | 0° | 5.0 | 70° | 10.0 | 0.5 | 0.8 | −0.3 | 4.9 |
| Example 12 | 0.000 | 0° | 5.5 | 85° | 25.0 | −1.5 | 0.4 | −1.9 | 3.5 |
| Comparative Example 2 | | none | | 0° | 7.6 | 14.5 | 2.6 | 11.9 | 0.11 |
| Comparative Example 3 | | none | | 70° | 10.0 | 11.3 | 0.5 | −0.1 | 1.9 |

Figure 37:
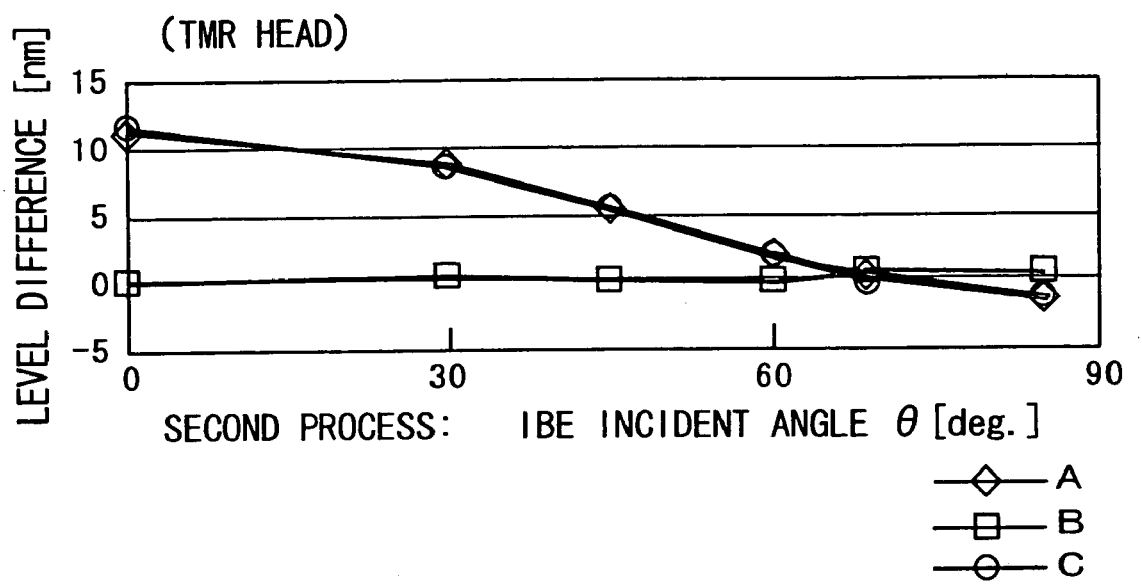
FIG. 37 is a graph showing the relationship of a final level difference to an ion beam incident angle θ in the second process based on the results of measurements made on Examples 7–12 listed in Table 3.
Figure 38:
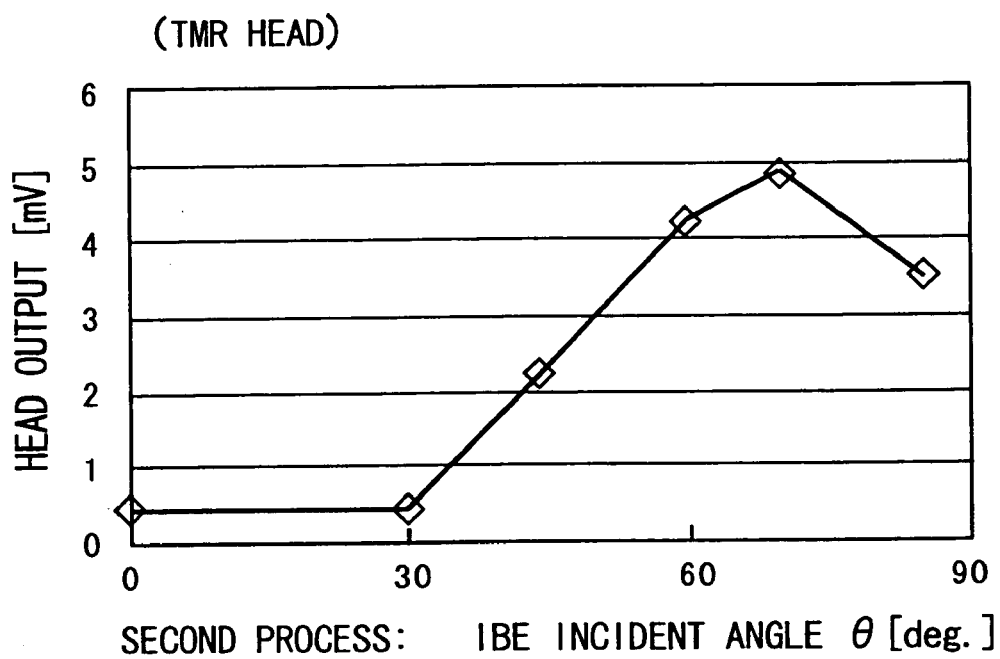
FIG. 38 is a graph showing the relationship of the head output to the ion beam incident angle θ in the second process based on the results of measurements made on Examples 7–12 listed in Table 3.

FIG. 37 is a graph showing the relationship of the final level differences A, B, C to the incident angle θ of the ion beam in the second process, based on the results of the measurements on Examples 7–12 shown in Table 3. FIG. 38 is a graph showing the relationship of the head output to the incident angle θ of the ion beam in the second process, based on the results of the measurements on Examples 7–12 shown in Table 3. As can be seen from Table 3 and FIGS. 37, 38, the incident angle θ of the ion beam set in a range of 40° to 88° in the second process is preferable because such setting results in a reduction of the absolute value of the final level difference A to approximately 6.0 nm or less, and an increase in the head output to approximately 2 mV or more. Particularly, the incident angle θ of the ion beam set in a range of 60° to 80° in the second process is preferable because such setting results in a significant reduction of the absolute value of the final level difference A to approximately 2.0 nm or less, and a significant increase in the head output to approximately 3.5 mV or more.

A predetermined number of the GMR sample bars were processed in steps corresponding to the first process (steps S4–S6), second process (step S7), and steps S8–S10 illustrated in FIG. 4 to fabricate magnetic heads which were used as samples of Examples 13–21 listed in Table 4 below. For each of Examples 13–21, samples different in production lot were fabricated from a plurality of GMR sample bars with respect to the first and second processes.

height FH (see FIG. 3) was 10 nm. At step S8, the protection film 3 was formed of a DLC film of 3 nm thickness.

For Examples 13–21, a final level difference A pursuant to the definition shown in FIG. 12B, and the depth β (see FIG. 16C) of the groove 2*d* were measured using the AFM, respectively, after the second process (step S7) and before the formation of the protection film (step S8). Also, a testing apparatus similar to a magnetic disk apparatus was used to rotate a magnetic disk at a predetermined rotational speed to measure the output (head output) reproduced from the samples (floating magnetic heads) of Examples 13–21 provided after step S10. The used magnetic disk had a protection film (corresponding to the protection film 92 in FIG. 3) of 3 nm thickness formed on a magnetic layer. It should be noted that the flying height FH could not be measured simultaneously with the measurement of the reproduced output, and therefore was measured separately using a technique which relied on optical interference.

A plurality of samples (magnetic heads) even in the same Example 13 included those which presented the flying height FH approximately matching the target value (10 nm),

TABLE 4

(GMR head)

| Sample | $\alpha_0$ (μm) | First Process (IBE) | | Second Process (IBE) | | Floating Amount | | | Head Output |
|---|---|---|---|---|---|---|---|---|---|
| | | Incident Angle θ | Time (Minutes) | Incident Angle θ | Time (Minutes) | Yield Rate | Aavel (nm) | □avel (nm) | Vavel (mV/μm) |
| Example 13 | 0.000 | 0° | 5.0 | 70° | 10.0 | 43% | 0.2 | 1.8 | 4.1 |
| Example 14 | 0.025 | 0° | 5.0 | 70° | 10.0 | 60% | 0.4 | 4.1 | 4.0 |
| Example 15 | 0.050 | 0° | 5.0 | 70° | 10.0 | 77% | −0.2 | 5.6 | 4.2 |
| Example 16 | 0.100 | 0° | 5.0 | 70° | 10.0 | 87% | 0.1 | 7.4 | 4.3 |
| Example 17 | 0.300 | 0° | 5.0 | 70° | 10.0 | 93% | −0.3 | 8.5 | 4.2 |
| Example 18 | 0.500 | 0° | 5.0 | 70° | 10.0 | 90% | 0.3 | 8.6 | 4.0 |
| Example 19 | 1.000 | 0° | 5.0 | 70° | 10.0 | 73% | 0.1 | 8.4 | 4.1 |
| Example 20 | 2.000 | 0° | 5.0 | 70° | 10.0 | 90% | 0.1 | 8.6 | 4.1 |
| Example 21 | 3.000 | 0° | 5.0 | 70° | 10.0 | 77% | −0.1 | 8.5 | 4.0 |

In Examples 13–21, the aforementioned target offset amount $\alpha_0$ (see FIG. 16A) was set to different values as shown in Table 4 at step S4 in the first process to form the resist for each of Examples 13–21. Also, in Examples 13–21, ion beam etching was conducted at step S5 in the first process using an Ar gas at gas pressure of $4 \times 10^{-4}$ Torr as an etching gas with an ion beam irradiated at an incident angle θ (see FIG. 14) of 0°, an ion acceleration voltage of 300 V, and an ion current density of 0.2 mA/cm², for an etching time of 5 minutes.

Also, in Examples 13–21, ion beam etching was conducted in the second process (step S7) using an Ar gas at gas pressure of $2 \times 10^{-4}$ Torr as an etching gas with an ion beam irradiated at an incident angle θ (see FIG. 14) of 70°, an ion acceleration voltage of 250 V, and an ion current density of 0.1 mA/cm², for an etching time of 10 minutes.

The processing at steps S8–S10 illustrated in FIG. 4 was performed under the same conditions for any of Examples 13–21. In this event, the rails were set in terms of the shape, dimensions and the like such that a target value for the flying those which presented the flying height FH largely deviated from the target value, and those which had no flying height FH (meaning that the magnetic head collides with the magnetic disk), depending on different production lots with respect to the first and second processes. The same was true also in Examples 14–21. Presumably, this can be caused by variations in the position at which the resist is formed, described above with reference to FIGS. 15 and 16. Here, assuming that a population comprised a predetermined number of samples of Example 13 which were different from one another in production lot with respect to the first and second processes, the proportion of samples of Example 13, the fling height FH of which was measured within the range of 10 nm±3 nm, to the population was calculated as a yield rate (hereinafter called the "floating amount yield rate" because this is a yield rate calculated with reference to the floating amount). Likewise, the floating amount yield rate was calculated for each of Examples 14–21 in a manner similar to Example 13. The calculated floating amount yield rates are shown in Table 4.

Also, for Example 13, an average value Aave1 of the level difference A, an average value βave1 of the depth β of the groove 2d, and an average value Vave1 of the head output were calculated for those samples in the population, which presented the measured flying height FH within the range of 10 nm±3 nm. Likewise, for each of Examples 14–21, an average value Aave1 of the level difference A, an average value βave1 of the depth β of the groove 2d, and an average value Vave1 of the head output were calculated for like samples in the population in a manner similar to Example 13. These results are also shown in Table 4.

Figure 39:
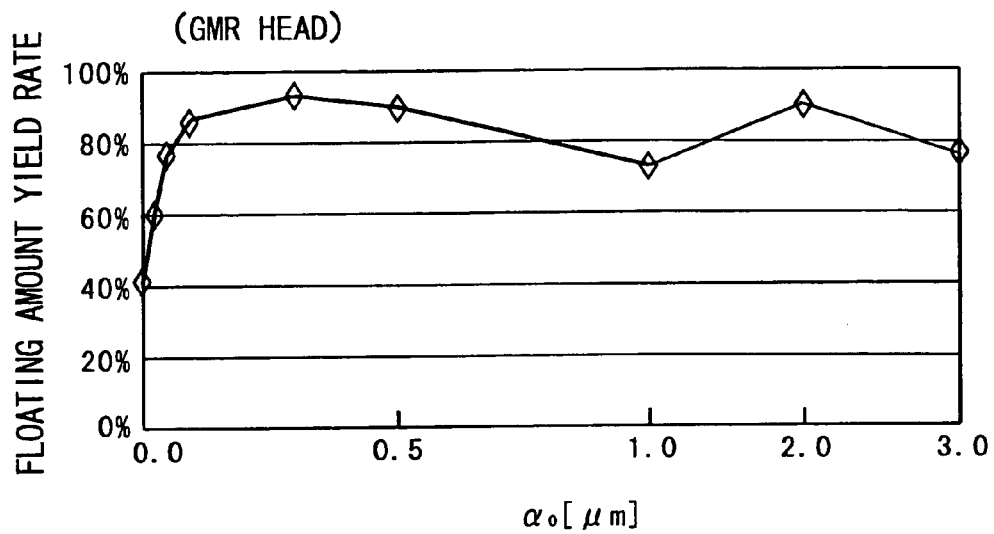
FIG. 39 is a graph showing the relationship of a floating amount yield rate to a target offset amount $\alpha_0$ based on the results of measurements made on Examples 13–21 listed in Table 4.

FIG. 39 is a graph showing the relationship of the floating amount yield rate to the target offset amount $\alpha_0$, based on the results of the measurements made on Examples 13–21 shown in Table 4. It should be noted that different scales are employed on the horizontal axis of FIG. 39 before and after 1.0 μm. As can be seen from Table 4 and FIG. 39, the target offset amount $\alpha_0$ set in a range of 0.05 μm to 3.0 μm is preferable because the resulting floating amount yield rate is increased to 73% or more.

A predetermined number of the GMR sample bars were processed in steps corresponding to the first process (steps S4–S6), second process (step S7), and steps S8–S10 illustrated in FIG. 4 to fabricate magnetic heads which were used as samples of Examples 22–27 listed in Table 5 below. For each of Examples 22–27, samples different in production lot were fabricated from a plurality of GMR sample bars with respect to the first and second processes.

22–27. In this event, the rails were set in terms of the shape, dimensions and the like such that a target value for the flying height FH (see FIG. 3) was 10 nm. At step S8, the protection film 3 was formed of a DLC film of 3 nm thickness.

For Examples 22–27, a final level difference A pursuant to the definition shown in FIG. 12B, and the depth β (see FIG. 16C) of the groove 2d were measured using the AFM, respectively, after the second process (step S7) and before the formation of the protection film (step S8). Also, a testing apparatus similar to a magnetic disk apparatus was used to rotate a magnetic disk at a predetermined rotational speed to measure the output (head output) reproduced from the samples (floating magnetic heads) of Examples 22–27 provided after step S10. The used magnetic disk had a protection film (corresponding to the protection film 92 in FIG. 3) of 3 nm thickness formed on a magnetic layer. It should be noted that the flying height FH could not be measured simultaneously with the measurement of the reproduced output, and therefore was measured separately using a technique which relied on optical interference.

A plurality of samples (magnetic heads) even in the same Example 22 included those which presented the flying height FH approximately matching the target value (10 nm), those which presented the flying height FH largely deviated from the target value, and those which had no flying height FH (meaning that the magnetic head does not float from the magnetic disk) depending on different production lots with respect to the first and second processes. The same was true

TABLE 5

(GMR head)

| Sample | First Process (IBE) | | | Second Process (IBE) | | βave2 (nm) | Aave2 (nm) | Floating Amount Yield Rate | Head Output Vave1 (mV/μm) |
|---|---|---|---|---|---|---|---|---|---|
| | $\alpha_0$ (μm) | Incident Angle θ | Time (Minutes) | Incident Angle θ | Time (Minutes) | | | | |
| Example 22 | 0.300 | 0° | 3.0 | 70° | 5.0 | 5.1 | 0.1 | 93% | 3.6 |
| Example 23 | 0.300 | 0° | 5.0 | 70° | 10.0 | 8.5 | −0.3 | 93% | 4.2 |
| Example 24 | 0.300 | 0° | 9.1 | 70° | 32.3 | 15.4 | 0.2 | 90% | 4.3 |
| Example 25 | 0.300 | 0° | 11.8 | 70° | 47.3 | 20.1 | −0.4 | 83% | 4.2 |
| Example 26 | 0.300 | 0° | 15.1 | 70° | 65.2 | 25.7 | −0.1 | 73% | 4.3 |
| Example 27 | 0.300 | 0° | 19.8 | 70° | 90.5 | 33.6 | −0.2 | 60% | 4.1 |

In Examples 22–27, the aforementioned target offset amount $\alpha_0$ (see FIG. 16A) was set to 0.300 μm at step S4 in the first process to form the resist. Also, in Examples 22–27, ion beam etching was conducted at step S5 in the first process using an Ar gas at gas pressure of $4 \times 10^{-4}$ Torr as an etching gas with an ion beam irradiated at an incident angle θ (see FIG. 14) of 0°, an ion acceleration voltage of 300 V, and an ion current density of 0.2 mA/cm², for an etching time as shown in Table 5.

Also, in Examples 22–27, ion beam etching was conducted in the second process (step S7) using an Ar gas at gas pressure of $2 \times 10^{-4}$ Torr as an etching gas with an ion beam irradiated at an incident angle θ (see FIG. 14) of 70°, an ion acceleration voltage of 250 V, and an ion current density of 0.1 mA/cm², for an etching time as shown in Table 5.

The processing at steps S8–S10 illustrated in FIG. 4 was performed under the same conditions for any of Examples also in Examples 23–27. Presumably, this can be caused by variations in the position at which the resist is formed, described above with reference to FIGS. 15 and 16. Here, assuming that a population comprised a predetermined number of samples of Example 22 which were different from one another in production lot with respect to the first and second processes, the proportion of samples of Example 22, the fling height FH of which was measured within the range of 10 nm±3 nm, to the population was calculated as the floating amount yield rate. Likewise, the floating amount yield rate was calculated for each of Examples 23–27 in a manner similar to Example 22. The calculated floating amount yield rates are shown in Table 5.

Also, for Example 22, an average value Vave1 of the head output was calculated for those samples in the population, which presented the measured flying height FH within the range of 10 nm±3 nm. Additionally, for Example 22, an average value Aave2 of the level difference A, an average value βave2 of the depth β of the groove 2d were measured for all samples within the population of Example 22. Further, for each of Examples 23–27, an average value Aave2 of the level difference A, an average value βave2 of the depth β of the groove 2d, and an average value Vave1 of the head output were calculated in a manner similar to Example 22. These results are also shown in Table 5.

Figure 40:
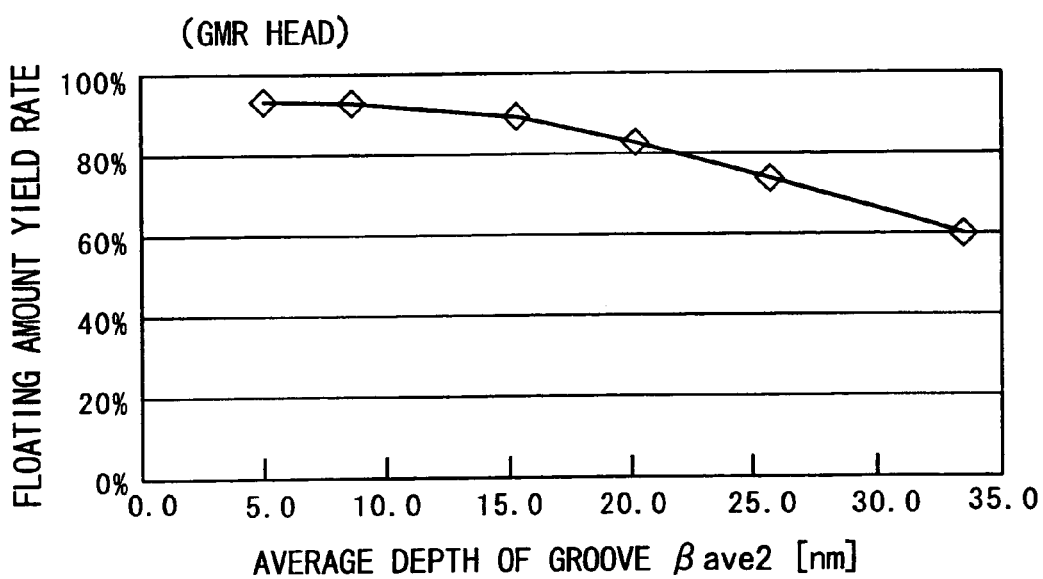
FIG. 40 is a graph showing the relationship of the floating amount yield rate to an average value βave2 of the depths of grooves based on the results of measurements made on Examples 22–27 listed in Table 5.
Figure 41A:
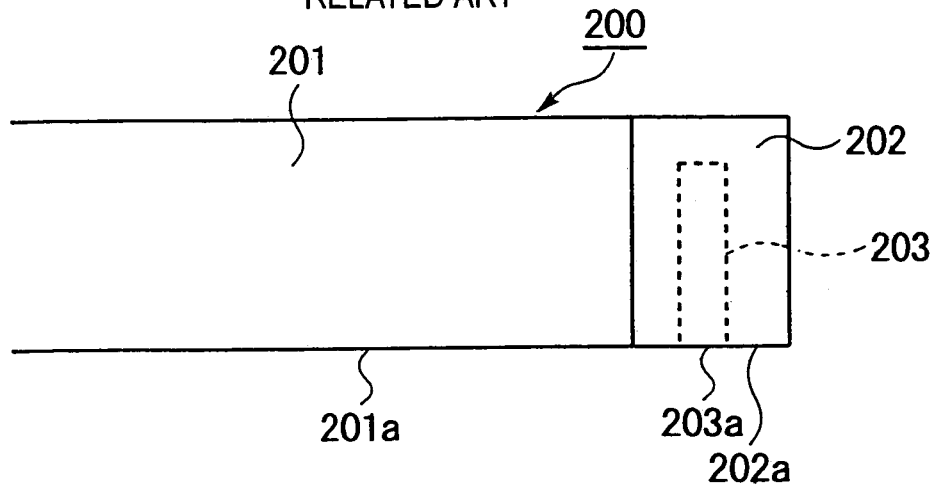
FIGS. 41A, 41B, 41C are explanatory diagrams schematically illustrating a main portion in a conventional method of manufacturing a magnetic head.
Figure 41B:
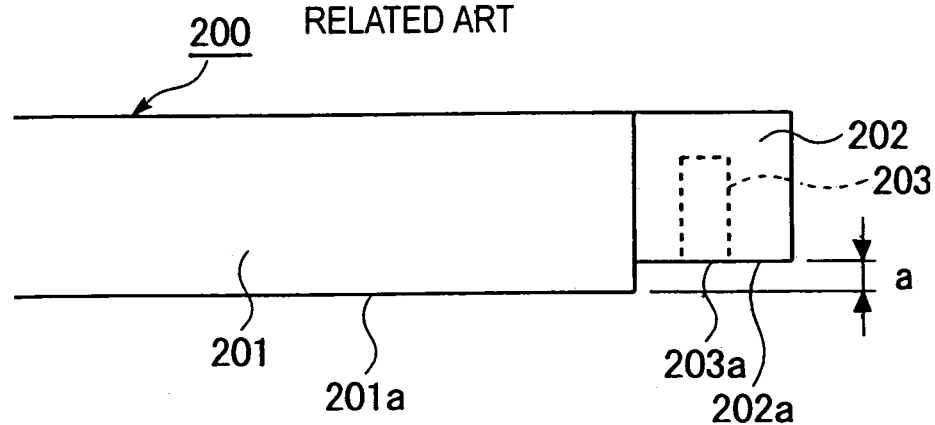
Figure 41C:
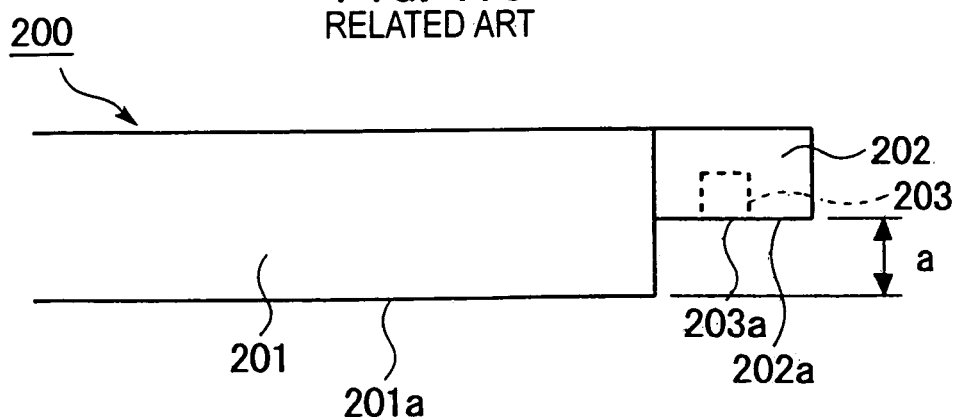

FIG. 40 is a graph showing the relationship of the floating amount yield rate to the average value βave2 of the depth β of the groove 2d, based on the results of the measurements made on Examples 22–27 shown in Table 5. As can be seen from Table 5 and FIG. 40, the depth β of the groove 2d equal to or smaller than 30 nm is preferable because the resulting floating amount yield rate is increased to 65% or more. Particularly, the depth β of the groove 2d equal to or smaller than 20 nm is more preferable because the resulting floating amount yield rate is increased to 83% or more. Moreover, the depth β of the groove 2d equal to or smaller than 10 nm is further more preferable because the resulting floating amount yield rate is increased to 93% or more.

Samples corresponding to Examples 13–27 were not fabricated based on the TMR sample bars. However, since the TMR head is similar to the GMR head in the floating of the head, it is contemplated that experiments on the TMR head will show similar results to those of the experiments made on Examples 13–27.

While the present invention has been described in conjunction with the respective embodiments as well as exemplary modifications and examples thereof, the present invention is not limited to those.

For example, the magnetic heads and the methods of manufacturing the same described in the foregoing respective embodiments are illustratively applied to the magnetic heads having the GMR device or TMR device in the structures described above. The present invention, however, can be applied to magnetic heads having a GMR device in a different structure, a TMR device in a different structure, and a different magneto-resistive device, and the methods of manufacturing such magnetic heads. Specifically, the present invention can be applied, for example, to (1) a magnetic head which uses a TMR device for a magneto-resistive device and has a CPP (Current Perpendicular to Plane) structure; (2) a magnetic head which uses an anti-ferromagnetic coupling magnetic multi-layered film for a magneto-resistive device and has a CPP structure; (3) a magnetic head which uses a spin valve magnetic multi-layered film for a magneto-resistive device and has a CPP structure; (4) a magnetic head which uses a dual spin valve magnetic multi-layered film for a magneto-resistive device and has a CPP structure; (5) a magnetic head which uses a spin valve magnetic multi-layered film for a magneto-resistive device and has a CIP (Current in Plane) structure; (6) a magnetic head which uses a dual spin valve magnetic multi-layered film for a magneto-resistive device and has a CIP structure; and the like as well as methods of manufacturing such magnetic heads.

As described above, the present invention can provide a magnetic head which is capable of generating a high output signal from a magneto-resistive device even on a narrow track to increase the recording density, and a method of manufacturing the same.

In addition, the present invention can provide a head suspension assembly which is capable of increasing the recording density of a magnetic disk apparatus and the like.

What is claimed is:

1. A method of manufacturing a magnetic head having a base, and a laminate stacked on said base and including a magneto-resistive device, said method comprising:
    a polishing step for mechanically polishing a surface of a structure including said base and said laminate close to a magnetic recording medium, said surface of said structure including an end face of said laminate including an end face of said magneto-resistive device and a surface of said base;
    a first etching step after said polishing step for selectively etching a first region on the surface of said structure close to the magnetic recording medium, said first region including the surface of said base but not including the end face of said magneto-resistive device;
    a second etching step after said polishing step and before or after said first etching step for entirely etching the surface of said structure close to the magnetic recording medium; and
    a step of setting a target region for said first region, said target region including a region on the surface of said base on the surface of said structure close to the magnetic recording medium, and a predetermined region close to said base in a region on the end face of said laminate on the surface of said structure close to the magnetic recording medium, wherein said predetermined region in said target region set for said first region has a width in a range of 0.05 µm to 3.0 µm.

2. A method of manufacturing a magnetic head according to claim 1, wherein:
    said laminate comprises a first and a second magnetic shield film formed on said base to sandwich said magneto-resistive device;
    said surface of said structure close to the magnetic recording medium includes end faces of said first and second magnetic shield films close to the magnetic recording medium; and
    said first region does not include end faces of said first and second magnetic shield films.

3. A method of manufacturing a magnetic head according to claim 1, wherein said first etching step comprises the steps of:
    forming a resist on a region on the surface of said structure close to the magnetic recording medium except for said first region before the etching in said first etching step; and
    removing said resist after the etching in said first etching step.

4. A method of manufacturing a magnetic head according to claim 1, wherein said first region substantially solely includes the surface of said base on the surface of said structure close to the magnetic recording medium.

5. A method of manufacturing a magnetic head according to claim 1, wherein said first region includes a predetermined region on the end face of said laminate close to said base on the surface of said structure close to the magnetic recording medium.

6. A method of manufacturing a magnetic head according to claim 1, wherein said base is made of $Al_2O_3$—TiC or SiC.

7. A method of manufacturing a magnetic head according to claim 1, wherein the second etching step for entirely etching the surface of said structure close to the magnetic recording medium includes etching the end face of said magneto-resistive device.

* * * * *